US012763972B1

(12) United States Patent
Jukic et al.

(10) Patent No.: US 12,763,972 B1
(45) Date of Patent: Oct. 13, 2026

(54) GOVERNANCE CONTROL PLANE FOR POLICY GOVERNED RELIANCE ON ARTIFICIAL INTELLIGENCE IN REGULATED WORKFLOWS

(71) Applicant: OneSource Solutions International, Inc., Sudbury, MA (US)

(72) Inventors: Vedran Jukic, Trieste (IT); Harold Arkoff, Sudbury, MA (US)

(73) Assignee: OneSource Solutions International, Inc., Sudbury, MA (US)

( * ) Notice: Subject to any disclaimer, the term of this patent is extended or adjusted under 35 U.S.C. 154(b) by 0 days.

(21) Appl. No.: 19/560,014

(22) Filed: Mar. 7, 2026

Related U.S. Application Data

(63) Continuation-in-part of application No. 19/276,173, filed on Jul. 22, 2025, now Pat. No. 12,580,768.

(51) Int. Cl.
*H04L 9/32* (2006.01)
*H04L 9/00* (2022.01)

(52) U.S. Cl.
CPC .......... *H04L 9/3247* (2013.01); *H04L 9/3218* (2013.01); *H04L 9/50* (2022.05)

(58) Field of Classification Search
CPC ........ H04L 9/3247; H04L 9/50; H04L 9/3218
See application file for complete search history.

(56) References Cited

U.S. PATENT DOCUMENTS 10,824,913 B1 * 11/2020 Genc .................... G05D 1/0038
2020/0005213 A1 * 1/2020 Clemens ........ G06Q 10/063114

(Continued)

OTHER PUBLICATIONS

Konstantina Palla, et al. Policy-as-Prompt: Rethinking Content Moderation in the Age of Large Language Models. In Proceedings of the 2025 ACM Conference on Fairness, Accountability, and Transparency (FAccT '25). Association for Computing Machinery, New York, NY, USA, 840-854. (Year: 2025).*

(Continued)

*Primary Examiner* — Kari L Schmidt
(74) *Attorney, Agent, or Firm* — IP Consulting Group; Michael Razavi; Alfred F. Hoyte, Jr.

(57) ABSTRACT

A computer-implemented governance control plane enforces policy governed execution of regulated workflows by controlling acceptance of state-advancing operations. The governance control plane evaluates machine-interpretable policy snapshots applicable to workflow instances, derives required actions, maintains machine-executable authorization states, and generates cryptographically verifiable governance records. Downstream effectuation events, including write back, commit, finalize, dispatch, or execution, are mediated by governed connectors that permit, block, or defer acceptance only upon verification of a governance record or derived readiness artifact at an acceptance endpoint. Enforcement is applied independent of where an artificial intelligence output is generated or how the output is labeled. The governance control plane supports distributed and federated deployments across administrative domains by binding execution context identifiers, policy snapshots, and authorization outcomes to workflow instances, thereby preventing bypass of policy governed reliance and ensuring auditable, non-bypassable control of regulated state transitions.

20 Claims, 11 Drawing Sheets

(56) References Cited

U.S. PATENT DOCUMENTS

| | | | | |
|---|---|---|---|---|
| 2020/0412521 | A1* | 12/2020 | Shi | H04L 9/06 |
| 2021/0273958 | A1* | 9/2021 | McLean | H04L 63/1433 |
| 2023/0335988 | A1* | 10/2023 | Cella | G01R 21/133 |
| 2024/0330489 | A1* | 10/2024 | Le Bouthillier | G06F 21/50 |
| 2025/0028610 | A1* | 1/2025 | Sun | G06F 11/1469 |
| 2025/0053903 | A1* | 2/2025 | Krishnaiah | G06Q 10/06375 |
| 2026/0017386 | A1* | 1/2026 | Ohayon | G06F 21/577 |
| 2026/0127538 | A1* | 5/2026 | Nason | G06Q 10/0674 |
| 2026/0141094 | A1* | 5/2026 | Le Bouthillier | G06F 21/62 |
| 2026/0142827 | A1* | 5/2026 | Ast | H04L 9/3236 |

OTHER PUBLICATIONS

W.-T. Tsai and L. Zhang, "A Framework for Safe AI: Data Governance and Ecosystem Structure," 2025 IEEE International Conference on Artificial Intelligence Testing (AITest), Tucson, AZ, USA, 2025, pp. 11-23. (Year: 2025).*

T. A. Butt, M. Iqbal and N. Arshad, "From Policy to Pipeline: A Governance Framework for AI Development and Operations Pipelines," in IEEE Access, vol. 14, pp. 1373-1397, 2025 (Year: 2025).*

* cited by examiner

GOVERNANCE CONTROL PLANE FOR POLICY GOVERNED RELIANCE ON ARTIFICIAL INTELLIGENCE IN REGULATED WORKFLOWS

CROSS-REFERENCE TO RELATED APPLICATIONS

This application is a continuation-in-part of U.S. patent application Ser. No. 19/276,173, filed Jul. 22, 2025, which claims priority through a chain of continuations and continuations-in-part to U.S. patent application Ser. No. 18/417,511, filed Jan. 19, 2024.

This application is further related to U.S. patent application Ser. No. 19/536,124, entitled "NON-BYPASSABLE GOVERNANCE OF PARTITIONED CONTEXTUAL MEMORY FOR CONDITIONING EXECUTION," filed Feb. 10, 2026, through a chain of continuations and continuations-in-part to U.S. Provisional Patent Application No. 62/880,019, filed Jul. 29, 2019. No priority is claimed.

This application is also related to U.S. patent application Ser. No. 19/271,473, entitled "Pharmacy Surveillance and Intervention System for Monitoring, Detecting, and Preventing Narcotic Abuse," assigned to the same assignee. No priority is claimed.

The disclosures of the foregoing applications are incorporated by reference in their entirety. In the event of inconsistency, the present specification controls.

No subject matter is incorporated that would limit claim scope unless expressly stated.

FIELD OF THE INVENTION

The present disclosure relates generally to computer-implemented systems and methods for controlling execution of regulated workflows, and more particularly to systems and methods that technically govern whether downstream computer systems are permitted to accept, commit, finalize, dispatch, or otherwise effectuate operations that advance a workflow state under policy-defined constraints.

In some implementations, the disclosure relates to a governance control plane that evaluates machine-interpretable policy, maintains machine-executable authorization states associated with workflow instances, and enforces policy governed acceptance of reliance events at downstream acceptance endpoints. Such enforcement is applied at the point of downstream effectuation and is independent of where an artificial intelligence system, automated reasoning service, or human-assisted process generates an output or recommendation, and independent of how such output is characterized.

The disclosed systems and methods apply to workflows in which advancement of a computer-managed state carries regulatory, safety, compliance, or legal significance. Such workflows may incorporate artificial intelligence systems, automated decision-support services, human-assisted automation, or combinations thereof. Advancement of workflow state within these environments is evaluated under machine-interpretable policy and is permitted only upon satisfaction of policy-defined predicates at a defined reliance boundary.

The disclosure is directed to technical mechanisms that govern reliance on outputs—rather than output generation itself—by controlling, at downstream acceptance endpoints, computer acceptance of operations that advance a workflow state in distributed and multi-domain computing environments.

BACKGROUND OF THE INVENTION

Artificial intelligence and automated decision-support systems are increasingly integrated into regulated workflows in which computer systems are relied upon to advance operational states, commit or finalize records, dispatch actions, or authorize downstream execution. In healthcare and other compliance-sensitive environments, such systems may retrieve and summarize records, propose or prioritize actions, generate documentation, route tasks, or otherwise influence workflows that interact with systems of record, downstream services, devices, or regulated execution pathways.

Modern regulated workflows are commonly executed across multiple computing environments and administrative domains. A single workflow may involve an enterprise domain operating systems of record, one or more vendor application domains providing orchestration or user interfaces, cloud-hosted reasoning services producing analytic or generative outputs, patient-controlled or third-party data sources, and downstream networks including laboratories, pharmacies, payers, or device systems. Although responsibility for regulatory compliance and operational outcomes often remains centralized or shared, control over individual technical components is frequently distributed among independent parties.

Traditional enterprise workflow systems, including electronic medical record systems, were primarily designed for documentation, billing, scheduling, and administrative recordkeeping. Such systems are not architected to function as a validated control substrate operating under explicit policy scope and bound to verifiable provenance for high-speed automated or AI assisted workflow execution. Clinical and operational data is typically fragmented across heterogeneous sources with differing quality, latency, and completeness, and is subject to policy constraints that vary by role, purpose of use, jurisdiction, consent state, and time. As a result, regulated workflows often rely on implicit assumptions or manual processes to ensure that required conditions are satisfied prior to execution.

Existing approaches to artificial intelligence governance in regulated environments often emphasize model behavior, output characterization, or retrospective audit. Such approaches may label outputs as advisory or non-diagnostic, or log outputs for later review. However, such approaches do not control whether a downstream computer system accepts or executes a state-advancing operation in reliance on an output. As a result, workflow state advancement can occur without runtime verification, at the point of effectuation, that required policy predicates are satisfied, required actions have been completed within applicable constraints, and integrity conditions relating to provenance, authorization scope, or data validity have been evaluated.

In distributed and multi-party architectures, enforcement gaps are further exacerbated by architectural partitioning. A reasoning service may generate a proposed output in one administrative domain, an integration layer may perform write back or message dispatch in another domain, and a downstream system may execute an operational act in yet another domain. In such arrangements, no single component necessarily enforces end-to-end policy constraints at the moment a workflow state change is accepted. This fragmentation creates opportunities for bypass, omission, inconsistent enforcement, and post-hoc rationalization of non-compliant actions.

Moreover, existing systems typically treat audit records as retrospective artifacts rather than as technical preconditions to execution. Logs may record what occurred, but they do not prevent a downstream system from advancing workflow state when required policy-defined actions have not been completed or verified. As a result, compliance is often enforced procedurally or contractually rather than technically, leaving regulated systems vulnerable to silent failure modes and inconsistent application of policy constraints.

A computer-implemented control architecture is provided in which enforcement of policy-defined constraints occurs at the time a downstream system attempts to accept or execute a state-changing operation. The governance control plane evaluates an applicable policy snapshot, derives an authorization outcome for a workflow instance, and records the outcome in a governance record bound to an execution context identifier and policy snapshot identifier.

Downstream acceptance of a commit, finalize, dispatch, or execution request is conditioned on verification of the authorization state associated with the workflow instance and on validation of one or more governance artifacts referencing the execution context identifier and policy snapshot identifier. The governed connector applies the enforcement decision prior to permitting the downstream acceptance endpoint to complete the state-changing operation.

SUMMARY OF THE INVENTION

The present disclosure relates to computer-implemented systems and methods for controlling execution of regulated workflows by technically conditioning whether downstream computer systems are permitted to accept, commit, finalize, dispatch, execute, or otherwise effectuate state-changing operations. The disclosed systems do not regulate the generation of analytic, advisory, or decision-support outputs. Instead, they enforce policy governed execution at the reliance boundary, defined as the point at which a downstream system would otherwise accept an operation that advances workflow state or causes an operational act to occur.

In regulated environments, including clinical, healthcare, safety-critical, and compliance-sensitive domains, operational risk and regulatory exposure arise not from the mere production of recommendations or analyses, but from computer acceptance of actions that modify records, authorize execution, release holds, or trigger downstream processes. The disclosed systems therefore implement technical controls that prevent downstream acceptance of operations that advance a workflow state unless satisfaction of applicable policy conditions is proven at the time acceptance is attempted.

In some configurations, a governance control plane is implemented as a computer-executable enforcement layer that receives workflow events associated with a workflow instance and binds such events to a machine-readable execution context identifier.

The governance control plane evaluates a machine-interpretable policy snapshot applicable to the workflow instance and derives one or more required actions that must be completed prior to permitting downstream state advancement, and maintains a machine-executable authorization state for the workflow instance.

The governance control plane generates one or more governance records bound to the execution context identifier and the evaluated policy snapshot, such governance records being cryptographically verifiable where implemented.

In some configurations, downstream state advancement is mediated by a governed connector positioned at or prior to a downstream acceptance endpoint.

Non-limiting examples of downstream acceptance endpoints include write back, commit, finalize, dispatch, execution, or authorization endpoints at which a downstream system would otherwise accept a state-advancing operation.

The governed connector permits, blocks, or defers a downstream effectuation request only upon validation of a governance record or a readiness artifact derived therefrom, including cryptographic verification where implemented, thereby conditioning state change acceptance on verified policy satisfaction at the time effectuation is attempted.

In some implementations, evaluation of the policy snapshot produces an obligation set comprising one or more required actions and associated timing constraints. The governance control plane monitors workflow events against the obligation set and generates omission events when required actions are missing, incomplete, or untimely. Detection of an omission event causes the workflow instance to transition into a held or restricted authorization state that prevents downstream acceptance of operations that advance a workflow state until completion of the required action or a policy-authorized override is recorded as a governance artifact and validated, including cryptographic verification where implemented.

The governance control plane detects integrity exception events when one or more integrity predicates required for compliant execution are not satisfied. Integrity exception events may include failures associated with tool outputs, retrieved data, provenance verification, schema validation, authorization scope, or cryptographic linkage. Upon detection of an integrity exception event, the governance control plane applies a policy-defined response that blocks, defers, restricts, or escalates downstream effectuation until resolution of the integrity condition is recorded as a governance artifact and validated under the applicable execution context identifier and policy snapshot identifier.

Governance enforcement is independent of the location at which an artificial intelligence model executes and independent of descriptive labels applied to its output. Outputs may originate from local systems, enterprise platforms, cloud-hosted reasoning services, or third-party providers and may be characterized as advisory, non-diagnostic, or non-binding.

Acceptance of any such output into a regulated workflow constitutes a reliance event when the output is used to advance workflow state. Authorization of that reliance event is evaluated at the downstream acceptance endpoint under the applicable policy snapshot identifier and execution context identifier. Labeling of outputs does not alter the requirement that downstream acceptance is conditioned on verification of the corresponding governance artifacts.

In some implementations, the disclosed systems operate across multiple administrative domains, including combinations of enterprise systems, vendor applications, cloud reasoning services, and intermediary integration platforms.

A shared execution context identifier is propagated across domains to bind policy evaluation, authorization state, governance records, and downstream effectuation to the same workflow instance.

Partitioning reasoning, orchestration, and execution across parties does not bypass enforcement because downstream acceptance of a state-advancing operation remains conditioned on validation of governance artifacts bound to the execution context identifier and policy snapshot identifier, including cryptographic verification where implemented.

Governance records are maintained in an append only, tamper evident sequence of cryptographically linked records bound to a workflow instance through an execution context identifier and policy snapshot identifier. Each governance record encodes an authorization outcome, obligation status, or integrity determination applicable to a state-advancing operation.

Downstream effectuation is permitted only upon verification that required governance records exist and reflect satisfaction of policy-defined predicates under the bound execution context identifier and policy snapshot identifier.

Such governance records are validated prior to acceptance of a state-advancing operation, including cryptographic verification where implemented.

Governance records, policy snapshot identifiers, authorization outcomes, and readiness artifacts may be assembled into replayable evidence bundles sufficient to reconstruct and independently verify controlled state transitions.

The governance control plane supports patient-scoped and user-scoped workflows in which patient-directed authorization grants constrain downstream reliance. The governance control plane evaluates policy snapshots that incorporate one or more authorization grant objects associated with a patient identity and derives an authorization outcome for the workflow instance.

Downstream effectuation in a system of record is conditioned on verification that the requested action falls within the permitted scope, purpose-of-use constraints, and temporal bounds encoded in the applicable authorization grant object and policy snapshot identifier bound to the execution context identifier.

The disclosed systems implement a runtime enforcement mechanism in which advancement of a regulated workflow state is conditioned on verification of machine-generated authorization artifacts prior to downstream acceptance. Enforcement is applied at the point where a downstream acceptance endpoint would otherwise accept, commit, finalize, dispatch, or execute a state-changing operation.

Authorization is evidenced by one or more governance artifacts derived from an evaluated policy snapshot and bound to an execution context identifier.

A downstream acceptance endpoint permits state advancement only upon validation of the required artifact under defined scope and time constraints, including cryptographic verification where implemented.

Because authorization is evaluated at the point of effectuation rather than at output generation, advancement of workflow state remains conditioned on verifiable authorization state irrespective of the internal operation of upstream analytic or decision-support components.

DETAILED DESCRIPTION

Definitions

Figure 1:
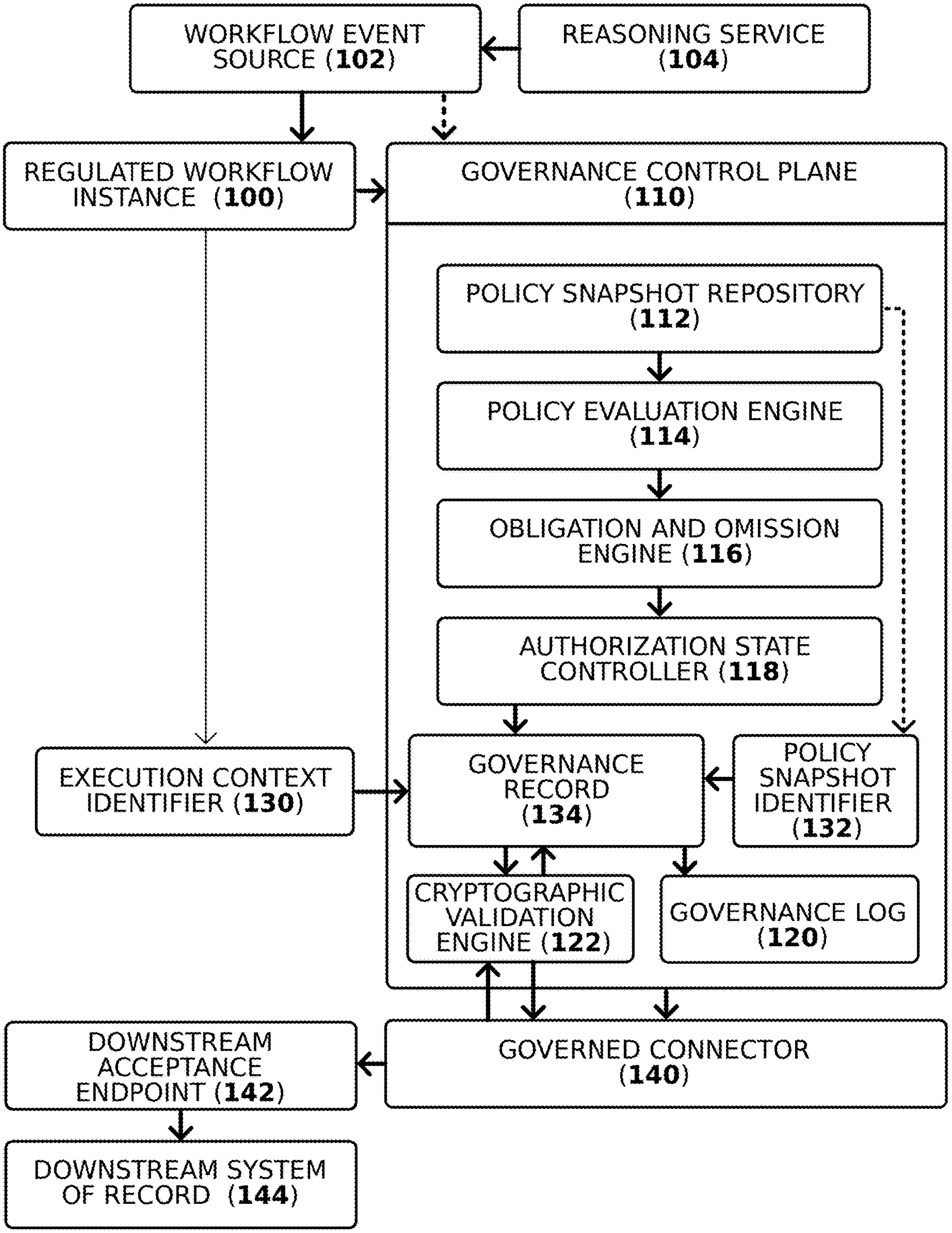
FIG. 1 is a block diagram illustrating an example system architecture for enforcing policy governed execution of a regulated workflow using a governance control plane and a governed connector that mediates downstream acceptance.

The disclosed systems and methods implement a computer-executed control framework for regulated workflows in which advancement of a workflow instance and acceptance of state-changing operations by downstream systems are conditioned on satisfaction of defined, machine-evaluable criteria.

Governance is implemented as executable logic that evaluates policy-defined predicates, maintains authorization state associated with a workflow instance, and applies effectuation gating at defined acceptance endpoints.

Advancement of workflow state is permitted only when compliance with applicable policy constraints is verified at the time a downstream operation is requested, embedding enforcement within execution pathways rather than relying solely on discretionary user behavior or retrospective review.

For purposes of this Detailed Description, defined terms are used with fixed technical meaning and denote structural components, data structures, state representations, and executable control mechanisms implemented within the described computer systems.

Each defined term corresponds to a concrete element of the disclosed architecture, including policy evaluation modules, authorization state controllers, governance records, cryptographic validation components, and acceptance endpoint controls.

These defined elements operate within a unified execution framework in which policy evaluation results, authorization state transitions, integrity verification, and downstream effectuation controls are programmatically linked under governance control.

A workflow instance refers to a machine-tracked execution of a regulated process whose progression is subject to institutional, regulatory, contractual, or patient-directed policy. Non-limiting examples include clinical workflows, medication workflows, operational workflows, financial workflows, safety-critical workflows, and compliance-sensitive workflows. Advancement of a workflow instance corresponds to a change in operational state, persistence of a record, authorization of an action, or initiation of downstream execution that produces real-world or legally relevant consequences.

A workflow instance identifier is a machine-readable identifier that uniquely identifies a particular execution of a regulated workflow over time and is used to correlate governance-relevant activity for that workflow instance. The workflow instance identifier correlates workflow events, policy evaluations, obligation sets, authorization states, governance records, readiness artifacts, and downstream effectuation attempts to the same governed workflow instance, and may persist across state transitions, retries, holds, overrides, and releases.

The workflow instance identifier may be implemented as, or derived from, a transaction identifier, process identifier, order identifier, encounter identifier, task identifier, or a composite identifier, provided it enables deterministic correlation for governance enforcement and replayability.

As used herein, "policy governed" refers to execution that is constrained by the governance control plane under an evaluated policy snapshot applicable to a workflow instance. Policy governed execution includes authorization state control and conditioning of acceptance at defined reliance boundaries based on validation of governance artifacts or readiness artifacts, including cryptographic verification where implemented.

An agent execution context is a structured, machine-readable data construct instantiated for a specific workflow instance and evaluated by the governance control plane to determine whether requested actions are permitted. The agent execution context comprises authorization-relevant attributes including authenticated identity, role classification, credential identifiers, organizational and jurisdictional scope, purpose-of-use constraints, temporal validity parameters, delegation limits, and one or more applicable policy snapshot identifiers. The agent execution context is bound to an execution context identifier and is attached to requests, tool invocations, connector interactions, and governance records such that policy evaluation and authorization state control are performed under a consistent policy basis.

A persona agent is a software-executed process that operates under an agent execution context and under a persona definition encoded as enforceable authorization parameters. The persona definition specifies permitted tool classes, permissible data scope, allowable action classes, delegation constraints, and effectuation pathways. The governance control plane evaluates each action taken by the persona agent under the bound execution context identifier and policy snapshot identifier and derives an authorization outcome prior to permitting reliance.

An execution context identifier is a unique, machine-generated identifier associated with a workflow instance and its corresponding agent execution context. The execution context identifier correlates policy evaluations, obligation sets, authorization outcomes, connector operations, and governance records across system components and administrative domains. All governance artifacts and authorization state transitions reference the execution context identifier to maintain deterministic binding of enforcement decisions to the workflow instance.

A governance control plane is a runtime governance and control subsystem implemented by one or more computing devices and executable instructions.

The governance control plane mediates execution of artificial intelligence systems, including model calls and tool use, evaluates machine-interpretable policy predicates, derives obligations, maintains machine-executable authorization states, and generates governance records.

The governance control plane enforces gating of downstream effectuation at defined acceptance endpoints and operates as an enforcement layer rather than solely as an advisory or monitoring component.

A governed connector is a computer-implemented runtime interface that mediates interaction between a governed workflow and an external system, service, device, or system of record. The governed connector evaluates requests and responses that may cause state advancement and applies policy-scoped permissions and validation predicates associated with the workflow instance.

Prior to permitting a state-advancing operation, the governed connector validates governance artifacts, including a governance record or readiness artifact bound to the execution context identifier and policy snapshot identifier. The downstream acceptance endpoint performs acceptance, write back, commit, finalize, dispatch, or execution only upon successful artifact validation under the applicable authorization state.

An effectuation, also referred to as downstream effectuation, is a computer-performed or computer-accepted operation that causes, commits, finalizes, dispatches, applies, executes, or otherwise produces a state change in a downstream system, workflow object, or controlled process. Effectuation includes write back to a system of record, commit or finalize operations, order release, message dispatch, scheduling confirmation, service invocation, device command execution, or any operation that advances a regulated workflow state.

An effectuation event occurs when such an operation is requested for acceptance at a downstream acceptance endpoint. The governance control plane evaluates the requested operation under the applicable execution context identifier and policy snapshot identifier. Acceptance of the operation by the downstream acceptance endpoint is conditioned on verification of the current authorization state and any required governance artifacts bound to the execution context identifier and policy snapshot identifier.

Effectuation is defined by the operational consequence of state advancement and applies irrespective of whether initiation originates from a human user, an automated agent, or an external service.

A downstream acceptance endpoint is an endpoint, interface, service boundary, or system function at which an effectuation event is accepted, committed, finalized, dispatched, applied, or otherwise causes state advancement. Acceptance operations include finalize, commit, submit, sign, place-order, send, dispatch, apply, execute, schedule, activate, or functionally equivalent operations by which a downstream system accepts an instruction, payload, or command and advances a regulated workflow state.

A reliance event is an event at which a downstream system accepts content, instructions, or outputs to advance a regulated workflow state. A reliance event may occur through user-interface actions, automated API calls, service invocations, queue processing, workflow engine transitions, or other downstream acceptance mechanisms. Reliance is determined by state advancement under the applicable execution context identifier and policy snapshot identifier, not by descriptive labeling of the underlying output.

An 'attempted reliance event' refers to submission of a state-advancing operation for acceptance, whether or not acceptance occurs.

An acceptance endpoint refers to a technical interface, service boundary, system function, or control point at which a downstream system, workflow engine, device controller, or recordkeeping system accepts, commits, finalizes, dispatches, applies, or otherwise operationalizes content, instructions, or commands such that a regulated workflow state is advanced or a downstream effectuation occurs.

An acceptance endpoint may be implemented as an application programming interface, message handler, workflow transition, signing operation, commit or finalize function, device command interface, or equivalent system function. An acceptance endpoint represents the moment of reliance at which governance enforcement is applied. In some configurations, a downstream acceptance endpoint is a specific class of acceptance endpoint associated with a downstream system of record or execution system.

Completion semantics refer to machine-enforced conditions that determine whether a workflow instance or effectuation pathway is permitted to complete or advance. Audit conditioned completion is a form of completion semantics in which advancement is conditioned on existence and validation of one or more governed audit records demonstrating satisfaction of policy-defined prerequisites.

In audit conditioned completion, audit artifacts operate as technical preconditions to effectuation rather than solely as retrospective logs.

An authorization outcome refers to a machine-produced decision result generated by the governance control plane, or by a delegated validation arbiter acting on its behalf, indicating whether a requested action, tool invocation, or effectuation event is permitted, restricted, deferred, modified, held, escalated, or denied under an applicable policy snapshot and current authorization state. An authorization outcome may further specify associated obligations, evidentiary requirements, or constraints required for subsequent advancement.

An authorization state is a machine-maintained state value associated with a workflow instance that represents whether, and under what constraints, state-advancing operations are currently permitted. The authorization state is bound to an execution context identifier and to an applicable policy snapshot identifier. The authorization state is stored and updated by the governance control plane and is referenced at a downstream acceptance endpoint when determining permissibility of a requested effectuation event.

An authorization state machine is a machine-executable controller that governs transitions among authorization states for a workflow instance. The authorization state machine evaluates transition guards derived from an applicable policy snapshot, obligation status, integrity predicates, and recorded governance artifacts. A transition between authorization states occurs only when the evaluated transition guard predicates are satisfied under the execution context identifier and policy snapshot identifier associated with the workflow instance.

A hold state is an authorization state in which acceptance of a state-advancing operation at a downstream acceptance endpoint is conditioned on satisfaction of one or more defined predicates. While a workflow instance is in a hold state, the downstream acceptance endpoint evaluates the current authorization state and any required governance artifacts prior to permitting effectuation.

A transition guard is a machine-executable gating mechanism that conditions advancement of a workflow state or acceptance of an effectuation event on satisfaction of defined predicates.

Transition guards verify one or more policy prerequisites, obligation completion states, authorization outcomes, validity of governance artifacts, or integrity conditions under the applicable execution context identifier and policy snapshot identifier.

Transition guards differ from advisory warnings in that they prevent or defer state advancement when required predicates are not satisfied.

An administrative domain is a computing, operational, legal, or security boundary under which system components operate subject to a common administrative authority, credential infrastructure, and policy governance framework. A regulated workflow may span multiple administrative domains, including enterprise systems, vendor-hosted services, cloud-based reasoning platforms, and integration layers.

A policy snapshot is a versioned, machine-interpretable representation of policy evaluated for a workflow instance at a defined point in time. The policy snapshot encodes policy predicates, obligation definitions, authorization constraints, override rules, and integrity predicates applicable to the workflow instance.

A policy predicate refers to a machine-evaluable condition expressed in a policy snapshot that determines whether a governed action or effectuation event is permitted, restricted, deferred, or denied. Policy predicates include conditions based on role, identity, purpose of use, jurisdiction, data class, workflow state, temporal bounds, evidence sufficiency, obligation completion status, and authorization grant object constraints.

A policy predicate evaluates to a satisfied or non-satisfied result that is machine-recordable and usable as a transition-guard input.

An obligation is a policy-derived required action, condition, or evidentiary prerequisite that must be satisfied for a workflow instance to remain permitted to advance or for downstream effectuation to be accepted under an applicable policy snapshot.

Obligations are generated through evaluation of a policy snapshot and may include acknowledgements, confirmations, reviews, attestations, supervisory approvals, secondary verification, evidence capture, disclosure accounting, or other enforceable prerequisites.

An obligation may include associated constraints, including role constraints, ordering constraints, evidentiary sufficiency requirements, and temporal bounds, which are evaluated by the governance control plane when determining permissibility of a state-advancing operation.

An obligation set refers to a machine-readable collection of one or more obligations and associated constraints derived from evaluation of a policy snapshot for a workflow instance. The obligation set defines the conditions that must be satisfied before authorization state transitions or downstream effectuation are permitted.

A governed omission event is a structured governance event generated when an obligation within an obligation set is not completed in accordance with its defined constraints. A governed omission event is bound to an execution context identifier and a policy snapshot identifier and is recorded as a governed audit record. The governed omission event identifies the affected obligation, the applicable constraint, and the workflow instance to which it applies.

As used herein, 'omission event' is a synonym for 'governed omission event' unless expressly stated otherwise.

A policy-defined response refers to a machine-executed control action selected in accordance with a policy snapshot in response to a governance condition, including an omission event or integrity exception event. Policy-defined responses include, without limitation, transitioning a workflow instance into a hold or restricted state, blocking or deferring downstream acceptance endpoints, requiring additional evidence or verification, escalating to supervisory review, restricting tool permissions, downgrading autonomy, or suspending further actions until compliance is restored.

A non-retention attestation or non-training attestation is a machine-verifiable assertion indicating that specified governed data, context objects, outputs, or artifacts will not be retained, reused, incorporated into model training, fine-tuning, analytics, or secondary processing beyond a defined scope or time window. The attestation is bound to an execution context identifier and a policy snapshot identifier and is recorded as a governance artifact when required by an applicable policy snapshot.

When an applicable policy snapshot defines presentation or verification of a non-retention attestation or non-training attestation as a required obligation, satisfaction of that obligation is determined by recording a corresponding governance record bound to the execution context identifier and policy snapshot identifier. Evaluation of the obligation occurs at the time a reliance event is requested at a downstream acceptance endpoint.

A tool invocation refers to a governed request issued under an agent execution context to access an external capability, interface, connector, or function. Tool invocations include, without limitation, data retrieval, transformation, validation, write back, dispatch, messaging, scheduling, or device command operations, together with any returned tool output. Tool invocations are subject to policy predicates, integrity predicates, and authorization state, and may be permitted, modified, deferred, restricted, or denied by the governance control plane.

A governed context object means a machine-constructed, policy governed representation of information used for reasoning, validation, authorization, or downstream effectuation within a regulated workflow. A governed context object is derived from one or more source records, observations, signals, or inputs and is constructed under control of the governance control plane according to applicable policy constraints, including minimum necessary selection, purpose of use restrictions, temporal bounds, provenance binding, and redaction rules.

In some implementations, a governed context object includes structured data, normalized fields, summaries, embeddings, feature vectors, or other machine-usable representations, together with provenance metadata and a bound policy snapshot identifier identifying the policy basis under which the object was constructed.

A governed context object is an integrity-protected, policy-scoped data construct whose creation, modification, transmission, and use are recorded in governed audit records bound to an execution context identifier and a policy snapshot identifier.

Each governed context object includes structured content or machine-usable representations together with provenance metadata and a bound policy snapshot identifier identifying the policy basis under which the object was constructed.

Use of a governed context object within a workflow instance remains subject to authorization state evaluation and effectuation gating at a downstream acceptance endpoint under the applicable policy snapshot identifier.

Use of a governed context object does not, by itself, authorize downstream effectuation. Downstream acceptance of any action derived from a governed context object remains subject to authorization state evaluation and audit conditioned completion under the applicable policy snapshot.

Evidence binding refers to a machine-verifiable association between an output, proposed action, or authorization outcome and one or more referenced supporting records, governed context objects, governance artifacts, or events. Evidence binding may include cryptographic digests, timestamps, provenance identifiers, and policy snapshot identifiers, such that the factual and policy basis for reliance and downstream effectuation can be reconstructed and independently verified.

A validation arbiter refers to a component that evaluates candidate outputs or candidate actions against governance criteria, including policy predicates, integrity predicates, evidence sufficiency, and authorization state, and that produces an authorization outcome controlling whether an output or action is permitted, modified, suppressed, deferred, or escalated prior to downstream effectuation.

An integrity predicate refers to a machine-evaluable condition that determines whether required integrity, provenance, binding, and verification constraints are satisfied for governed context, tool outputs, governance artifacts, or effectuation pathways. Integrity predicates include, without limitation, signature verification, digest matching, provenance consistency, schema validation, chain completeness, freshness checks, and detection of prompt-injection or output-manipulation indicators.

An integrity exception event is a governed event indicating that one or more integrity predicates required for safe and compliant execution are not satisfied. Non-limiting examples include failed signature verification, missing or mismatched policy snapshot identifiers, corrupted or unverifiable tool outputs, schema violations, provenance inconsistencies, prompt-injection indicators, or discontinuities in a governed audit chain. An integrity exception event triggers a policy-defined response, including holding, blocking, escalation, or requiring additional confirmation prior to downstream effectuation.

A governance record is a machine-generated, authorization-bearing record that encodes an authorization outcome applicable to a state-advancing operation for a workflow instance.

A governance record is bound to an execution context identifier and a policy snapshot identifier and is stored in a tamper evident governance log.

A governance record may be referenced directly or used to derive a readiness artifact for presentation at a downstream acceptance endpoint when conditioning effectuation.

A governed audit record is an integrity-protected record that captures a governance-relevant event associated with a workflow instance.

Governed audit records include policy evaluations, obligation satisfaction events, omission events, integrity exception events, authorization state transitions, and enforcement outcomes.

Each governed audit record is bound to an execution context identifier and a policy snapshot identifier and is stored in a tamper evident governance log.

A governance log is an append only, tamper evident data structure that stores governed audit records and governance records associated with workflow instances.

The governance log preserves completeness, ordering, and authenticity of recorded governance decisions over time and supports cryptographic linkage sufficient to detect modification, deletion, or reordering of stored records.

Where implemented, the governance log includes or is associated with an exportable or archival representation used for evidence bundling and replay, referred to herein as a governance log archive, enabling independent verification of recorded governance activity.

A governance artifact is a machine-verifiable object generated, evaluated, or validated by the governance control plane to evidence an authorization outcome or to satisfy a policy-defined condition associated with a workflow instance. Each governance artifact is cryptographically bound to an execution context identifier and to a policy snapshot identifier.

Governance artifacts include governance records, governed audit records, readiness artifacts, authorization grant objects, disclosure accounting entries, integrity exception event records, exported evidence bundles, and associated cryptographic linkage information maintained by the governance control plane.

A policy snapshot identifier is a deterministic reference to a specific evaluated policy snapshot applicable to a workflow instance. The policy snapshot identifier may comprise or include a cryptographic digest derived from the policy snapshot and is bound to governance records, authorization outcomes, and readiness artifacts to preserve evaluative traceability.

An execution context identifier is a machine-readable identifier used to correlate governance activity, authorization state, and state-advancing operations for a workflow instance across system components and administrative domains. Governance records and readiness artifacts reference the execution context identifier when determining permissibility of a reliance event.

A readiness artifact is a machine-verifiable authorization artifact derived from one or more governance records and usable by a governed connector and/or a downstream acceptance endpoint to determine whether a requested effectuation or other state-advancing operation is permitted under an applicable policy snapshot.

A readiness artifact is bound to an execution context identifier, a policy snapshot identifier, a defined action scope, and a defined temporal validity window, and evidences a recorded authorization outcome under the applicable policy snapshot. In embodiments, a readiness artifact may further evidence satisfaction of one or more policy-required attestations or prerequisites evaluated under the applicable policy snapshot, including non-retention attestations, non-training attestations, data-handling attestations, disclosure acknowledgments, supervisory approvals, or other machine-verifiable assurances. Presentation and successful validation of a readiness artifact at a defined reliance boundary conditions acceptance of a state-advancing operation, and validation outcomes are recorded in the governance log to preserve auditability and cryptographic traceability under the bound execution context identifier and policy snapshot identifier.

An authorization grant object is a machine-readable authorization artifact that evidences and encodes a grant of access rights or effectuation permissions applicable to a regulated workflow or governed data scope.

An authorization grant object specifies, in enforceable form, one or more permitted data classes, permitted action classes, permitted recipients, purpose-of-use constraints, time bounds, revocation conditions, and integrity assertions. In embodiments, the authorization grant object may be cryptographically protected.

The authorization grant object is evaluated by the governance control plane as a policy input or predicate when determining whether retrieval, disclosure, delegation, or downstream effectuation is permitted, and operates as an enforceable governance control rather than as a descriptive or advisory record. Authorization grant objects include consent records, capability tokens, delegated authority assertions, and equivalent authorization constructs.

A patient identity vault is a machine-readable, governed identity repository that maintains durable bindings between a patient identity and associated authentication factors, authorization artifacts, and policy preferences. The patient identity vault stores and enforces patient-directed identity assertions, authorization grant objects, consent constraints, revocation rules, and related governance metadata under control of the governance control plane. The patient identity vault may operate independently of any single institution identity system and may support cross-institution reconciliation so that patient identity bindings can be validated and enforced across multiple administrative domains without requiring a unified enterprise identifier. Changes to patient identity bindings or authorization preferences are treated as governed events and are recorded in governed audit records bound to the applicable execution context identifier and policy snapshot identifier.

A patient-controlled longitudinal store or index is a machine-readable repository or reference structure under patient-directed governance that maintains longitudinal patient-related information, or governed references thereto, across time and institutional boundaries.

The patient-controlled longitudinal store or index may store normalized data, structured summaries, document fingerprints, content-addressable identifiers, or pointers sufficient to retrieve, verify, or replay underlying source records under an applicable authorization grant object, and is not limited to a particular storage architecture or to custody of full source records.

Access to, disclosure from, or update of the patient-controlled longitudinal store or index is mediated by the governance control plane and is conditioned on policy scope, purpose-of-use constraints, revocation state, and audit conditioned completion, thereby preserving patient control, provenance, and cross-institution auditability.

Disclosure accounting is a governed audit ledger that records, in machine-verifiable form, disclosures of regulated data associated with a workflow instance or patient identity.

Disclosure accounting records identify what data or governed references were disclosed, to whom the disclosure was made, when the disclosure occurred, under which authorization grant object, and under which policy snapshot identifier the disclosure was permitted. In embodiments, disclosure accounting entries are maintained as governed audit records bound to an execution context identifier.

Disclosure accounting entries are integrity-protected and support regulatory compliance, patient-directed access reporting, and replayable verification of policy governed data sharing without requiring disclosure of unrelated protected content.

A system of record refers to an authoritative information system that maintains records with operational, regulatory, or legal effect for a regulated workflow. A system of record includes, without limitation, electronic health record systems, laboratory information systems, radiology or imaging systems, pharmacy systems, scheduling systems, admission-discharge-transfer systems, billing systems, device management platforms, medication dispensing systems, and other regulated recordkeeping systems. A system of record may be operated by an enterprise, an institutional partner, or a third party, and acceptance of an operation by a system of record constitutes reliance for purposes of governance enforcement.

A patient agent registry refers to a governed registry that associates patient identifiers, and where applicable encounter identifiers, with corresponding patient scoped persona agent instances and agent execution contexts. The patient agent registry governs lifecycle events including creation, activation, suspension, merging, splitting, and termination of patient scoped agents under policy control and records such events in governed audit records.

A patient specific engram memory module is a governed, patient-scoped memory structure that stores one or more engram entries addressable by deterministic keys and supports bounded-time retrieval within a workflow instance.

The patient specific engram memory module includes an engram gate configured to suppress, attenuate, or reject use of an engram entry when incompatible with governed context, provenance constraints, policy scope, or defined integrity predicates.

Creation, retrieval, update, and use of engram entries are auditable as governed events and, where defined by policy, may be conditioned as prerequisites to downstream effectuation under the applicable execution context identifier and policy snapshot identifier.

An engram entry refers to a stored element in a patient specific engram memory module comprising a deterministic lookup key and an associated representation, template, feature bundle, embedding, or structured object. An engram entry may further include references to underlying governed records or episodes, provenance metadata, and a bound policy snapshot identifier identifying the policy basis under which the entry was admitted.

A compatibility score is a machine-computed evaluation produced by an engram gate indicating whether an engram entry is eligible for use within a current execution context.

The compatibility score is derived from governance-controlled criteria including policy scope compatibility, provenance consistency, temporal validity, integrity predicate satisfaction, and binding to a policy snapshot identifier.

The compatibility score may be represented as a Boolean determination, categorical classification, or numeric value and is used by the governance control plane to determine whether the engram entry is incorporated into governed context construction under the applicable execution context identifier and policy snapshot identifier.

Governance Control Plane

The governance control plane comprises a computer-executed subsystem implemented by one or more processors and associated memory that maintains execution control over regulated workflow instances.

For each workflow instance, the governance control plane maintains a current authorization state and enforces authorization state transitions in response to evaluated policy predicates and recorded governance events.

The governance control plane interfaces with defined acceptance endpoints such that any request to advance workflow state or perform a state-changing operation is subject to real-time authorization evaluation prior to downstream effectuation.

Advancement is permitted only when the governance control plane determines, based on the applicable policy snapshot and recorded workflow state, that required conditions are satisfied at the time of the requested operation.

The governance control plane receives workflow events, context objects, proposed actions, and effectuation requests associated with a workflow instance and evaluates such inputs against an applicable policy snapshot. Based on this evaluation, the governance control plane derives machine-executable authorization outcomes bound to the execution context identifier and policy snapshot identifier.

The governance control plane applies the derived authorization outcome at defined acceptance endpoints by permitting, blocking, deferring, or holding downstream effectuation through governed connectors prior to any state change within a downstream system.

In operation, the governance control plane receives workflow events from one or more sources, including governed connectors, user interface instrumentation, orchestration components, external services, and tool invocation pathways.

Each received event is bound to an execution context identifier that correlates the event to a specific workflow instance and to an applicable policy snapshot.

The governance control plane evaluates each event against the current authorization state, applicable policy predicates, and any outstanding obligations derived from prior policy evaluations under the bound execution context identifier and policy snapshot identifier.

The governance control plane includes a policy evaluation subsystem configured to interpret and execute a policy grammar expressed in a machine-interpretable form. The policy grammar defines conditions under which regulated actions are permitted, restricted, held, escalated, or denied and specifies required actions, role constraints, timing constraints, evidence requirements, and override conditions applicable to the workflow instance.

Evaluation of the policy grammar yields one or more authorization predicates and, in some implementations, an obligation set defining required actions that must be completed prior to permitting downstream reliance at a defined acceptance endpoint.

The governance control plane further includes an obligation and omission subsystem configured to monitor satisfaction of policy-defined required actions derived from an evaluated policy snapshot.

The subsystem observes subsequent workflow events and compares observed activity against the applicable obligation set and associated time constraints under the bound execution context identifier and policy snapshot identifier.

When a required action is missing, incomplete, or untimely, the governance control plane generates a governed omission event and applies a policy-defined response, including transitioning the workflow instance into a held or restricted authorization state or restricting downstream effectuation at a defined acceptance endpoint.

An authorization state controller within the governance control plane maintains a machine-executable authorization state for each workflow instance.

The authorization state represents whether the workflow instance is permitted to advance, is restricted, or is held pending satisfaction of policy-defined prerequisites under an applicable policy snapshot.

The authorization state controller transitions between authorization states based on policy evaluation outcomes, obligation completion or omission events, integrity exception events, and verification of governance artifacts recorded in the governance log and bound to the execution context identifier.

The governance log is a tamper evident data structure that stores governance records and governed audit records associated with a workflow instance. The governance log is referenced by the governance control plane and by governed connectors when evaluating whether a requested state-advancing operation is permitted under the execution context identifier and policy snapshot identifier.

At a downstream acceptance endpoint, verification includes determining whether a readiness artifact corresponding to the requested state-advancing operation exists and whether the readiness artifact is bound to the correct execution context identifier and policy snapshot identifier.

Verification further includes validating integrity of the readiness artifact and associated governance records under the execution context identifier and policy snapshot identifier.

Integrity validation may include signature validation, hash-chain continuity where applicable, temporal validity of bound timestamps, and authenticity of credential proofs referenced by the execution context identifier.

The governed connector performs such validations prior to permitting effectuation at the downstream acceptance endpoint.

In one configuration, the governance control plane derives a readiness artifact from one or more governed audit records that satisfy the applicable policy predicates for a proposed effectuation.

The readiness artifact is a machine-verifiable authorization artifact bound to the execution context identifier and policy snapshot identifier and constrained to a defined action class and time window.

The readiness artifact evidences satisfaction of policy-defined prerequisites and is presented to a governed connector or downstream acceptance endpoint as a condition precedent to downstream effectuation.

In some implementations, the readiness artifact includes a reference to one or more governed audit records that satisfied the predicates used to issue the readiness artifact.

Authorization to advance a regulated workflow state is determined at the time a reliance event is requested at a downstream acceptance endpoint.

The governance control plane evaluates permissibility under the execution context identifier and applicable policy snapshot identifier in view of the current authorization state and recorded governance artifacts.

Effectuation is conditioned on validation of required governance artifacts bound to the execution context identifier and policy snapshot identifier prior to acceptance of the state-advancing operation.

Verification of required governance artifacts is applied at the downstream acceptance endpoint irrespective of where analytic processing or reasoning occurs within the system architecture.

Acceptance of a state-advancing operation is conditioned on validation of a readiness artifact bound to the execution context identifier and policy snapshot identifier.

Such conditioning applies regardless of the location or characterization of upstream analytic or decision-support components.

Runtime verification at the downstream acceptance endpoint applies the evaluated policy constraints associated with the execution context identifier and policy snapshot identifier. A state-advancing operation is permitted only upon successful validation of the required governance artifacts under those identifiers.

Policy Grammar and Policy Snapshots

Policy governing execution of a regulated workflow is expressed using a machine-interpretable policy grammar evaluated by the governance control plane to produce enforceable authorization outcomes. The policy grammar encodes technical constraints that define the conditions under which effectuation events are permitted, restricted, deferred, or blocked.

The policy grammar comprises a structured, machine-executable representation of policy rules that define predicates, required obligations, and state-transition conditions applicable to a workflow instance.

Each rule is expressed in a formal syntax interpretable by the governance control plane and is evaluated at runtime in association with a defined execution context identifier. The policy grammar governs authorization for state advancement by evaluating contextual attributes, recorded workflow events, and current authorization state to determine whether a proposed effectuation is permitted, restricted, deferred, or denied, such authorization being based on satisfaction of defined contextual and temporal predicates rather than solely on initiation authority.

The policy grammar defines one or more policy constraints, including, without limitation, role or credential requirements, purpose of use restrictions, data scope limitations, provenance requirements, integrity predicates, temporal constraints, multi-party approval conditions, escalation requirements, override authorization rules, and audit evidence requirements. Each policy constraint is expressed in a form executable by the governance control plane and yields a deterministic authorization outcome when evaluated against workflow context.

The policy grammar further defines obligation constructs that specify required actions that must be completed prior to permitting downstream reliance. Obligations may include acknowledgements, confirmations, reviews, attestations, approvals, supervisory sign-off, secondary verification, or other policy-defined prerequisites, each obligation being associated with one or more constraints including time bounds, role restrictions, ordering requirements, or evidence requirements.

Failure to satisfy an obligation within a defined constraint results in generation of a governed omission event and application of a policy-defined response under the applicable execution context identifier and policy snapshot identifier.

The governance control plane binds each authorization outcome to the execution context identifier and the applicable policy snapshot identifier.

The bound authorization outcome is recorded in the governance log as a governance record associated with the workflow instance.

Downstream acceptance of a state-advancing operation is conditioned on validation of the recorded authorization outcome under the execution context identifier and policy snapshot identifier.

Governance records are stored in an append only, cryptographically linked sequence in which each record references a prior record to form a tamper evident chain. The cryptographic linkage preserves ordering and integrity of governance records associated with a workflow instance under the execution context identifier and policy snapshot identifier.

Verification of the governance log includes validation of the cryptographic linkage between records to confirm that no modification, deletion, or reordering has occurred within the recorded sequence.

In operation, upon receipt of a workflow event or effectuation request, the governance control plane selects an applicable policy snapshot based on attributes of the execution context, including workflow type, organizational domain, jurisdictional scope, patient or customer preferences, risk classification, and temporal context. The selected policy snapshot is then evaluated against the current workflow state, execution context attributes, and any outstanding obligations.

Evaluation of the policy snapshot produces one or more authorization predicates indicating whether a proposed effectuation is permitted, restricted, deferred, or denied. Evaluation may further yield an obligation set defining required actions that must be completed prior to permitting downstream reliance.

The resulting authorization predicates and obligation set are consumed by the authorization state controller and governed connectors to enforce execution constraints at defined acceptance endpoints rather than functioning solely as advisory outputs.

The distinction between policy evaluation and effectuation is maintained by binding authorization outcomes to the execution context identifier and policy snapshot identifier at the time of evaluation and by conditioning downstream acceptance of a state-advancing operation on validation of those bound identifiers.

The policy grammar further supports expression of override rules defining conditions under which an otherwise restricted or held workflow state may be advanced upon presentation of authorized override evidence.

Override rules may require additional credentials, multiparty approval, elevated roles, justification records, or supervisory attestations under constraints defined in the applicable policy snapshot.

Override outcomes are recorded as governed audit records bound to the execution context identifier and policy snapshot identifier and are evaluated by the authorization state controller when determining permissibility of downstream effectuation.

In certain embodiments, the policy grammar supports compositional policies, in which multiple policy snapshots apply concurrently or sequentially to a workflow instance. For example, a base institutional policy snapshot may apply to all workflows, while additional domain-specific or patient specific policy snapshots apply to particular action classes. Authorization is determined by evaluating the combined constraints of applicable policy snapshots and enforcing the most restrictive applicable outcome.

The governance control plane evaluates a machine-interpretable policy grammar and produces a versioned policy snapshot associated with a workflow instance. The policy snapshot defines predicates governing permissibility of specified state-advancing operations under a defined execution context identifier.

At the time a reliance event is requested at a downstream acceptance endpoint, the governance control plane evaluates the requested operation against the policy snapshot associated with the execution context identifier. The resulting authorization outcome is recorded as a governance record bound to the execution context identifier and policy snapshot identifier.

Acceptance of the requested state-advancing operation is conditioned on validation of a readiness artifact derived from the recorded authorization outcome. The governed connector performs verification of the readiness artifact prior to permitting effectuation.

Obligation Sets

In some implementations, evaluation of a policy snapshot by the governance control plane yields an obligation set comprising one or more required actions that must be completed as a technical precondition to permitting workflow advancement or downstream effectuation. An obligation set is a machine-executable representation of policy-imposed duties and is not merely a reminder, checklist, or advisory prompt.

Each obligation set is bound to a specific workflow instance and execution context identifier and is derived deterministically from the evaluated policy snapshot and the governed context associated with the workflow instance. The obligation set specifies what actions must occur, who is authorized to perform them, within what constraints, and what evidence is required to demonstrate completion.

In certain embodiments, an obligation set includes, without limitation: required acknowledgements, confirmations, reviews, independent checks, supervisory approvals, override justifications, attestations, validations, or other policy-defined actions. Obligations may further require that actions be performed by specific authenticated roles, credential classes, or organizational authorities and may enforce separation-of-duties or dual-control constraints.

Each obligation in the obligation set may include one or more completion constraints, including time bounds, ordering constraints, dependency relationships, scope restrictions, and evidence requirements. Time bounds may define a maximum permitted delay between triggering of the obligation and its completion. Ordering constraints may require that certain obligations be satisfied before others are eligible for completion. Dependency relationships may require satisfaction of a prerequisite obligation prior to permitting completion of a dependent obligation.

In some implementations, each obligation specifies at least an evidence requirement and a timing parameter that bounds recognition of completion.

In some configurations, an obligation further specifies acceptable evidence types for completion. Evidence types may include structured confirmations, authenticated approvals, cryptographically signed attestations, recorded acknowledgements, completion of a governed task, validation of an integrity predicate, or existence of a governed audit record satisfying defined attributes. Completion of an obligation is recognized only when acceptable evidence is recorded in a governed audit record bound to the execution context identifier and policy snapshot identifier.

Omission events are recorded as governed audit records within the governance log and are bound to the execution context identifier and policy snapshot identifier associated with the workflow instance. An omission event is evaluated by the authorization state controller when determining permissibility of subsequent state-advancing operations.

In one arrangement, generation of an omission event causes the authorization state controller to transition the workflow instance into a held or restricted authorization state. While in such a state, reliance events and downstream effectuation are blocked, deferred, or escalated according to the policy grammar. The workflow instance remains constrained until the omitted obligation is completed or an authorized override is recorded and verified.

In one configuration, the obligation set explicitly defines override conditions under which an unmet obligation may be bypassed. Override conditions may require elevated credentials, multi-party approval, justification capture, additional attestations, or supervisory authorization. Override actions are themselves treated as governed actions and must be completed under defined constraints and recorded as governed audit records bound to the same execution context identifier and policy snapshot identifier.

An obligation set associated with a workflow instance may be updated in response to new governance events recorded under the execution context identifier and policy snapshot identifier. Each modification to the obligation set is recorded as a governed audit record bound to the workflow instance and referenced during subsequent authorization state evaluations.

Where implemented, an obligation set defines one or more policy-derived requirements that must be satisfied prior to authorization of a state-advancing operation. The governance control plane evaluates status of each required obligation at the time a reliance event is requested by referencing governed audit records bound to the execution context identifier and applicable policy snapshot identifier.

A workflow instance is not advanced unless the evaluated authorization state reflects satisfaction of all required obligations or recording of an authorized override meeting policy-defined criteria, such evaluation being applied at the acceptance endpoint responsible for downstream effectuation When a policy snapshot defines presentation or verification of a non-retention attestation or non-training attestation as a required obligation, downstream acceptance of a state-advancing operation is conditioned on existence of a governance record evidencing satisfaction of that obligation under the execution context identifier and policy snapshot identifier. If such a governance record is absent at the time a reliance event is requested, the governed connector applies the enforcement decision prior to permitting effectuation.

Each obligation set is represented as a machine-executable data structure derived from an evaluated policy snapshot and bound to a corresponding execution context identifier.

The governance control plane determines obligation satisfaction by referencing recorded workflow events and governed audit records and updates the authorization state of the workflow instance accordingly.

A state transition permitting workflow advancement is executed only when the authorization state reflects satisfaction of all obligations in the applicable obligation set or when an authorized override meeting policy-defined criteria is recorded, such satisfaction or override being recognized upon persistence of a governance record that satisfies defined integrity and evidentiary predicates under the execution context identifier and policy snapshot identifier.

Authorization States

The governance control plane maintains, for each governed workflow instance, an authorization state machine that defines and enforces whether the workflow instance is permitted to advance, is restricted, or is suspended pending satisfaction of policy-defined conditions. Authorization states are machine-maintained execution states and are not user interface indicators, warnings, or advisory flags.

Each authorization state represents a current permission status of the workflow instance with respect to reliance events and downstream effectuation. The authorization state is bound to the execution context identifier and the applicable policy snapshot identifier and is deterministically derived from policy evaluation outcomes, obligation-set status, integrity predicates, and recorded governance artifacts.

In some implementations, the authorization state machine comprises a plurality of discrete authorization states that include a permitted state in which workflow advancement and effectuation are allowed, and one or more non-permitted states in which advancement is blocked, deferred, or conditionally limited. Non-limiting examples of authorization states include PROPOSED, ACTIVE, HELD, RESTRICTED, ESCALATED, OVERRIDDEN, RELEASED, and CLOSED. The specific set of states and permissible transitions is defined by the applicable policy grammar and may vary according to workflow type, institutional policy, jurisdiction, or risk classification.

State transitions are governed by transition guards, each transition guard being a machine-executable predicate that conditions movement between authorization states on verification of policy-defined requirements.

A transition guard may require completion of all obligations in an applicable obligation set, recording of a valid governed audit record, verification of a policy snapshot identifier or digest, satisfaction of defined integrity predicates, or presence of required attestations. Where defined by the policy grammar, a transition guard may further require authorization of an override under separation-of-duties or multi-party constraints prior to permitting state advancement.

In some implementations, transition guards are evaluated using deterministic checks over recorded artifacts and predicate results, subject to inclusion of any required human-approval evidence.

In operation, when a workflow event is received or a reliance event is requested, the governance control plane evaluates the current authorization state and applicable transition guards associated with the workflow instance.

If the transition guard predicates are satisfied under the execution context identifier and applicable policy snapshot identifier, the authorization state machine transitions the workflow instance to a next permitted state.

If the predicates are not satisfied, the workflow instance remains in its current state or transitions to a more restrictive state, and the attempted transition is blocked or deferred at the defined acceptance endpoint.

While a workflow instance remains in a hold state, acceptance of a state-advancing operation at a downstream acceptance endpoint is conditioned on satisfaction of the predicates required to transition the workflow instance out of the hold state under the applicable execution context identifier and policy snapshot identifier.

In some configurations, release from a hold state requires verification of a governed audit record that demonstrates satisfaction of the applicable obligation set or authorized override conditions. Verification includes confirming that the audit record references the correct execution context identifier and policy snapshot identifier and satisfies role, timing, and integrity predicates enforced by the governance control plane.

In some implementations, override transitions are explicitly represented in the authorization state machine. An override transition permits advancement despite an unmet obligation only when override conditions defined by the policy grammar are satisfied. Override transitions may require elevated credentials, multi-party approval, justification capture, additional attestations, or supervisory authorization. Override actions are recorded as governed audit records and are subject to the same integrity and non-repudiation requirements as other transitions.

Verification of required governance artifacts is applied at the downstream acceptance endpoint under the execution context identifier and policy snapshot identifier associated with the workflow instance. Acceptance of a state-advancing operation is conditioned on validation of the corresponding readiness artifact irrespective of the internal location of analytic processing components within the system architecture.

In one arrangement, the authorization state machine supports replayability and auditability. Each state transition is recorded in the governance log as a governed audit record, including the prior state, the new state, the triggering event, the applicable policy snapshot identifier, and any evidence relied upon. This enables reconstruction of the exact authorization trajectory of a workflow instance for compliance review, incident investigation, or legal discovery.

In such embodiments, each workflow instance is represented within the governance control plane as an authorization state machine in which state transitions are conditioned on evaluation of policy-defined predicates and satisfaction of associated obligations.

Transition guards are implemented as executable checks that reference the applicable policy snapshot identifier, execution context identifier, and corresponding governance records recorded in the governance log.

A requested state transition is permitted only when the transition guard evaluates to an authorization outcome allowing advancement under the current authorization state; if the guard conditions are not satisfied, the transition is rejected or deferred in accordance with the evaluated policy constraints, and the enforcement outcome is recorded in the governance log.

Reliance Events

Governance enforcement is triggered by occurrence or attempted occurrence of a reliance event. A reliance event refers to an operation at which a downstream system, user, or automated process relies upon content, instructions, or outputs to advance a regulated workflow state or to cause execution of a state-changing action.

A reliance event is determined based on the operational effect of a requested or performed action at a defined acceptance endpoint. An action constitutes a reliance event when it causes, or would cause, persistence, authorization, dispatch, execution, or transition of a regulated workflow state. Classification or labeling of upstream content does not alter this determination.

In one configuration, reliance events include, without limitation:

- acceptance of content into a regulated record;
- commit, finalize, sign, or post operations;
- write back to a system of record;
- release, dispatch, or execution of an order or instruction;
- invocation of a tool or connector that causes a state change;
- clearance of a hold or restriction state; or
- completion of a workflow step that enables downstream execution.

Reliance events include actions performed by a human operator when such actions advance a regulated workflow state. Manual actions, including signing, approving, releasing, or committing content, are evaluated under the applicable policy snapshot and authorization state at the time of the state-advancing operation.

A reliance event may occur even when AI-derived content is not directly transmitted to a downstream system.

When such content is manually incorporated into a regulated workflow object and followed by a commit, finalize, sign, submit, or equivalent state-advancing operation, the governance control plane evaluates authorization for the requested advancement under the execution context identifier and applicable policy snapshot identifier.

The governed connector conditions acceptance at the downstream acceptance endpoint on the resulting authorization state and validation of any required governance artifacts prior to permitting effectuation.

Manual incorporation includes copying, pasting, paraphrasing, editing, re-entering, dictating, templating, or otherwise introducing AI-derived content into a system of record or workflow object. Such incorporation may occur through graphical interfaces, structured templates, macros, voice input, or free-text entry.

The method by which AI-derived content is obtained, including integrated connector delivery or out-of-band interaction, does not alter evaluation at the point of state advancement.

The governance control plane detects reliance events through governed connectors, user-interface instrumentation, acceptance endpoints, or workflow orchestration components. Detection includes monitoring API calls, commit or finalize actions, state-transition requests, message dispatches, or other indicators that a regulated system is about to perform a state-advancing operation.

When a reliance event is detected or requested, the governance control plane evaluates the current authorization state of the workflow instance under the applicable policy snapshot.

The governance control plane evaluates transition guard predicates associated with the workflow instance to determine whether advancement is authorized under the current authorization state.

The evaluation is performed under the execution context identifier and applicable policy snapshot identifier in view of recorded governance artifacts.

A governed connector conditions acceptance of the state-advancing request at the downstream acceptance endpoint on verification that required governance artifacts are present, valid, and bound to the execution context identifier and policy snapshot identifier prior to permitting effectuation.

Authorization of a reliance event is based on verification of one or more governed audit records that evidence satisfaction of policy-defined prerequisites.

The verified governed audit records reference the execution context identifier and the applicable policy snapshot identifier associated with the workflow instance.

The verified records demonstrate completion of required obligations, resolution of omission events, and satisfaction of defined integrity predicates within applicable time constraints prior to permitting downstream effectuation.

The governed connector performs verification of the referenced governed audit records and any associated readiness artifact before invoking the downstream acceptance endpoint for the requested state-advancing operation.

Attempted reliance events that are not permitted under the current authorization state are recorded as governed audit records, including the attempted action, the applicable policy snapshot identifier, and the enforcement outcome.

Where a policy snapshot requires AI-use attestation, provenance designation, supervisory confirmation, or another condition associated with manual incorporation, the governance control plane derives a corresponding obligation bound to the execution context identifier.

The derived obligation is incorporated into the applicable obligation set for the workflow instance under the evaluated policy snapshot identifier.

The governance control plane monitors completion of the derived obligation and conditions subsequent reliance events on satisfaction of that obligation where required by the policy grammar.

If a required obligation is not satisfied within the applicable policy-defined time window, the governance control plane generates a governed omission event under the execution context identifier and policy snapshot identifier.

The authorization state controller transitions the workflow instance to a non-permissive authorization state based on the recorded omission event.

The governed connector references the updated authorization state when evaluating subsequent reliance events at a downstream acceptance endpoint.

A commit, finalize, or sign operation involving AI-derived content requires existence of a governance record encoding an authorization outcome under the applicable policy snapshot identifier and bound to the execution context identifier.

A governed connector mediating the operation validates a readiness artifact derived from the governance record before permitting the downstream acceptance endpoint to complete the operation.

If a required readiness artifact is absent, invalid, expired, or outside a defined action scope or time window, the governed connector determines that authorization for the requested state-advancing operation is not satisfied.

The determination is made under the execution context identifier and applicable policy snapshot identifier.

The governed connector applies the enforcement decision at the downstream acceptance endpoint prior to any state change.

Authorization evaluation at defined reliance boundaries is based on the operational effect of the requested action on workflow state and is independent of the manner in which the content was generated, edited, or introduced.

Omission Events

The governance control plane treats failure to perform a policy-defined required action within a specified time window as a governed event referred to as an omission event.

Omission events are machine-detected and policy-evaluated conditions that alter the authorization state of a workflow instance. The authorization state controller incorporates omission events when determining whether reliance events and downstream effectuation are permitted under the applicable policy snapshot identifier.

The governance control plane derives, from evaluation of an applicable policy snapshot, an obligation set bound to the workflow instance and associated execution context identifier.

The obligation set defines required actions and corresponding time constraints applicable to the workflow instance under the evaluated policy snapshot identifier.

Required actions may include acknowledgements, confirmations, reviews, attestations, supervisory approvals, escalation responses, override approvals, or completion of prerequisite governance artifacts as defined by the policy grammar.

The governance control plane monitors observed workflow events associated with the workflow instance and compares such events against the applicable obligation set. When a required action is not completed within the corresponding policy-defined time constraint, the governance control plane detects an omission under the evaluated policy snapshot.

Upon detecting the omission, the governance control plane generates a governed omission event bound to the execution context identifier and policy snapshot identifier under which the obligation was derived.

In certain embodiments, the omission event is recorded as a governed audit record in the governance log.

The omission event record identifies the missing or incomplete required action, the applicable time constraint, the workflow instance, and the evaluated policy snapshot identifier.

The omission event record includes timestamps and associated metadata sufficient to establish that the omission occurred under the evaluated policy state and bound execution context identifier.

In response to generation of a governed omission event, the authorization state controller transitions the workflow instance into a held or restricted authorization state under the applicable policy snapshot identifier.

While the workflow instance remains in such a state, reliance events and downstream effectuation requests are evaluated under the updated authorization state.

The governed connector withholds invocation of the downstream acceptance endpoint for requested state-advancing operations unless a transition guard defined by the policy grammar is satisfied.

A governed omission event is evaluated by the authorization state controller as an input to authorization state transition logic. The omission event is referenced at a downstream acceptance endpoint when determining permissibility of a subsequent state-advancing operation. Acceptance of a reliance event while an omission condition remains unresolved is conditioned on satisfaction of the predicates required to clear the omission under the applicable policy snapshot identifier.

In some implementations, the policy grammar defines one or more policy-defined responses to omission events. Non-limiting examples include placing the workflow instance in a hold state, preventing write back or finalize operations, downgrading autonomy for subsequent actions, requiring supervisory review, escalating notifications to authorized roles, or requiring completion of the omitted action prior to permitting further advancement.

In some configurations, resolution of an omission event requires completion of the missing required action or recording of an authorized override satisfying policy-defined criteria. Completion or override is recorded in a governed audit record bound to the same execution context identifier and policy snapshot identifier. The authorization state controller permits transition out of the held or restricted state only after verification that the omission has been resolved in accordance with the policy grammar.

Where implemented, omission events apply equally to actions that did not occur at all and to actions that occurred outside permitted timing constraints. An action performed after expiration of a policy-defined time window is treated as an omission unless the policy grammar expressly permits late completion or authorized override.

Omission detection is triggered based on failure to complete a required action within the applicable policy-defined time window for the workflow instance, as evaluated under the execution context identifier and policy snapshot identifier.

When a policy snapshot defines a required action with an associated completion semantic, the governance control plane recognizes completion of that required action only upon recording of a governance record bound to the execution context identifier and the applicable policy snapshot identifier.

Upon derivation of a required action under a policy snapshot, the authorization state controller maintains the workflow instance in a non-permissive authorization state until the required action is completed and recorded as a governance record satisfying defined integrity and evidentiary predicates.

If the required action is not completed within the applicable policy-defined time window, the governance control plane records an omission event bound to the execution context identifier and policy snapshot identifier. The workflow instance remains in a non-permissive authorization state until either the required action is completed or an authorized override satisfying policy-defined release conditions is recorded.

Governed Connectors

In certain embodiments, the governance control plane enforces policy governed execution of regulated workflows through one or more governed connectors that mediate access to downstream systems, services, and acceptance endpoints at which reliance events and state advancement would otherwise occur.

A governed connector is a computer-implemented enforcement component positioned to mediate requests directed to a downstream acceptance endpoint. Forwarding of a state-advancing operation to the downstream acceptance endpoint is conditioned on evaluation by the governed connector under the applicable execution context identifier and policy snapshot identifier.

In operation, a governed connector receives a request to perform a state-advancing action associated with a workflow instance. Non-limiting examples include write back of data to a system of record, commit or finalize of a record, release of an order, dispatch of a message, invocation of a downstream service, scheduling of an action, or execution of a device command.

Prior to forwarding a requested state-advancing operation, the governed connector references the current authorization state associated with the execution context identifier and determines whether prerequisite governance artifacts are required for the requested action class.

In particular embodiments, the governed connector requires presentation of a readiness artifact derived from one or more governed audit records associated with the workflow instance.

The readiness artifact is a machine-verifiable authorization artifact bound to the execution context identifier and applicable policy snapshot identifier, including cryptographic binding where implemented.

The readiness artifact evidences that required actions have been completed or that an authorized override satisfying policy predicates has been recorded under the evaluated policy snapshot.

The governed connector verifies that the readiness artifact corresponds to the workflow instance and references the correct execution context identifier and policy snapshot identifier or digest.

The governed connector further verifies that the readiness artifact indicates an authorization outcome permitting the requested effectuation within the defined action scope and validity window.

Verification may include cryptographic signature validation, integrity checks, scope validation, and expiration checks prior to forwarding the state-advancing operation.

If verification succeeds, the governed connector forwards the requested operation to the downstream acceptance endpoint. If verification fails, or if the readiness artifact is absent, invalid, expired, or outside defined scope, the governed connector withholds forwarding of the operation and records the enforcement outcome in a governed audit record.

In one configuration, the governed connector records the enforcement outcome—including permit, block, or defer—in a governed audit record associated with the workflow instance. This record provides traceability of enforcement actions and enables replay and independent verification of policy governed execution.

The recorded enforcement outcome specifies whether the operation was blocked, deferred, or rejected under the evaluated policy predicates.

The governed connector performs readiness artifact validation using the execution context identifier and policy snapshot identifier associated with the workflow instance, irrespective of distribution of upstream analytic components.

Where reasoning, orchestration, or integration components are deployed across administrative domains, governed connectors enforce authorization at the connector boundary by requiring verification of governance artifacts bound to the execution context identifier and policy snapshot identifier prior to forwarding a state-advancing operation.

In certain embodiments, governed connectors enforce write-side controls distinct from read-side operations. Advisory computation, analysis, or recommendation generation may occur without restriction; however, write back, commit, finalize, dispatch, or execution operations that would advance a regulated workflow state are mediated by governed connectors and are permitted only upon verification of policy satisfaction.

In some configurations, governed connectors are deployed at multiple points in a workflow, including between orchestration components and systems of record, between external services and enterprise systems, and between internal subsystems responsible for execution. Each governed connector enforces the same authorization state and readiness-artifact verification semantics, ensuring consistent enforcement regardless of deployment topology.

At the defined acceptance boundary, forwarding of a state-advancing operation is conditioned on verification of the current authorization state and associated governance artifacts bound to the execution context identifier and policy snapshot identifier.

The governance control plane operates according to a defined enforcement control loop that governs detection of reliance events, policy evaluation under a policy snapshot identifier, recording of governance artifacts, derivation of readiness artifacts, and gating at downstream acceptance boundaries. The following sections describe structural components of this enforcement loop in detail. A consolidated description of the enforcement loop is provided below.

Governance Log

The governance control plane maintains a governance log implemented as an append only, integrity-protected sequence of governed audit records associated with workflow instances.

Each governed audit record is generated by the governance control plane and is bound to a specific execution context identifier and a specific policy snapshot identifier or digest. The governed audit record records, at minimum, an authorization outcome indicating whether a reliance event or state transition was permitted, blocked, deferred, or held under the evaluated policy snapshot.

In certain embodiments, governed audit records further include one or more of: timestamps; authenticated role or credential identifiers; references to completed required actions or authorized overrides; identifiers for omission events or integrity exception events; enforcement outcomes applied by governed connectors; and references to readiness artifacts issued for downstream effectuation.

The governance log is maintained in a tamper evident form such that post-hoc modification, deletion, or reordering of governed audit records is detectable. Tamper-evidence may be implemented using cryptographic techniques including hash chaining, digital signatures, append only ledger structures, or equivalent integrity-preserving mechanisms that provide detectable alteration under the execution context identifier associated with a workflow instance.

Each governed audit record may include a cryptographic linkage to one or more prior records in the governance log, forming an ordered chain of records associated with a workflow instance identified by an execution context identifier. Validation of the cryptographic linkage permits verification of record ordering, completeness, and continuity and enables detection of selective removal or alteration of governance evidence.

The governance log is referenced by the governance control plane during authorization state evaluation. Advancement of a workflow instance past a controlled boundary is conditioned on the existence and verification of one or more governed audit records bound to the execution context identifier and policy snapshot identifier and satisfying applicable policy-defined predicates.

Before forwarding a reliance event to a downstream acceptance endpoint, the governed connector verifies a readiness artifact derived from one or more governed audit records associated with the workflow instance.

The readiness artifact is bound to the execution context identifier and policy snapshot identifier for the workflow instance and encodes or references an authorization outcome applicable to the requested state-advancing operation, including cryptographic binding where implemented.

The governed connector verifies integrity and identifier binding of the readiness artifact prior to forwarding the requested operation; when verification fails, the governed connector withholds forwarding and records the enforcement outcome in the governance log.

Governed audit records function as inputs to transition guards within the authorization state model.

When a workflow instance is in a held or restricted authorization state, the authorization state controller transitions the workflow instance to a permitted state only upon recording of a governed audit record evidencing completion of required actions or an authorized override under the applicable policy snapshot identifier.

Following such transition, the governed connector verifies integrity and identifier binding of the relevant governed audit record prior to forwarding a state-advancing operation to a downstream acceptance endpoint.

The governance log supports reconstruction and replay of regulated workflows. Each governed audit record contains or references recorded workflow events, authorization outcomes, omission events, integrity exception events, and enforcement decisions, and is bound to an execution context identifier and a policy snapshot identifier.

Replay is performed by evaluating the recorded governance artifacts against the policy snapshot identifier bound to the execution context identifier at the time each event was recorded, thereby enabling deterministic reconstruction of policy-governed state transitions.

The governance log supports independent verification based on recorded governance artifacts without reliance on proprietary application logs. Governed audit records include authorization outcomes, timestamps, references to readiness artifacts where applicable, and enforcement outcomes recorded at defined acceptance boundaries. By evaluating these recorded artifacts against the bound execution context identifier and policy snapshot identifier, a verifier can determine whether downstream effectuation was authorized only after satisfaction and recording of applicable policy-defined prerequisites.

Cryptographic linkage, when combined with consistent binding of governed audit records to a shared execution context identifier and policy snapshot identifier, permits verification that actions performed across multiple administrative domains were recorded as part of the same governed workflow instance.

The exported records retain cryptographic linkage information, execution context identifiers, and policy snapshot identifiers sufficient to verify record integrity, ordering, and continuity. Independent replay and validation are performed by evaluating the exported governance artifacts against the policy snapshot identifier corresponding to each recorded event without requiring access to the originating live system.

The governance log is an append only, integrity-protected data structure that stores governed audit records and associated governance artifacts for regulated workflow instances.

Each entry is bound to an execution context identifier and a policy snapshot identifier and is protected using hash chaining, digital signatures, or equivalent tamper evident integrity mechanisms where implemented.

The ordered sequence of governed audit records permits deterministic reconstruction of recorded policy evaluations, derived obligations, authorization state transitions, and enforcement outcomes at defined reliance boundaries.

System Architecture

The governance control plane is implemented as a distributed computer system comprising a plurality of cooperating software and hardware modules that collectively enforce policy gated reliance and audit conditioned completion for regulated workflows.

The governance control plane receives workflow events from heterogeneous sources and evaluates applicable policy constraints against governed context associated with a workflow instance.

The governance control plane monitors satisfaction of required obligations and maintains a machine-executable authorization state bound to the execution context identifier and policy snapshot identifier.

Governed connectors condition downstream effectuation at defined acceptance endpoints based on the current authorization state and associated governance artifacts maintained by the governance control plane.

The governance control plane operates as a logical control layer distinct from reasoning services, user interface components, orchestration logic, and systems of record. Governance enforcement is applied at defined reliance boundaries through governed connectors that reference authorization state and governance artifacts maintained by the governance control plane rather than embedding enforcement logic within proprietary model implementations or vendor-specific workflows.

In certain embodiments, the governance control plane comprises one or more of the following modules, implemented in software, firmware, hardware, or combinations thereof:

- an event ingestion module configured to receive normalized workflow events from governed connectors, user-interface instrumentation, orchestration services, and external integrations, and to associate each event with a workflow instance identified by an execution context identifier,
- a policy evaluation module configured to select and evaluate a policy snapshot from a policy snapshot repository and to execute policy grammar rules against governed context associated with the workflow instance;

- an obligation and omission module configured to derive obligation sets, monitor completion of required actions within policy-defined time windows, and generate omission events when required actions are missing, incomplete, or untimely;
- an authorization state controller configured to maintain and transition machine-executable authorization states for workflow instances based on policy evaluation results, omission events, integrity exception events, and verification of governance artifacts;
- a cryptographic validation module configured to verify integrity, authenticity, and scope of governance artifacts, including governed audit records, readiness artifacts, validation tokens, and verification of binding between governance artifacts and the applicable policy snapshot identifier; and
- a governance log subsystem configured to persist governed audit records in an append only, tamper evident form and to provide integrity-protected retrieval for verification, replay, and evidence bundle generation.

The modules of the governance control plane operate in coordinated sequence to evaluate policy predicates and derive obligation sets for a workflow instance.

The modules further monitor authorization state transitions and generate governed audit records bound to the execution context identifier and policy snapshot identifier.

These coordinated operations ensure that policy evaluation, obligation monitoring, authorization state control, and audit persistence are programmatically linked within a single enforcement framework.

A state-advancing operation is forwarded to a downstream acceptance endpoint only after the governance control plane verifies satisfaction of applicable policy-defined prerequisites and persistence of corresponding governed audit records in the governance log.

The governance control plane receives normalized workflow events from heterogeneous enterprise and external systems through governed connectors and integration interfaces.

Incoming events may originate in vendor-specific formats, protocols, or schemas. In such embodiments, the system includes an event normalization layer that transforms heterogeneous inputs into a normalized event representation suitable for policy evaluation and traceable enforcement.

Each normalized event is bound to an execution context identifier and, where applicable, a workflow instance identifier. Event normalization enables consistent application of policy grammar, obligation monitoring, and authorization state logic across heterogeneous vendor systems and deployment configurations.

The system architecture distinguishes between read-side operations that generate advisory or analytical outputs and write-side operations that constitute reliance events capable of advancing a regulated workflow state.

Governance enforcement is applied at defined write-side acceptance boundaries. Governed connectors mediate write back, commit, finalize, dispatch, execution, or acceptance operations and condition such operations on verification of governance artifacts bound to the execution context identifier and policy snapshot identifier prior to forwarding a state-advancing request.

Write-side operations include reliance events that cause persistence, state advancement, dispatch, execution, or other downstream effectuation within a system of record or controlled process.

In such embodiments, enforcement at the write-side boundary renders downstream systems technically incapable of advancing a regulated workflow state absent verification of required governance artifacts.

Accordingly, advisory computation or read-side processing may occur without restriction, while state-advancing operations remain conditioned on validation performed by governed connectors under the applicable execution context identifier and policy snapshot identifier.

Deployment of reasoning services, orchestration components, or user interface modules independently of the governance control plane does not alter enforcement at defined acceptance boundaries. Governed connectors apply verification of authorization state and governance artifacts prior to forwarding any state-advancing operation.

In some configurations, governed connectors are deployed at one or more controlled boundaries corresponding to acceptance endpoints of downstream systems of record or execution systems.

When a governed connector receives a state-advancing request, the governed connector verifies that required governance artifacts exist, are valid, and are bound to the applicable execution context identifier and policy snapshot identifier associated with the workflow instance.

Verification may include validation of readiness artifacts, governance records, validation tokens, and associated integrity predicates defined under the applicable policy snapshot.

Verification may include validation of readiness artifacts, governed audit records, validation tokens, and associated integrity predicates defined under the applicable policy snapshot.

If verification fails, the governed connector blocks, defers, or rejects the request and records the enforcement outcome in the governance log.

Where workflow processing spans multiple administrative domains, acceptance of a state-advancing operation at a downstream acceptance endpoint remains conditioned on verification of authorization state and governance artifacts bound to the execution context identifier and policy snapshot identifier.

The governance control plane supports generation of exportable evidence bundles comprising governed audit records, execution context identifiers, policy snapshot identifiers, and associated integrity artifacts sufficient for independent validation and replay as described herein.

Replay and independent verification of such evidence bundles are performed by evaluating included governance artifacts against the policy snapshot identifier bound to each recorded event.

These evidence bundles are usable by replay engines, auditors, regulators, or courts to reconstruct the sequence of policy evaluations, authorization state transitions, omission events, integrity exception events, and downstream effectuation decisions for a workflow instance.

Because evidence bundles are derived from the governance log and retain integrity-protected linkage, replay and verification can be performed without reliance on proprietary application logs or live system access.

The governance control plane and governed connectors are implemented using general-purpose computing hardware, including servers, virtual machines, containers, or cloud-based compute services.

In certain embodiments, portions of the system are implemented within trusted execution environments, secure enclaves, hardware security modules, or dedicated compliance appliances to enhance integrity and isolation.

Enforcement is applied at defined acceptance boundaries by governed connectors that verify authorization state and governance artifacts bound to the execution context identifier and policy snapshot identifier, irrespective of deployment configuration.

Enforcement Loop

The governance control plane operates according to a core enforcement loop that governs reliance events and workflow state advancement in regulated environments.

The governance control plane evaluates policy predicates and derives obligation sets under a policy snapshot identifier bound to a workflow instance. The authorization state controller maintains and transitions machine-executable authorization states under the execution context identifier. Governed connectors condition forwarding of state-advancing operations on verification of the current authorization state and associated governance artifacts.

In operation, the governance control plane receives a workflow event through a governed connector, normalized event interface, or internal orchestration module. Each received event is associated with a regulated workflow instance and is bound to a machine-readable execution context identifier.

The execution context identifier identifies the workflow instance across components and administrative domains and is propagated with the event. The governance control plane associates the event with a governed context snapshot comprising policy scoped data elements relevant to the workflow instance.

The governance control plane records each governed audit record under the execution context identifier and the applicable policy snapshot identifier.

Binding of the governed audit record to these identifiers preserves traceability of authorization state transitions and enforcement outcomes to the policy basis in effect at the time of the recorded event.

Such binding supports deterministic reconstruction and verification of policy-governed workflow progression.

The policy snapshot identifier references the immutable or versioned policy grammar previously defined and bound to the execution context identifier for the workflow instance.

The governance control plane evaluates each recorded event to determine whether the event constitutes a reliance event or a candidate state-advancing operation requiring write-side authorization enforcement.

Evaluation includes determining permitted actions, restricted actions, required actions, timing constraints, role constraints, integrity predicates, and override conditions defined by the policy grammar.

Recorded governance artifacts are retained in the governance log for subsequent verification by governed connectors at acceptance boundaries and by replay or audit processes evaluating the execution context identifier and policy snapshot identifier associated with the workflow instance.

Based on the policy evaluation, the governance control plane derives an obligation set comprising one or more required actions that must be completed in order for the workflow instance to advance or for a reliance event to be authorized.

In some implementations, each obligation in an obligation set is represented as a machine-readable obligation record that includes (i) an obligation identifier, (ii) an associated required action class, and (iii) completion constraints. The completion constraints specify at least an evidence requirement and a validity parameter defining when completion is recognized, and may further specify an authorized role or credential class and a time window within which completion must be recorded.

In some implementations, the governance control plane detects non-satisfaction of an obligation by evaluating whether acceptable completion evidence, bound to the execution context identifier and policy snapshot identifier, has been recorded within the applicable completion constraints.

When non-satisfaction is detected, the governance control plane generates a governed omission event (also referred to herein as an omission event) and records the governed omission event as a governed audit record bound to the execution context identifier and the policy snapshot identifier.

The authorization state controller updates the authorization state of the workflow instance based on policy evaluation results and recorded governance events.

Recorded governance events include obligation completion status, governed omission events, integrity exception events, and verified override evidence evaluated under the applicable policy snapshot.

The resulting authorization state is bound to the execution context identifier and is referenced at defined reliance boundaries when determining permissibility of subsequent state-advancing operations.

When a transition guard is evaluated, the governance control plane determines whether the corresponding policy predicates evaluate to a satisfied result for the workflow instance under the applicable policy snapshot. When the evaluated result indicates non-satisfaction, the governance control plane records the evaluated outcome and applies the policy-defined response associated with that predicate result.

Authorization state transitions are policy-defined and machine-executable, such that transition eligibility is evaluated using transition guards that reference the applicable policy snapshot, recorded governance events, and verified governance artifacts. Where a policy requires human approval or external confirmation, the transition guard conditions incorporate the corresponding recorded approval or confirmation evidence as a prerequisite to advancement.

As part of each iteration of the core enforcement loop, the governance control plane generates one or more governed audit records reflecting policy evaluation outcomes, obligation completion or omission, authorization state transitions, and enforcement decisions.

The governance control plane maintains a governance log for workflow instances. In some implementations, the governance log is implemented as an append only data structure that stores governance records and governed audit records. In tamper evident implementations, the governance log further includes cryptographic linkage, including hash chaining and/or digital signatures, such that modification, deletion, or reordering of records is detectable.

A reliance event includes an attempted state-advancing operation submitted to an acceptance endpoint, including commit, finalize, sign, dispatch, execute, or other operations that would, upon acceptance, advance a regulated workflow state. For purposes of governance enforcement, the attempted operation is evaluated as a reliance event at the time it is submitted for acceptance.

Prior to permitting a state-advancing operation, a governed connector or downstream acceptance endpoint verifies a governance artifact applicable to the requested operation.

In some implementations, the governance artifact comprises a readiness artifact derived from one or more governed audit records and bound to (i) an execution context identifier, (ii) a policy snapshot identifier, (iii) an action class scope, and (iv) a validity time window. Acceptance is conditioned on successful verification of the binding fields and satisfaction of any policy-defined predicates applicable at the time of the request.

In some implementations, the governance control plane produces an enforcement decision for a requested state-advancing operation, and the governed connector applies the enforcement decision at the downstream acceptance endpoint. In other implementations, the governed connector applies enforcement by verifying a readiness artifact issued under the governance control plane without requiring a live command channel, provided that verification confirms the binding fields, scope, and validity window required for the requested operation.

In some implementations, acceptance of a state-advancing operation is conditioned on the existence of a corresponding governance artifact that is either (i) presented with the operation request or (ii) retrievable by reference from the governance log, and on verification performed by the governed connector prior to forwarding the operation for acceptance.

Verification includes confirming that the governance artifact encodes binding fields consistent with the workflow instance and the applicable policy snapshot identifier. Verification further includes confirming that the governance artifact encodes an authorized action class scope and a validity time window applicable to the requested state-advancing operation.

Integrity of the governance artifact is confirmed using cryptographic validation where implemented prior to permitting downstream acceptance.

The governed connector verifies that a presented readiness artifact (i) is cryptographically valid, (ii) is within a defined validity interval, (iii) encodes an authorized action class scope applicable to the requested operation, and (iv) is bound to the execution context identifier and policy snapshot identifier associated with the workflow instance.

Verification includes cryptographic validation of digital signatures and hash chaining sufficient to confirm authenticity and integrity of the readiness artifact, and evaluation of integrity predicates associated with the artifact under the applicable policy snapshot.

The governed connector forwards the state-advancing operation to the downstream acceptance endpoint only upon successful verification of the readiness artifact under the execution context identifier and policy snapshot identifier.

The governance control plane executes the core enforcement loop for each subsequent workflow event, attempted state-advancing operation, or policy-relevant state change associated with the workflow instance, such that authorization state and obligation satisfaction are re-evaluated under the applicable policy snapshot for each event instance.

Policy evaluation, obligation monitoring, authorization state control, and governance artifact verification are performed at each defined reliance boundary. Acceptance of a state-advancing operation is conditioned on verification under the applicable execution context identifier and policy snapshot identifier at the time the operation is requested.

Such conditioning applies regardless of workflow duration, administrative domain boundaries, or involvement of multiple human or automated actors.

The governance control plane applies policy evaluation and authorization verification at each detected state-advancing operation associated with a workflow instance. Authorization is not established solely at workflow initiation.

For each attempted state-advancing operation, the governance control plane re-evaluates the current authorization state associated with the workflow instance.

The governance control plane further evaluates outstanding obligations, integrity predicates, and required governance artifacts under the applicable policy snapshot identifier prior to permitting advancement.

A downstream acceptance endpoint processes the operation only after verification performed by a governed connector confirms that the evaluated conditions permit advancement under the execution context identifier and policy snapshot identifier.

Governance Across External Platforms and Application Interfaces

In one configuration, one or more reasoning services, artificial intelligence models, or decision-support components are hosted outside a regulated enterprise boundary and are accessed through one or more application programming interfaces. In such embodiments, model execution, prompt processing, tool orchestration, and intermediate artifact generation may occur within a vendor application domain, a cloud service domain, or another external administrative domain distinct from the regulated enterprise.

The governance control plane applies policy evaluation and authorization enforcement at defined reliance boundaries associated with regulated workflow instances. Enforcement is based on detection of state-advancing operations and associated governance artifacts, irrespective of the hosting location of reasoning services or the descriptive characterization of outputs by a vendor platform.

In certain embodiments, an enterprise system transmits governed context objects to an externally hosted reasoning service via an API. The reasoning service processes the governed context and returns one or more outputs, intermediate artifacts, recommendations, or action proposals.

Returned outputs generated by an external reasoning service do not themselves advance a regulated workflow state.

When content derived from such outputs is incorporated into a regulated system, submitted for commit, finalized, dispatched, or otherwise used in a state-advancing operation, the operation is evaluated as a reliance event under the execution context identifier and applicable policy snapshot.

The governance control plane performs policy evaluation and updates authorization state, and the governed connector conditions acceptance of the operation on verification of the corresponding readiness artifact.

In these embodiments, governed connectors positioned at enterprise controlled boundaries mediate acceptance of AI-generated outputs into regulated systems of record, invocation of downstream tools, and execution of state-advancing actions. The governed connectors enforce that downstream effectuation occurs only upon verification of a governance artifact demonstrating satisfaction of policy predicates under an evaluated policy snapshot.

Execution of a reasoning service outside the enterprise boundary does not alter enforcement at defined acceptance boundaries. Acceptance of a state-advancing operation remains conditioned on verification of authorization state and governance artifacts bound to the execution context identifier and policy snapshot identifier within the regulated enterprise domain.

In some implementations, an AI platform, application, or vendor labels outputs as advisory, assistive, non-diagnostic, or non-binding. Such labels are not treated as determinative of governance applicability.

Governance enforcement is triggered by detection of a reliance event as previously defined, including submission of a state-advancing operation to an acceptance endpoint or any operation that would modify a system of record under the execution context identifier.

In these embodiments, acceptance of an output into a regulated record, clearance of a hold state, execution of a downstream command, or authorization of a workflow transition constitutes a reliance event regardless of how the output was labeled at generation time.

By anchoring enforcement to reliance rather than labeling, the governance control plane prevents semantic reclassification or contractual characterization of outputs from altering or bypassing technical enforcement at the reliance boundary.

In certain embodiments, tool invocations, connector operations, and downstream service calls initiated directly or indirectly by a reasoning service are treated as governed actions.

The governance control plane records, in a governed audit record, identifiers of the requested operation, references or cryptographic digests of returned artifacts where applicable, and the integrity predicates evaluated during enforcement.

When a tool invocation or connector-mediated operation constitutes a state-advancing operation, forwarding of that operation to a downstream acceptance endpoint is conditioned on evaluation of applicable policy predicates and verification of a governance artifact bound to the execution context identifier and policy snapshot identifier.

If integrity predicates or scope constraints evaluate to non-satisfaction, the governance control plane generates an integrity exception event recorded as a governed audit record. The authorization state controller then applies the corresponding policy-defined response prior to permitting or denying downstream forwarding.

Automated orchestration pathways and agent-driven tool calls are evaluated under the same reliance-boundary enforcement conditions as human-initiated state-advancing operations.

The governance control plane evaluates integrity predicates applicable to tool outputs, retrieved evidence, and intermediate artifacts referenced during policy evaluation or prior to state-advancing effectuation.

Integrity predicates may include signature verification, cryptographic digest validation, schema validation, provenance verification, scope authorization checks, freshness validation, and detection of prompt-injection or output-manipulation indicators.

When evaluation of a tool output results in non-satisfaction of one or more integrity predicates, the governance control plane generates an integrity exception event.

The integrity exception event is recorded as a governed audit record bound to the execution context identifier and policy snapshot identifier.

The authorization state controller applies the corresponding policy-defined response, which may include transitioning the workflow instance to a held authorization state, conditioning or denying forwarding of a state-advancing operation, requiring refreshed retrieval from an approved source, or requiring supervisory review. requiring refreshed retrieval from an approved source, or requiring supervisory review.

Integrity predicate evaluation is applied as a precondition to state-advancing reliance events, such that a state-advancing operation is forwarded to an acceptance endpoint only when integrity predicates evaluate to satisfaction under the applicable execution context identifier and policy snapshot identifier.

A governed connector positioned at a downstream acceptance boundary requires presentation and verification of a readiness artifact or equivalent governance proof prior to forwarding a state-advancing request originating via one or more application programming interfaces or reasoning services.

The readiness artifact is cryptographically bound to the execution context identifier and policy snapshot identifier and encodes or references authorization outcomes derived from evaluation under the bound policy snapshot.

Where a downstream acceptance endpoint processes a state-advancing operation, forwarding and completion of that operation are conditioned on verification of a readiness artifact bound to the execution context identifier and policy snapshot identifier. Distribution of workflow components across application programming interfaces, platforms, vendors, or administrative domains does not alter the requirement that verification occur at the defined acceptance boundary prior to effectuation.

A system, service, or integration that performs or authorizes a state-advancing operation at a defined acceptance endpoint evaluates the execution context identifier, the applicable policy snapshot identifier, and associated governance artifacts prior to permitting effectuation. Based on that evaluation, the component applies the resulting authorization outcome at the acceptance endpoint before completing the state-advancing operation.

Governance of Reliance and Downstream Effectuation

Where implemented, the governance control plane governs regulated workflows by applying enforcement at defined reliance boundaries rather than regulating internal generation of outputs, recommendations, or analyses. Enforcement is anchored to the point at which a state-advancing operation is submitted to an acceptance endpoint and would, upon acceptance, advance workflow state or cause a downstream system of record to perform a state-changing operation under the execution context identifier.

The system distinguishes between generation of information and submission of a state-advancing operation. Outputs may be generated by artificial intelligence systems, rule-based engines, human operators, or external services and may be labeled advisory or informational. Such characterization does not determine enforcement applicability. Enforcement is applied when a state-advancing operation is submitted for acceptance or when a downstream system of record would accept, persist, execute, or act upon the output.

Policy constraints are evaluated under the governance control plane, and enforcement is applied at defined reliance boundaries corresponding to acceptance endpoints. For each attempted state-advancing operation, a governed connector verifies the applicable authorization state and readiness artifact under the execution context identifier and policy snapshot identifier prior to forwarding write back, commit, finalize, dispatch, execution, or equivalent operations.

Downstream effectuation refers to a computer-performed or computer-accepted state-advancing operation that commits data, finalizes a transaction, dispatches an instruction, or produces a durable downstream effect in a system of record. Downstream effectuation is treated as a reliance boundary and is conditioned on presentation and verification of a readiness artifact derived from governed audit records under the applicable policy snapshot.

Downstream effectuation is distinct from analysis or recommendation generation. Effectuation occurs when a system, user, or automated process submits a state-advancing operation for acceptance at a defined acceptance boundary. The governed connector references the governance log and verifies the readiness artifact and associated authorization outcomes under the execution context identifier and policy snapshot identifier prior to permitting effectuation.

For purposes of enforcement at a downstream acceptance endpoint, a state-advancing operation is evaluated based on its operational consequence rather than on vendor-specific terminology. Acceptance operations described as finalize, commit, submit, sign, dispatch, apply, execute, schedule, activate, or equivalent operations are treated as effectuation events when they cause advancement of a regulated workflow state under the execution context identifier and applicable policy snapshot identifier.

Prior to permitting effectuation at a downstream acceptance endpoint, the governed connector references the governance log to determine whether required governance records and authorization outcomes are present under the execution context identifier and policy snapshot identifier associated with the workflow instance.

In some configurations, downstream effectuation is mediated through a downstream acceptance endpoint that constitutes the technical boundary at which reliance is evaluated. The downstream acceptance endpoint may be implemented as an application programming interface, message handler, workflow transition, signing operation, device command interface, or other state-advancing mechanism within a regulated system.

At or prior to the downstream acceptance endpoint, advancement of a workflow instance or completion of a state-advancing operation is conditioned on verification of a readiness artifact bound to the applicable execution context identifier and policy snapshot identifier. The readiness artifact evidences that one or more governed audit records satisfying policy-defined prerequisites were generated and recorded under the evaluated policy snapshot.

Authorization validation is performed at the time the state-advancing operation is attempted. The governed connector verifies the readiness artifact prior to forwarding the operation to the downstream acceptance endpoint.

Governed audit records constitute recorded evidence of policy evaluation and authorization outcomes.

A readiness artifact derived from one or more such governed audit records operates as the machine-verifiable precondition to downstream effectuation.

The governed connector verifies the readiness artifact at or prior to the downstream acceptance endpoint before permitting a state-advancing operation.

A governed audit record includes an execution context identifier, a policy snapshot identifier, and an authorization outcome.

Where applicable, the governed audit record further includes evidence of satisfaction of required obligations or execution of a permitted override under the evaluated policy snapshot.

Prior to deriving a readiness artifact, the governance control plane verifies integrity and identifier binding of the governed audit record and confirms that the recorded authorization outcome permits the requested state-advancing operation.

Governed connectors implement write back gating by requiring presentation of a readiness artifact prior to accepting or transmitting a state-advancing request to a downstream system of record. The readiness artifact is a machine-verifiable artifact derived from one or more governed audit records that satisfy the applicable policy snapshot for the intended effectuation.

The readiness artifact may be implemented as a cryptographically signed readiness token bound to the execution context identifier and constrained to a defined scope, action class, and time window. The readiness artifact encodes or references the policy snapshot identifier and authorization outcome under which the effectuation is permitted.

In operation, when a write back, commit, finalize, dispatch, or execution request is attempted, the governed connector verifies the readiness artifact prior to forwarding the request to the downstream acceptance endpoint. If the readiness artifact is absent, invalid, expired, or inconsistent with the execution context or policy snapshot, the governed connector blocks or defers the request.

Presentation and verification of a readiness artifact at or prior to the downstream acceptance boundary constitutes a technical precondition to state advancement. The governed connector validates the readiness artifact locally or via a validation component before forwarding the operation to the downstream acceptance endpoint. Validation is performed without requiring evaluation of upstream reasoning state.

In one configuration, governance enforcement is applied directly at downstream acceptance endpoints that perform or authorize state-advancing operations. Such endpoints include, without limitation, electronic medical record finalize or sign operations, order release interfaces, dispense release interfaces, medication administration record completion endpoints, scheduling commit interfaces, messaging dispatch interfaces, and device command endpoints.

A downstream acceptance endpoint is configured such that effectuation is not permitted unless a governed connector or validation component verifies the readiness artifact or equivalent governance proof. Verification includes confirming that the artifact is cryptographically valid, bound to the correct execution context identifier and policy snapshot identifier, and reflects satisfaction of required obligations or execution of a permitted override.

Because state-advancing operations are forwarded to the downstream acceptance endpoint only upon successful readiness artifact verification by the governed connector, alternative routing, delayed execution, or architectural partitioning does not result in effectuation absent satisfaction of the applicable policy snapshot.

At the downstream acceptance endpoint, the governed connector applies the authorization outcome derived from the validated governance artifacts by permitting, blocking, or deferring the requested operation before any modification of regulated workflow state occurs. Evaluation is performed at the time the state-advancing operation is attempted and is determined by the recorded authorization state associated with the workflow instance.

Federated and Shared Governance Responsibility

Regulated workflows governed by the governance control plane include clinical and administrative workflows in which downstream reliance must be conditioned on satisfaction of policy-defined prerequisites. The governance control plane evaluates workflow events under a selected policy snapshot, derives obligation sets, and maintains an authorization state associated with the execution context identifier. Where policy requires human review, supervisory approval, or disclosure accounting, completion and recording of those prerequisites in governed audit records is required prior to derivation of a readiness artifact permitting downstream effectuation.

Governance enforcement is anchored to reliance events and downstream acceptance boundaries rather than to ownership or hosting of individual workflow components. When distributed components collectively cause advancement of a regulated workflow instance, enforcement is applied at the defined acceptance endpoint through readiness artifact verification under the shared execution context identifier and policy snapshot identifier.

The governance control plane binds a single execution context identifier to all actions performed by multiple parties participating in a regulated workflow. The execution context identifier is propagated across requests, tool invocations, connector operations, and governance records such that policy evaluation, obligation monitoring, authorization state control, and audit linkage apply uniformly to the combined workflow.

By binding actions across administrative domains to a shared execution context identifier, the governance control plane treats the distributed execution as a single governed workflow instance. Actions performed by different entities are evaluated under the same policy snapshot and contribute to the same authorization state and audit record, regardless of where those actions are executed or which party initiates them.

In some implementations, different entities participating in a regulated workflow perform different functional roles. One entity may operate a reasoning service or artificial intelligence model, another entity may provide orchestration logic or a user interface, and another entity may operate a system of record or execution environment. The governance control plane does not require that any single entity control all workflow components in order to enforce policy constraints.

Instead, governance enforcement is applied at acceptance and effectuation boundaries such that advancement of the regulated workflow cannot occur unless policy prerequisites associated with the shared execution context identifier are satisfied. As a result, contractual allocation of responsibilities among participating entities does not determine whether governance enforcement applies. When the combined system causes a regulated workflow to advance state, the governance control plane enforces policy constraints on the combined operation.

In certain embodiments, governed connectors are positioned at downstream acceptance endpoints that may be operated by entities different from those that generate outputs or perform orchestration. Such governed connectors enforce that effectuation requests originating from any administrative domain are accepted only upon verification of a readiness artifact or equivalent governance proof bound to the execution context identifier and policy snapshot identifier.

Because effectuation cannot occur without acceptance at the downstream endpoint, partitioning a workflow across administrative domains does not bypass governance enforcement. A reasoning service hosted in a first domain, an orchestration service hosted in a second domain, and a system of record hosted in a third domain collectively participate in a governed workflow, and downstream acceptance remains conditioned on policy satisfaction recorded by the governance control plane.

Governance enforcement across distributed components does not require centralized execution of workflow logic. Enforcement is applied at defined acceptance boundaries and is conditioned on verification of a readiness artifact under the applicable execution context identifier and policy snapshot identifier.

Governance enforcement across multiple administrative domains is implemented by binding workflow events and authorization outcomes, recorded as governed audit records, to a shared execution context identifier and policy snapshot identifier such that readiness artifact verification at an acceptance boundary applies consistently across domains.

An external verifier, regulator, or auditor may validate that downstream effectuation occurred only after policy-defined prerequisites were satisfied, even when actions contributing to the workflow were performed by different entities in different domains. The governance log thus provides a unified, non-repudiable audit trail for a distributed workflow.

Governance enforcement is applied at defined reliance boundaries corresponding to downstream acceptance endpoints. Advancement of a regulated workflow instance is conditioned on verification, by a governed connector or validation component positioned at or prior to the downstream acceptance endpoint, of a readiness artifact bound to the execution context identifier and applicable policy snapshot identifier. Evaluation of authorization state occurs at the time a state-advancing operation is attempted, and verification is performed before forwarding the operation to the downstream system of record.

Distribution of components across federated architectures, vendor boundaries, hosting arrangements, or evolving integration topologies does not eliminate or relocate this acceptance-boundary verification requirement.

Audit Conditioned Completion and Execution

The governance control plane generates and preserves governance records corresponding to policy evaluation, obligation monitoring, authorization state transitions, omission events, integrity exception events, and reliance events under an applicable policy snapshot. Each governance record is bound to an execution context identifier and policy snapshot identifier associated with the workflow instance.

Governance records are stored in the governance log with cryptographic linkage sufficient to detect modification, deletion, or reordering. Where export is performed, an evidence bundle is constructed from selected governance records and associated linkage information, enabling independent verification of record integrity, ordering, and policy binding.

By evaluating the exported governance records and associated policy snapshot identifiers, an external verifier may independently determine whether downstream effectuation occurred only after policy-defined prerequisites were satisfied and recorded under the bound execution context identifier.

The governance control plane supports replay of regulated workflows using the evidence bundle. During replay, the included governance records and associated identifiers are evaluated against the policy snapshot identifier bound to the execution context identifier to reconstruct recorded policy evaluations, authorization state transitions, omission events, integrity exception events, overrides, and downstream effectuation decisions associated with the workflow instance.

Replay is performed by evaluating recorded governance records against the policy snapshot identifier that was bound to the execution context identifier at the time each event was recorded.

The replay engine retrieves the versioned or immutable representation of the policy grammar corresponding to that policy snapshot identifier and evaluates recorded authorization outcomes under that policy basis.

Replay evaluation is performed using the policy snapshot associated with the original event, such that subsequent modification of institutional policy definitions does not alter the evaluated policy state associated with prior reliance events.

Integrity validation of the append only governance log permits reconstruction of authorization state transitions and evaluation outcomes associated with a workflow instance under the policy snapshot identifier bound at the time of evaluation.

Because each modification to an obligation set is recorded as a governed audit record bound to the execution context identifier and policy snapshot identifier, reconstruction of authorization state for a workflow instance includes evaluation of the obligation set state as recorded at the time of each reliance event.

In some configurations, an external verifier, auditor, regulator, insurer, or adjudicator independently validates an evidence bundle without access to the originating live system or proprietary application logs. Independent verification includes validating cryptographic signatures where present, verifying hash-chain or linkage integrity, confirming consistency of execution context identifiers and policy snapshot identifiers, and confirming that recorded authorization outcomes correspond to governance records bound to the applicable policy snapshot identifier.

Verification of an evidence bundle is performed using the cryptographically protected governance records and identifiers contained within the bundle. An independent party may validate digital signatures, linkage continuity, execution context identifiers, policy snapshot identifiers, and recorded authorization outcomes to evaluate consistency between recorded reliance events and the policy snapshot under which those events were authorized. Validation is based on the integrity and internal consistency of the preserved governance records included in the bundle.

In certain embodiments, evidence bundles generated by the governance control plane are structured for use in regulatory submissions, accreditation reviews, incident investigations, insurance evaluations, dispute resolution, arbitration, and judicial proceedings. The evidence bundle contains governance records, identifiers, and cryptographic linkage information sufficient to support verification that recorded downstream effectuation events were associated with recorded authorization outcomes under the applicable policy snapshot.

By providing a machine-verifiable record of governance enforcement rather than post-hoc attestations or narrative explanations, the disclosed system enables objective determination of whether a regulated workflow complied with institutional policy, patient-directed policy, and applicable regulatory requirements at the time of execution.

In certain embodiments, evidence bundles are generated under minimization and redaction constraints such that only information necessary to verify policy compliance is included. Protected data elements may be redacted, masked, or represented by cryptographic fingerprints or references, provided that sufficient information remains to verify integrity, ordering, and policy satisfaction.

This approach enables sharing of evidence with external parties without unnecessary disclosure of protected or proprietary information, while preserving the ability to independently verify governance enforcement.

Advancement of a regulated workflow instance is conditioned on existence and validation of required governance artifacts under the applicable execution context identifier and policy snapshot identifier. The governance control plane generates and persists governance records reflecting satisfaction of policy predicates, and downstream state advancement is permitted only upon verification, at the acceptance boundary, of a readiness artifact derived from the corresponding governance records.

At a defined acceptance endpoint corresponding to a reliance event, a governed connector verifies a readiness artifact bound to the execution context identifier and policy snapshot identifier. If required governance records referenced by the readiness artifact are missing, incomplete, or fail integrity or authorization validation, the governed connector applies the enforcement decision prior to permitting downstream effectuation. Completion of the reliance event is conditioned on successful validation of the readiness artifact and its referenced governance records under the applicable policy snapshot.

Governance Independent of Decision Intent

Governance applicability is determined in accordance with the definition of reliance events set forth above. Characterization of an output as advisory, assistive, informational, or non-binding does not alter whether governance enforcement applies. Governance enforcement is triggered when a state-advancing operation or downstream reliance event occurs as defined herein.

When a requested action would cause advancement of a workflow instance, modification of a system of record, or initiation of downstream execution, the governance control plane evaluates the action under the applicable policy snapshot identifier and current authorization state. Acceptance at the defined acceptance endpoint is conditioned on verification of a readiness artifact associated with the execution context identifier.

Under this control model, advancement of a regulated workflow state is evaluated at defined reliance boundaries through verification of authorization state and associated governance artifacts bound to the execution context identifier and policy snapshot identifier. The governance control plane conditions acceptance of state-advancing operations on satisfaction of policy-defined predicates recorded in the governance log.

In certain embodiments, an artificial intelligence system or decision-support platform may characterize its outputs as recommendations, suggestions, advisory content, or informational assistance. Such characterizations do not control whether governance obligations apply.

In regulated environments, risk and regulatory exposure arise at the moment an output is relied upon to advance a workflow state, modify a regulated record, authorize execution, or enable downstream action. Accordingly, an output that is subsequently incorporated into a system of record, used to authorize an order, relied upon to clear a hold state, or used to trigger downstream execution is treated as functionally equivalent to a decision for governance purposes.

Policy predicates and authorization state are evaluated at the defined reliance boundary corresponding to a state-advancing operation. Validation occurs at the acceptance endpoint based on the operational effect of the requested action on workflow state.

Governance enforcement is triggered by detection or attempted acceptance of a reliance event as defined above. A reliance event comprises a state-advancing operation evaluated at a defined acceptance endpoint under the applicable execution context identifier and policy snapshot identifier.

A reliance event comprises a state-advancing operation that modifies workflow state or initiates execution within a downstream system.

The operation is associated with an execution context identifier and evaluated under the applicable policy snapshot identifier to determine whether authorization prerequisites have been satisfied.

Acceptance of the operation at a defined acceptance endpoint is conditioned on verification of the corresponding authorization state and governance artifacts prior to effectuation.

Reliance events include, without limitation, committing content into a system of record, signing or finalizing a note or order, invoking a tool that changes system state, issuing a write back request, releasing an order for execution, clearing a hold state, dispatching a message or instruction that enables downstream execution, or completing an administrative step that authorizes further workflow progression.

When a reliance event is detected or requested, the governance control plane evaluates the applicable policy grammar, determines whether required obligations have been satisfied, and verifies whether the reliance event is permitted under the current authorization state. If the reliance event is not authorized, acceptance of the event is prevented or deferred and the enforcement outcome is recorded in the governed audit record.

Where implemented, governance enforcement is applied uniformly across different platforms, deployment architectures, and vendor implementations. Because enforcement is anchored to reliance events and acceptance boundaries rather than to model internals or platform-specific behavior, differences in inference techniques, model versions, or output presentation do not affect governance applicability.

A state-advancing operation directed to a defined acceptance endpoint is conditioned on prior evaluation under the applicable policy snapshot identifier and execution context identifier associated with the workflow instance. The operation is not permitted to complete unless a readiness artifact reflecting the recorded authorization outcome under the applicable policy snapshot identifier is validated at or prior to the acceptance endpoint. Validation occurs prior to any modification of downstream system state.

Under this enforcement model, workflow state advancement occurs only upon validation of a readiness artifact bound to the execution context identifier and applicable policy snapshot identifier. Processing responsibilities may be distributed across systems or administrative domains; however, effectuation at a defined acceptance endpoint remains conditioned on artifact validation at the reliance boundary.

Additional Defensive Disclosure Embodiments

The governance control plane enforces redaction, minimization, and controlled handling of protected or regulated information as part of policy governed workflow execution. Institutional policy and patient-directed policy define which data classes, fields, and representations are permitted for a given execution context, including purpose of use, role, jurisdictional, and temporal constraints.

During construction of governed context objects, the governance control plane deterministically applies selection rules derived from the applicable policy snapshot. The selection rules enforce minimum necessary data scope for the execution context identifier and limit inclusion to data elements permitted under the evaluated policy snapshot.

Redaction, masking, truncation, filtering, tokenization, transformation, or other policy governed data conditioning operations may be applied to free text, structured fields, embeddings, derived artifacts, summaries, or other machine-usable representations prior to transmission, storage, presentation, or downstream use.

Each such data conditioning operation constitutes a governed action and is recorded as a governed audit record bound to the execution context identifier and the applicable policy snapshot identifier or policy snapshot digest.

In one arrangement, downstream reliance on a governed context object is conditioned on verification that required policy-defined conditioning operations were performed and verifiably recorded under audit conditioned completion semantics.

In certain embodiments, policy further defines retention and secondary-use obligations applicable to external services or reasoning domains.

Retention attestations, non-retention attestations, and non-training attestations are treated as required obligations under audit conditioned completion semantics.

A reliance event that would transmit governed context to an external domain is conditioned on obtaining and recording the required attestation in a governed audit record within the applicable time window.

Failure to obtain a required attestation results in generation of a governed omission event and application of the corresponding policy-defined response, which may include blocking write back, withholding delivery, downgrading autonomy, or escalation.

In certain embodiments, the governance control plane constructs and preserves an evidence bundle corresponding to a workflow instance or discrete reliance event. The evidence bundle comprises one or more governed audit records, associated governance records, authorization outcomes, omission events, integrity exception events, and cryptographic linkage information sufficient to demonstrate policy evaluation and effectuation decisions under the applicable policy snapshot identifier.

Where implemented, the readiness artifact used for runtime gating is derived from the corresponding governance records and may be referenced within the evidence bundle.

The evidence bundle includes identifiers binding the workflow instance to an execution context identifier and a policy snapshot identifier.

The bundle further includes governed audit records, authorization outcomes, omission and integrity exception events, timestamps, and cryptographic linkage information sufficient to verify ordering and integrity.

Where applicable, the bundle may include a reference to a readiness artifact derived from the governance records associated with the reliance event, as well as delegation records and downstream effectuation identifiers.

Evidence bundles may be exported to auditors, regulatory entities, or other authorized parties to permit independent verification of governance enforcement.

Exported bundles preserve cryptographic linkage and identifiers sufficient to validate that the included governed audit records correspond to the workflow instance and to the policy snapshot identifier in effect at the time of the reliance event.

The foregoing embodiments operate within the core enforcement control loop previously described.

Evaluation of policy predicates, generation of governed audit records, and validation of readiness artifacts at defined reliance boundaries collectively condition downstream effectuation.

Components participating in a regulated workflow remain bound to a shared execution context identifier and applicable policy snapshot identifier. Distribution of functionality across administrative domains does not alter the requirement that state-advancing operations be gated by artifact validation at the downstream acceptance endpoint.

In certain embodiments, the governance log maintains a patient associated audit partition that records an ordered sequence of governed events related to a particular patient, encounter, or longitudinal record. Each event in the partition is bound to the execution context identifier and policy snapshot identifier applicable at the time of the event.

The patient associated audit partition records, without limitation, issuance of governed context objects, persona and specialist agent invocations, tool calls and outputs, delegation events, policy evaluations, omission events, integrity exception events, authorization state transitions, and downstream effectuation events.

In some implementations, records in the audit partition are cryptographically linked to provide tamper evident ordering. The partition may be exported as part of an evidence bundle and reviewed under access-controlled and redaction-aware conditions while preserving verifiability of policy satisfaction.

In certain embodiments, candidate outputs produced by persona agents or specialist agents are routed through a validation or arbitration component prior to delivery, reliance, or effectuation. The validation component operates as a controlled checkpoint within the governance control plane and enforces policy-defined evidence requirements.

Evidence binding includes associating a candidate output with references to governed context objects, provenance identifiers, policy snapshot identifiers, integrity artifacts, and authorization outcomes. The validation component determines whether available evidence satisfies policy predicates required for delivery or reliance.

When policy requires confirmation, review, or corroboration, the governance control plane transitions the workflow instance into a confirmation-required or restricted authorization state. Delivery or reliance is suppressed or delayed until confirmation is completed and recorded in a governed audit record. Failure to obtain required confirmation within a policy-defined time window is treated as a governed omission event and triggers a policy-defined response.

In some configurations, patient-centered workflows are executed exclusively through governed tools and governed connectors that operate under the control of the governance control plane. A patient scoped persona agent interacts with enterprise systems, personal health records, wearable data sources, and external service networks only through such governed interfaces.

Each governed tool or connector enforces connector-scope restrictions, execution context identifiers, policy snapshot identifiers or digests, and validation tokens prior to performing retrieval, write back, commit, finalize, dispatch, or other reliance events. Requests that exceed permitted scope, violate policy predicates, or lack required governance artifacts are blocked or deferred.

In some implementations, governed connectors enforce write-side gating by preventing downstream systems of record from accepting state-advancing operations unless a readiness artifact derived from one or more governed audit records is presented and successfully validated.

The readiness artifact constitutes machine-verifiable authorization evidence reflecting the authorization outcome recorded under the applicable execution context identifier and policy snapshot identifier.

The governed connector treats the downstream acceptance endpoint as the technical point of control and blocks, defers, or permits the request based on validation of the readiness artifact at or prior to the acceptance boundary.

Each effectuation attempt, whether permitted, blocked, or deferred, is recorded as a governed audit record, enabling replay and audit of enforcement decisions.

In certain embodiments, the governance control plane includes an orchestration controller configured to manage task routing, sequencing, and delegation among a patient scoped persona agent and one or more specialist agents. The orchestration controller selects agents based on task type, governed context content, authorization scope, and policy constraints.

Delegation boundaries are enforced such that specialist agents receive only the data, tools, and permissions authorized under the applicable execution context. Specialist agents are not permitted to directly effectuate downstream actions or access systems of record unless mediated by governed connectors and validated under governance control.

Where implemented, delegation events are recorded as governed audit records bound to the execution context identifier and policy snapshot identifier. The orchestration controller maintains auditable delegation chains and enforces separation-of-duties constraints when required by policy, ensuring that multi-agent workflows remain policy-bound, traceable, and non-bypassable.

The governance control plane maintains a patient scoped context store that holds a governed representation of patient state used to construct governed context objects for reasoning, validation, and downstream workflows. The context store maintains time-bounded context windows for different data classes, including longitudinal history, episodic data, and high-rate telemetry.

Governed context objects are constructed from the patient scoped context store by deterministically applying minimum necessary selection rules, redaction constraints, purpose of use restrictions, and temporal bounds derived from the applicable policy snapshot. Each context object is cryptographically bound to an execution context identifier and a policy snapshot identifier and is eligible for use only upon verification that such use is permitted under policy evaluation.

By maintaining a governed patient scoped context store, the system avoids uncontrolled duplication of longitudinal data, reduces data exposure, and ensures that reasoning and effectuation operate on policy scoped, auditable context rather than unmanaged data copies.

The governance control plane maintains a patient agent registry that associates patient identifiers, and where applicable encounter identifiers, with corresponding patient scoped persona agent instances or agent execution contexts. The registry manages lifecycle events including creation, activation, suspension, merging, splitting, and termination of persona agents.

Lifecycle transitions may be triggered by admission, discharge, transfer, identity reconciliation, consent changes, revocation events, or policy updates. Each lifecycle event is treated as a governed event and is recorded in the governance log with reference to the applicable execution context identifier and policy snapshot identifier.

By centralizing persona agent lifecycle management, the governance control plane ensures that patient scoped agents operate only within authorized temporal and policy scopes and that agent behavior remains auditable across longitudinal care episodes.

The governance control plane instantiates a patient scoped persona agent for each patient or assigns a patient-bound agent execution context. The patient persona agent operates as a governed custodian of patient associated data and workflow interactions and is constrained by identity-derived, credential-derived, and policy-derived attributes.

The patient persona agent may coordinate with one or more specialist agents under control of the orchestration controller. Specialist agents perform domain-specific reasoning but do not directly effectuate downstream actions unless authorized and mediated through governed connectors.

In one configuration, policy grammars define dual-control or separation-of-duties requirements for high-risk actions. When such requirements apply, initiation and approval actions are performed by distinct authorized roles and are recorded as separate governed audit records bound to distinct credentials. The authorization state controller permits state transitions only when separation-of-duties predicates are satisfied.

In one arrangement, retrieval, disclosure, import, and downstream use of patient data are subject to audit conditioned data acceptance enforced by the governance control plane. Data access and disclosure events are not treated as passive operations but are governed actions whose permissibility is evaluated under the applicable policy snapshot.

In such embodiments, each data access, disclosure, or import event generates a governed audit record that identifies the authorization basis, including patient-granted authorization, institutional policy constraints, execution context identifier, policy snapshot identifier, time bounds, permitted scope, and references to source records.

Acceptance of downstream use or incorporation of such data is conditioned on validation of a corresponding governance proof artifact indicating satisfaction of applicable policy predicates under the associated execution context identifier and policy snapshot identifier.

In some implementations, a downstream system requires presentation of a readiness artifact, or equivalent machine-verifiable authorization artifact, as a condition of accepting a write back, commit, finalize, dispatch, or other state-advancing request. The governed connector verifies the readiness artifact by validating its cryptographic integrity, binding to the execution context identifier and the applicable policy snapshot identifier, and encoded authorization outcome, such validation being performed locally and/or via a validation component operating under the governance control plane. If verification succeeds, the request may be accepted. If verification fails, the request is blocked or deferred and the attempt is recorded as a governed audit record.

When a patient presents for care at a facility outside the patient's home institution, the patient scoped persona agent generates and provides governed context bundles for use during the external encounter. The governed context bundles are derived from the patient scoped context store and, where applicable, the patient-controlled longitudinal store or index.

Each governed context bundle includes a policy scoped summary of longitudinal patient history relevant to the presenting complaint, references to underlying source records sufficient for verification, provenance metadata identifying source institutions, and policy snapshot identifiers indicating the policy basis under which the bundle was constructed. The governance control plane enforces minimum necessary disclosure, purpose of use constraints, and redaction rules defined by patient and institutional policy.

In such embodiments, the governed context bundle is ingested by a local medical data governance truth layer at the receiving facility, enabling the facility to construct an operationally relevant, policy scoped patient state representation even when the receiving electronic medical record does not natively contain the patient's historical data. Downstream reliance on the governed context bundle remains subject to governed connector enforcement and audit conditioned completion semantics.

In certain embodiments, the patient persona agent maintains a patient-controlled longitudinal store or index of governed references that functions as a portable truth substrate for continuity of care. The longitudinal store or index maintains normalized structured data and governed references sufficient to support retrieval, verification, and replay of underlying records under an applicable authorization grant.

The longitudinal store includes provenance metadata, time bounds, policy snapshot identifiers or digests, and revocation and accounting information. Patient-directed authorization governs which data classes, episodes, or references are eligible for disclosure and under what conditions.

In such embodiments, the patient may authorize disclosure of a minimum necessary subset of longitudinal data to a receiving facility, revoke authorization to prevent future disclosures, and request an accounting of disclosures identifying what data was shared, with whom, when, and under which policy snapshot. The patient-controlled longitudinal store does not require centralized custody of full source records and thereby preserves patient autonomy while maintaining auditability.

When a patient presents for care at an external facility, records retrieved under patient-granted authorization are ingested into a medical data governance truth layer and transformed into a governed canonical representation. For each ingested record or record portion, the truth layer attaches provenance metadata identifying the source institution, document identifiers, retrieval time, source-provided timestamps where available, and transformation history.

When records retrieved from different institutions conflict, including conflicting medication lists, allergy assertions, diagnoses, or problem histories, the governance control plane applies policy-defined conflict-handling rules. Such rules preserve competing assertions as separate provenance-scoped facts or require confirmation prior to reliance, rather than silently overwriting or collapsing data.

In certain embodiments, the truth layer segments the longitudinal record into episodes and time windows to support episodic retrieval, explainability, and auditability of how particular facts were used during the external encounter. Reliance on any such facts remains subject to governance enforcement and audit conditioned completion.

The governance control plane canonicalizes retrieved patient records into a governed representation suitable for policy evaluation and cross-institution use. Canonicalization includes mapping heterogeneous codes, terminologies, and formats into a normalized schema while preserving references to original source representations.

In some configurations, provenance binding reduces the risk of silent data corruption, enables detection of inconsistent or altered source representations, and supports defensible reliance decisions.

Cross-institution conflict resolution is performed without erasing provenance. Multiple conflicting assertions are maintained as distinct governed facts, each subject to policy evaluation. When reliance on a conflicting assertion would advance a regulated workflow state, the governance control plane enforces policy-defined confirmation, escalation, or override requirements prior to permitting effectuation.

The governance control plane includes one or more governed external connectors configured to retrieve patient records from external institutions, providers, or healthcare networks. Such external institutions may include hospitals, outpatient clinics, private practices, laboratories, imaging centers, pharmacies, or health information exchanges.

Record retrieval is performed only under an applicable authorization grant object evaluated by the governance control plane. Each retrieval operation is bound to an execution context identifier and a policy snapshot identifier and is subject to policy-defined scope, purpose of use, time bounds, and minimization constraints.

In some implementations, retrieved records include structured and unstructured artifacts such as encounter summaries, medication lists, allergy records, laboratory results, diagnostic reports, procedure histories, clinical notes, imaging reports, and other patient-associated data. Retrieval may be selective or incremental based on clinical relevance and policy scope, thereby reducing unnecessary data exposure while maintaining auditability.

Each retrieval event is recorded in the governance log with provenance metadata identifying the source system, retrieval time, authorization basis, and policy snapshot identifier. Downstream reliance on retrieved records remains subject to governed connector enforcement and audit conditioned completion semantics.

The governance control plane maintains a patient identity vault that binds one or more patient identifiers to authentication factors, authorization grant objects, and patient-directed policy preferences. The patient identity vault is configured to operate independently of any single institutional identity system.

The patient identity vault stores authorization grant objects defining permitted data classes, permitted recipients, permitted purposes of use, time bounds, revocation rules, and break-glass conditions requiring elevated logging and post-event justification. Authorization grants are evaluated as part of the applicable policy snapshot governing each workflow instance.

Authorization and consent changes are treated as governed events and are recorded in the governance log with references to the execution context identifier and policy snapshot identifier. In this manner, reliance decisions can be reconstructed under the precise policy state that was in effect at the time of disclosure or use.

In some implementations, revocation of authorization triggers immediate policy re-evaluation and prevents further downstream reliance events that would otherwise occur under a prior authorization state.

In many care settings, a patient's medical data is fragmented across independent institutions, resulting in incomplete clinical context, duplicated testing, delayed decisions, and increased risk when automated or AI-assisted workflows are introduced.

In certain embodiments, the disclosed governance control plane enables a patient-controlled longitudinal access model in which a patient scoped persona agent retrieves, normalizes, and governs access to cross-institution records under patient-directed authorization. The persona agent operates as a governed data custodian constrained by institutional policy, patient consent, and regulatory requirements.

By enforcing policy scoped context construction, provenance binding, governed connectors, and audit conditioned acceptance at reliance boundaries, the system enables continuity of care across institutional boundaries without requiring centralized data custody or erosion of patient control.

In embodiments that implement patient-scoped governance controls, downstream access to longitudinal records and use of such records for effectuation are conditioned on a patient-controlled longitudinal store or index and one or more authorization grant objects. The governance control plane evaluates the applicable policy snapshot and authorization grant object to determine which longitudinal elements may be retrieved, disclosed, or used to condition a governed workflow.

Attempted access that does not satisfy the current policy snapshot is blocked by a governed connector or validation component positioned at or before a downstream acceptance endpoint, and the attempt is recorded as a governed audit record bound to the execution context identifier and policy snapshot identifier.

This conditioning applies regardless of whether the request originates from a human user, an institutional system, or a reasoning service.

Patient Engram Memory Module for Persona Agents

The governance control plane maintains a patient specific engram memory module that provides a low-latency, policy scoped mechanism for supplying governed context to a patient scoped persona agent without repeatedly transmitting, retrieving, or reprocessing full longitudinal medical records.

The patient engram memory module is not merely a cache of prior prompts, outputs, or free-text summaries. Rather, it is a machine constructed, governed memory substrate in which each memory entry is admitted, stored, retrieved, and applied under explicit policy scope, provenance binding, integrity predicates, and audit logging enforced by the governance control plane.

In operation, the engram memory module stores compact, machine-usable representations of recurring patient associated concepts and patterns that are repeatedly required across regulated workflows, including longitudinal continuity of care workflows and time constrained encounter workflows. The engram memory module thereby reduces computational overhead, network bandwidth usage, and context assembly latency while preserving governance enforcement.

In some implementations, engram-derived context is expressly prohibited from authorizing downstream effectuation, clearing a hold state, or satisfying a policy-defined obligation unless corresponding audit conditioned completion requirements are independently satisfied and recorded in governed audit records. In this manner, efficiency improvements provided by the engram memory module do not weaken policy enforcement or reliance controls.

The engram memory module may be implemented as a computer-executed subsystem that stores and retrieves compact, addressable context objects for a workflow instance using an execution context identifier.

Deterministic retrieval of previously derived representations via defined lookup keys reduces repeated governed-context reconstruction, lowers processing cycles for reassembly, and decreases data transmission across system boundaries.

Retrieval is mediated by an engram gate that verifies consistency with the current execution context identifier, the applicable policy snapshot identifier, and defined provenance predicates before allowing the retrieved object to be used in governed context construction.

Each permitted retrieval is recorded in a governed audit record.

Where the policy grammar defines reliance on engram-derived context as relevant to authorization evaluation, such usage may be incorporated as contextual input to policy evaluation. Authorization of a state-advancing operation, however, remains conditioned on satisfaction of independently verifiable policy predicates and readiness artifact validation at a downstream acceptance endpoint.

In certain embodiments, the engram memory module comprises a plurality of engram entries, each engram entry being a machine-readable object addressable by a deterministic lookup key. Each engram entry includes one or more compact representations usable for governed context construction, including embeddings, feature vectors, structured templates, normalized field bundles, code-linked concept objects, or episode summary objects.

Each engram entry is bound to provenance and policy state. In particular embodiments, an engram entry includes references to one or more underlying governed records, time-bounded episodes, or source artifacts from which the entry was derived.

Provenance metadata identifies the source system, source institution, document or message identifiers, retrieval conditions, and any applied normalization or transformation steps.

In addition, each engram entry includes policy scope metadata and, in certain embodiments, a policy snapshot identifier corresponding to the evaluated policy basis under which the entry was admitted into the engram memory module. This binding ensures that an engram entry is eligible for retrieval and use only when the current execution context is governed by a policy snapshot having a compatible policy snapshot identifier.

By binding compact representations to verifiable provenance and immutable policy state, the engram memory module avoids uncontrolled summarization and ensures that any derived context remains traceable to governed source records.

In certain embodiments, the engram memory module supports deterministic lookup of engram entries using stable, machine-computable keys. Deterministic lookup keys may be derived from normalized identifiers, canonical codes, phrase hashes, workflow identifiers, episode identifiers, or other normalized inputs that uniquely identify recurring patient associated concepts.

Deterministic lookup avoids uncontrolled growth in context size and prevents reliance on unbounded search across ungoverned text. Retrieval latency is bounded and predictable, enabling use in time critical workflows without introducing variability associated with construction of large context inputs.

In one arrangement, the engram memory module enforces a bounded footprint by applying admission controls, eviction rules, and retention constraints. Entries may be limited by count, by age, by policy scope, or by relevance to active workflow types. Entries admitted under one policy scope are not eligible for retrieval under an incompatible policy scope.

The engram memory module may be implemented using tiered storage, including volatile memory, persistent storage within the enterprise domain, or encrypted offloaded storage, while maintaining governance enforcement at admission and retrieval time.

In some implementations, retrieval and use of an engram entry are conditioned on evaluation by an engram gate. The engram gate enforces integrity, provenance, and policy-compatibility predicates prior to allowing an engram entry to influence agent reasoning or downstream workflow behavior.

The engram gate evaluates compatibility between a retrieved engram entry and the current execution context identifier.

Evaluation includes verification of temporal validity, provenance consistency, policy scope compatibility, integrity artifacts, and binding to the applicable policy snapshot identifier. In certain embodiments, the engram gate computes a compatibility value and suppresses, attenuates, or rejects an engram entry when the entry is stale, out of scope, missing provenance binding, associated with a non-matching policy snapshot identifier, or fails defined integrity predicates.

An engram entry that does not satisfy the evaluated predicates is excluded from governed context construction and is not referenced in subsequent authorization evaluation.

In some implementations, failure of an engram gate predicate generates an integrity exception event that is recorded in the governance log.

The integrity exception event triggers a policy-defined response, which may include requiring fresh retrieval from an approved source, requiring supervisory review, or preventing reliance on the affected context for effectuation.

Use of a compatibility value by the engram gate affects only eligibility of an engram entry for inclusion in governed context construction.

Determination of permissibility of a state-advancing operation remains subject to authorization state evaluation and readiness artifact validation at a downstream acceptance endpoint under the execution context identifier and policy snapshot identifier.

By enforcing gate validation, the system detects and blocks memory injection attempts, mitigates prompt-injection amplification, and reduces reuse of stale or improperly scoped context across workflows by excluding entries that fail defined integrity, provenance, or policy-compatibility predicates.

In some configurations, the governance control plane constructs governed context bundles by selecting a minimum necessary subset of engram entries responsive to a task type, workflow state, or presenting complaint. Selected engram entries are packaged with references sufficient for verification, including pointers to underlying governed records or episodes associated with verifiable provenance.

In cross-institution retrieval workflows, the patient scoped persona agent may populate or update the engram memory module using canonicalized records retrieved from external institutions through governed connectors. Each such update is subject to admission controls, policy scope evaluation, and provenance binding enforced by the governance control plane.

Engram-derived summaries and context bundles remain verifiable because they are bound to underlying record references and are admitted only under policy scoped evidence and gate validation. This avoids uncontrolled narrative summarization that cannot be traced back to a governed record basis.

In certain embodiments, creation, update, retrieval, and use of engram entries are recorded in governed audit records associated with the execution context identifier and policy snapshot identifier. Audit records identify entry identifiers, referenced source records, provenance bindings, gate outcomes, and usage context indicating the workflow instance or governed context bundle in which the entry was applied.

In some implementations, downstream systems and acceptance endpoints require presentation of a validation token or readiness artifact indicating that an engram-derived context bundle was generated under governance control and that required gate predicates were satisfied. Where a reliance event is attempted based on an engram-derived context bundle, acceptance is blocked, deferred, or held unless audit conditioned completion requirements are independently satisfied.

The engram memory module operates to provide deterministic retrieval of stored context objects associated with a workflow instance while authorization and state advancement remain controlled by the governance control plane. Use of engram-derived context does not alter the requirement that downstream effectuation be conditioned on verification of the applicable authorization state and corresponding governance artifacts. Enforcement of policy-defined prerequisites is performed at governed connectors and acceptance endpoints, and is not dependent on reuse of stored context or model-side state.

Medication Workflow Governance Embodiments

The governance control plane is applied to medication related workflows that span order creation, verification, dispensing, administration, and documentation. Medication workflows are treated as regulated, stateful processes in which premature advancement, omission of required actions, or reliance on unverified outputs can result in significant patient harm and regulatory exposure.

In such embodiments, medication related workflow events are received from one or more clinical systems, including computerized provider order entry systems, pharmacy information systems, automated dispensing systems, and medication administration record systems, through governed connectors. Each workflow event is bound to a medication workflow instance and associated with an execution context identifier and a policy snapshot identifier.

The governance control plane evaluates applicable policy grammars against the medication workflow instance, derives required actions and timing constraints, monitors satisfaction of such requirements, and enforces authorization state transitions that determine whether the medication workflow is permitted to advance, is placed into a held state, or requires escalation or override.

Advancement of any medication workflow state that would enable downstream effectuation is permitted only when audit conditioned completion semantics are satisfied and recorded in cryptographically verifiable governance records. In this manner, medication safety and compliance controls are enforced as technical preconditions to execution rather than as advisory checks or retrospective audits.

In one configuration, each medication related process is represented as a medication workflow instance, which is a machine-readable governed object maintained by the governance control plane. The medication workflow instance represents the authoritative state of the medication process for a given patient and encounter.

In particular embodiments, the medication workflow instance includes references to a patient identifier and encounter identifier, one or more medication identifiers and order attributes, including dose, route, frequency, and timing constraints, and one or more context snapshot references identifying clinical context used for policy evaluation. The medication workflow instance further includes a policy snapshot identifier identifying the evaluated policy grammar, an obligation set defining required actions and time windows, a current authorization state, and references to governed audit records associated with the instance.

Medication workflow events include order creation, order modification, signing, pharmacist verification, dispensing actions, administration events, cancellation events, override events, and related events that advance or alter medication state within an institutional system of record.

In the disclosed system, such events are treated as workflow events for a regulated workflow instance and are evaluated against an applicable policy snapshot to derive obligations and authorization-state outcomes.

Downstream effectuation that would commit, finalize, dispatch, or otherwise advance medication state is gated at a governed connector or acceptance endpoint. Advancement is permitted only when applicable prerequisites have been satisfied and evidenced by a readiness artifact derived from one or more governance records associated with the medication workflow instance.

By representing medication workflows as governed objects with explicit state, policy binding, and audit linkage, the governance control plane enables deterministic enforcement of safety and compliance requirements across the entire medication lifecycle.

In certain embodiments, the authorization state controller implements a medication-specific state-transition model in which advancement through medication workflow states is governed by policy predicates and cryptographically verifiable governance records.

The state-transition model defines a plurality of authorization states corresponding to different stages of the medication lifecycle, including states in which progression is permitted and states in which progression is blocked or deferred. The precise set of states and permissible transitions is defined by the applicable policy grammar and may vary by medication class, patient risk profile, institutional policy, or jurisdictional requirements.

When a required action is missing, incomplete, or untimely, when a contraindication condition is detected, or when an integrity predicate fails, the authorization state controller transitions the medication workflow instance into a held or restricted authorization state. While in such a state, downstream effectuation, including dispense release or administration documentation, is blocked by a governed connector and/or a validation component positioned at or before a downstream acceptance endpoint, such that the acceptance operation does not complete absent successful validation of the applicable readiness artifact.

Release from a held or restricted authorization state occurs only when a governed audit record evidences completion of required actions or a permitted override satisfying the applicable policy grammar.

The cryptographic validation engine verifies integrity, binding to the execution context identifier and policy snapshot identifier, and satisfaction of the applicable authorization predicates prior to transition.

State advancement is conditioned on verification of a readiness artifact derived from one or more such governed audit records at or before the downstream acceptance endpoint. By conditioning state advancement on recorded and verifiable completion evidence, the state-machine enforcement reduces bypass risk, including in scenarios involving manual sequencing, delayed documentation, or partitioning of responsibilities across systems In certain embodiments, the governance log functions as an active transition guard for medication workflow reliance events by providing verifiable records from which a readiness artifact is derived and validated at the acceptance boundary. Advancement of medication workflow states is conditioned on validation of the readiness artifact reflecting the recorded authorization outcome under the applicable execution context identifier and policy snapshot identifier.

In such embodiments, a governed connector mediating a medication-related reliance event validates a readiness artifact derived from one or more governance records prior to permitting state advancement.

For example, a dispense-release request is accepted by a pharmacy system or automated dispensing cabinet only when a readiness artifact reflecting pharmacist verification, completion of required reviews, or an authorized override satisfying the policy grammar is presented.

The readiness artifact is validated at or before the downstream acceptance endpoint under the applicable execution context identifier and policy snapshot identifier prior to effectuation.

Similarly, recording of medication administration in a medication administration record system is permitted only when a governed connector and/or validation component at or before the downstream acceptance endpoint validates a readiness artifact reflecting that required prerequisites, including prior verification, monitoring confirmation, or clearance of a hold, have been satisfied and recorded under the applicable execution context identifier and policy snapshot identifier.

By enforcing the governance log as a source of verifiable records and conditioning advancement on validation of a readiness artifact at the reliance boundary, the system reduces the risk of silent advancement of medication workflows and anchors clinically significant state transitions to recorded and verifiable policy satisfaction at the time of reliance.

The governance control plane includes governed connectors configured to interface with computerized provider order entry systems, pharmacy information systems, automated dispensing cabinets, and medication administration record systems.

Governed connectors mediate state-advancing actions including order finalization, pharmacist verification completion, dispense release, cabinet access, administration documentation, and override execution.

Prior to permitting any such action, the governed connector verifies that the medication workflow instance is in an authorization state that permits advancement under the applicable policy snapshot identifier.

The governed connector further validates that a readiness artifact derived from one or more governance records associated with the execution context identifier is present and valid before forwarding the requested operation.

In particular embodiments, a governed connector is positioned at or prior to a downstream acceptance endpoint and requires presentation of a readiness artifact derived from one or more governance records before a requested state-advancing operation is permitted to proceed.

The readiness artifact presented to the governed connector is bound to an execution context identifier, a policy snapshot identifier, and a defined effectuation scope, and is validated prior to forwarding the requested operation to the downstream acceptance endpoint.

When required policy prerequisites are not satisfied, or when a required readiness artifact is absent, invalid, expired, or outside defined scope, the governed connector blocks, defers, or rejects the requested action.

The enforcement outcome is recorded in the governance log under the applicable execution context identifier and policy snapshot identifier.

Connector-level enforcement applies artifact validation at a defined reliance boundary such that acceptance of a state-advancing operation is conditioned on recorded and verifiable policy satisfaction rather than on vendor-specific workflow implementation.

The governance control plane treats omission events as first-class governed events within medication workflows. An omission event is generated when a policy-defined required action associated with a medication workflow instance is missing, incomplete, or not completed within a policy-defined time window.

Non-limiting examples of medication related omission conditions include failure to complete pharmacist verification within a required timeframe, failure to perform an independent double-check for a high-risk medication, failure to document monitoring prerequisites prior to administration, failure to capture required override rationale, or failure to acknowledge escalation notifications.

When an omission condition is detected, the governance control plane generates a governed omission event and records the event in the governance log, the record being bound to the execution context identifier and the applicable policy snapshot identifier. In response to the recorded omission event, the authorization state controller transitions the medication workflow instance into a held or restricted authorization state in accordance with the policy grammar.

While the medication workflow instance is in a held or restricted authorization state, downstream reliance events—including dispense release, administration documentation, or execution of device-mediated delivery—are blocked or deferred by a governed connector and/or a validation component positioned at or before a downstream acceptance endpoint.

In such states, the acceptance operation does not complete absent successful validation of an applicable readiness artifact under the execution context identifier and the policy snapshot identifier.

The medication workflow instance remains constrained until the omission is resolved by completion of the required action recorded as a governance record, or by recording an authorized override satisfying policy predicates and reflected in a readiness artifact that is validated under the execution context identifier and the policy snapshot identifier.

By elevating omission detection to a governed event that produces enforceable authorization-state consequences, the system reduces failure modes in which medication workflows advance despite missing required safety actions.

State advancement is conditioned on either (i) recorded completion of the required safeguards or (ii) a recorded and authorized override, in each case reflected in a readiness artifact that is successfully validated at the reliance boundary under the applicable execution context identifier and policy snapshot identifier.

The governance control plane enforces time-critical therapy obligations derived from the policy grammar as a function of patient context and workflow state. Such obligations are triggered when patient data satisfies policy-defined clinical predicates corresponding to emergent or time-sensitive conditions.

For example, when governed patient context indicates a condition associated with time-critical therapy initiation—including sepsis, anaphylaxis risk, acute infection, or other defined clinical syndromes—the obligation set derived for the medication workflow instance may include initiation of a specified therapy class within a defined time window measured from a policy-defined clinical reference event.

If a corresponding medication order, documented contraindication, or authorized override is not recorded within the required time window, the governance control plane generates an omission event indicating failure to initiate the required therapy. The omission event is recorded in the governance log and causes the authorization state controller to transition the medication workflow instance into a held or restricted authorization state.

In response to a recorded omission event, the governance control plane may initiate escalation actions defined by the applicable policy grammar, including notification of authorized roles, restriction of related downstream actions, or requirement for supervisory review.

Downstream reliance events associated with the affected medication workflow instance remain blocked or deferred until the omission is resolved through recorded completion of required actions or through recording and validation of an authorized override under the applicable execution context identifier and policy snapshot identifier.

This embodiment applies policy-defined workflow progression constraints to time-sensitive clinical processes through technical controls enforced at defined reliance boundaries.

Clinician discretion is preserved through structured override pathways defined in the policy grammar and recorded as governed audit records.

The controls condition workflow state advancement on satisfaction of policy-defined prerequisites and do not prescribe medical diagnosis or treatment decisions.

The governance control plane detects wrong-therapy and contraindication conditions by evaluating policy predicates against the medication workflow context. Such evaluation may consider patient-specific data, medication attributes, laboratory results, physiological measurements, allergy records, interaction databases, and institutional or jurisdictional constraints as defined in the applicable policy snapshot.

Non-limiting examples of wrong-therapy or contraindication conditions include selection of a medication that conflicts with recorded allergies, therapy inconsistent with patient specific laboratory values, therapy contraindicated by physiological parameters, therapy exceeding permitted dosing constraints for a patient class, or therapy prohibited under institutional or regulatory policy.

Upon detection of a wrong-therapy or contraindication condition, the governance control plane generates a governed contraindication event recorded in a governed audit record and transitions the medication workflow instance into a held or restricted authorization state. While in such a state, downstream effectuation events, including dispense release, administration documentation, or device-mediated delivery, are blocked by a governed connector and/or a validation component positioned at or before a downstream acceptance endpoint.

Release from the held or restricted state occurs only when a cryptographically verifiable governance record records completion of required corrective actions or an authorized override satisfying the policy grammar. The cryptographic validation engine verifies the integrity, authorization, and policy binding of the record prior to permitting state advancement.

By conditioning medication workflow advancement on verified resolution of contraindications, the system enforces patient specific safety constraints while preserving structured override mechanisms under controlled governance.

In one arrangement, medication workflow governance is enforced independently of where artificial intelligence models or decision-support systems execute. A platform hosted reasoning service may generate medication related recommendations, alerts, or proposed actions; however, acceptance of such outputs into order entry, pharmacy verification, dispense release, or administration documentation constitutes a reliance event governed by the governance control plane.

Accordingly, characterization of an output as advisory, assistive, or non-diagnostic does not alter governance enforcement at the reliance boundary. Governed connectors mediating medication workflows require validation of a readiness artifact derived from one or more governance records demonstrating satisfaction of policy-defined prerequisites prior to permitting downstream state advancement.

In such embodiments, an AI service hosted on an external platform cannot operationalize a medication action unless the governance control plane operating within the enterprise domain verifies completion of required actions under the applicable policy snapshot.

Verification further includes confirming absence of unresolved omission or integrity exception events and confirming satisfaction of applicable policy predicates recorded in the governance log.

In such embodiments, medication-related state transitions are permitted only when the governed connector verifies, at the time of the requested operation, that the applicable authorization state permits advancement under the policy snapshot identifier. The governed connector further verifies that a readiness artifact derived from one or more governance records associated with the execution context identifier is present and valid under the applicable policy snapshot identifier.

Verification is performed by the governed connector and/or a validation component positioned at or before the defined downstream acceptance endpoint responsible for operationalizing the medication action.

Deployment topology, hosting location of upstream components, or descriptive characterization of outputs does not modify conditioning of effectuation on runtime artifact validation.

Partitioning Across Administrative Domains and Cross-Domain Binding

Regulated workflows governed by the governance control plane may be executed across multiple administrative domains, each operated by a different entity and subject to distinct operational, legal, security, and compliance obligations. Administrative domains may include, without limitation, a regulated enterprise domain, a vendor application domain, a cloud-based reasoning or artificial intelligence service domain, and one or more intermediary integration or messaging domains.

The present disclosure recognizes that modern regulated systems are frequently partitioned across such administrative domains and that this partitioning is often used, intentionally or unintentionally, to fragment accountability, dilute enforcement responsibility, or assert that no single party performs a regulated act. The disclosed governance control plane is expressly designed to operate across these boundaries and to enforce policy gated reliance and audit conditioned completion semantics regardless of how responsibilities are distributed among participating entities.

The governance control plane may be deployed in a partitioned architecture in which different components of a regulated workflow are operated by different administrative domains. For example, a regulated enterprise domain may operate one or more systems of record, including an electronic medical record system, pharmacy system, dispensing system, or scheduling system, while a separate vendor or cloud reasoning service domain performs artificial intelligence based reasoning, orchestration, or decision support.

In such architectures, governance gaps commonly arise when no single component enforces policy constraints at the moment a workflow state advances or a downstream system accepts reliance on an output. To address this problem, the governance control plane enforces policy at controlled boundaries corresponding to reliance events, regardless of where upstream reasoning or downstream execution occurs.

Institutional and patient-directed policies define regulated data boundaries, action constraints, and reliance requirements applicable to a regulated workflow instance. The governance control plane evaluates the applicable policy snapshot for the execution context and enforces downstream acceptance at reliance boundaries based on the resulting authorization state and required governance artifacts.

In particular embodiments, a governed connector positioned at or near a system of record boundary blocks write back, finalization, dispatch, or execution unless policy prerequisites, obligation monitoring outcomes, and audit append requirements are satisfied. This enforcement applies independent of whether reasoning is performed locally, remotely, or by a third party operating in a different administrative domain.

Accordingly, distributing workflow functions across vendors, cloud platforms, and enterprise systems does not avoid governance enforcement when the combined system performs a regulated workflow.

The governance control plane binds a single execution context identifier to actions performed by multiple parties participating in a regulated workflow. The execution context identifier is propagated across requests, tool calls, connector operations, and governed audit records so that policy evaluation, obligation monitoring, authorization state control, and audit linkage apply uniformly to the workflow even when different administrative domains perform different steps.

For example, a vendor application domain may host a user interface or orchestration layer, a cloud reasoning service domain may execute one or more artificial intelligence models, and a regulated enterprise domain may operate a system-of-record connector.

Notwithstanding distribution of functionality across such domains, the governance control plane conditions write back, finalization, dispatch, or other reliance events on satisfaction of policy evaluation outcomes and obligation completion associated with the shared execution context identifier.

Where required by policy, acceptance of such reliance events further depends on recording corresponding audit entries under the applicable policy snapshot identifier prior to downstream effectuation.

In such embodiments, a party cannot avoid governance responsibility by asserting that it only provides a model, only provides an interface, or only performs integration. When actions across multiple administrative domains collectively cause advancement of a regulated workflow state, the governance control plane treats the combined actions as a single governed workflow instance bound by the execution context identifier.

This cross-domain binding ensures that governance enforcement remains effective even when responsibilities are split, outsourced, or dynamically reassigned, and enables independent verification that all reliance events occurred under a consistent policy snapshot and authorization state.

In certain embodiments, policies enforced by the governance control plane define regulated data-handling obligations applicable to a workflow instance, including protected health information minimization, de-identification, redaction, connector-scope restrictions, and downstream data-use limitations.

In such embodiments, the governance control plane enforces these obligations by constructing policy scoped governed context objects that include only data elements permitted for the execution context, applying redaction and transformation rules to structured and unstructured content, and restricting tool and connector requests to approved endpoints and operations.

In some implementations, policies further require one or more attestations from an external reasoning service domain or vendor domain, including non-training attestations, non-retention attestations, or limited-retention attestations. Each such attestation is bound to the execution context identifier and the applicable policy snapshot.

The governance control plane treats such attestations as required obligations for audit conditioned completion. If a required attestation is not obtained within a policy-defined time window, the governance control plane generates a governed omission event and applies a policy-defined response, including blocking write back or finalization, withholding delivery of outputs, downgrading autonomy mode, or escalating to supervisory review.

In such embodiments, the governed audit record stores references to applied redaction rules, permitted data scope, and attestation artifacts, thereby providing verifiable traceability of regulated data handling across administrative domains.

The governance control plane enforces effectuation control independent of where a governed connector is hosted. A governed connector mediates effectuation pathways including electronic medical record write back, order entry, messaging, scheduling actions, and device command dispatch.

The governed connector may be deployed within a regulated enterprise domain, a vendor application domain, or an intermediary integration platform. Regardless of deployment location, the governance control plane applies the same policy gated completion semantics.

In particular implementations, the governance control plane evaluates a write back operation or other state-advancing request as an effectuation attempt at a reliance boundary.

The effectuation attempt is associated with an execution context identifier and a policy snapshot identifier.

Before allowing acceptance, the governed connector requires verification of a readiness artifact derived from one or more governance records that reflect satisfaction of applicable prerequisites under the policy snapshot.

The readiness artifact constitutes machine-verifiable proof of the recorded authorization outcome. Effectuation is not permitted unless such verification succeeds at or before the downstream acceptance endpoint.

Similarly, when a vendor operates a connector on behalf of a customer, the governance control plane enforces connector scopes, write back constraints, and audit linkage at defined reliance boundaries. Relocating connector execution, outsourcing integration, or interposing intermediary systems does not modify the technical conditioning of effectuation on validation of a readiness artifact derived from governance-log records under the execution context identifier and policy snapshot identifier.

The governance control plane may be implemented by a combination of components operated by different administrative domains, while preserving a unified enforcement model at reliance boundaries. In such embodiments, policy evaluation outputs and audit linkage remain bound to the execution context identifier and policy snapshot identifier, and effectuation gating remains conditioned on validation of a readiness artifact derived from one or more governance records associated with that binding.

The present disclosure expressly contemplates that the disclosed governance functions may be performed collectively across such components, including routing governed context to a reasoning service, evaluating policy constraints, monitoring obligations, generating omission and integrity exception events, generating governed audit records with cryptographic linkage, and gating downstream effectuation via governed connectors.

In such embodiments, a first party may provide model execution, a second party may provide orchestration or user interface integration, and a third party may provide system-of-record connectors and policy repositories. The combined system performs a governed workflow in which write back, dispatch, or other reliance is conditioned on satisfaction of policy-defined prerequisites and on successful validation, at or before the downstream acceptance endpoint, of a readiness artifact derived from governance-log records that reflect such satisfaction.

Accordingly, entities that configure, enable, provide, integrate, host, or operate components that collectively cause performance of the governed workflow collectively implement policy-gated effectuation and audit-conditioned completion as disclosed herein. Allocation of operational responsibilities among entities does not modify the technical conditioning of effectuation on readiness artifact validation at defined reliance boundaries under the execution context identifier and policy snapshot identifier.

The governance control plane enforces policy governed execution by maintaining governed audit records whose structure and immutability are integral to authorization and effectuation control. Each governed audit record is generated as part of the active execution of a regulated workflow and is not merely a passive log entry. The audit record is bound to a specific execution context identifier and a specific policy snapshot identifier corresponding to the evaluated policy grammar in effect at the time the record is generated.

In such embodiments, the policy snapshot identifier references an immutable or versioned representation of the policy grammar and its parameterization as evaluated for the workflow instance. The governance control plane persists an association between the execution context identifier and the policy snapshot identifier within the governed audit record.

Downstream effectuation is permitted only when a readiness artifact cryptographically bound to the execution context identifier and the policy snapshot identifier is verified at or before the downstream acceptance endpoint and reflects an authorization outcome permitting the requested operation.

In some implementations, governed audit records are maintained in an append only structure with integrity protection such that deletion, modification, or reordering of records is detectable. Integrity protection may be implemented using cryptographic hash chaining, digital signatures, write-once storage, immutable object stores, trusted execution environments, or equivalent mechanisms that provide tamper evidence. Cryptographic techniques are disclosed as preferred embodiments, but the scope of the invention is not limited to any specific cryptographic primitive.

The governance control plane enforces audit-conditioned completion semantics by requiring that one or more governed audit records be generated and persisted as evidence of satisfaction of policy-defined prerequisites for downstream effectuation.

A workflow instance is not permitted to advance, and a downstream acceptance endpoint does not complete a state-changing operation, unless a governed connector and/or validation component validates a readiness artifact derived from such governed audit records and bound to the execution context identifier and policy snapshot identifier.

The governed audit records provide authoritative backing evidence from which the readiness artifact is derived, and the readiness artifact functions as the machine-verifiable authorization proof object at the acceptance boundary.

The governance control plane records human interaction events that are relevant to reliance on AI-generated outputs or governed workflow decisions. Such human interaction events include, without limitation, viewing, acknowledging, modifying, accepting, rejecting, signing, finalizing, committing, or otherwise incorporating content into a system of record or downstream execution pathway.

Each recorded human interaction event is bound to the execution context identifier associated with the workflow instance and to the applicable policy snapshot identifier. The audit record further includes authenticated role or credential identifiers, timestamps, and references to the regulated object affected by the interaction, such as a note, order, instruction, or workflow task.

In these embodiments, a human reliance action, including signing or finalizing a record that incorporates or depends upon an AI-generated output, is treated as a reliance event subject to governance enforcement. The governance control plane evaluates whether applicable policy-defined obligations have been satisfied and whether the current authorization state permits reliance. If policy predicates are not satisfied, a governed connector and/or a validation component positioned at or before the downstream acceptance endpoint blocks or defers completion of the human action, and the enforcement outcome is recorded in the governed audit record.

By recording human interaction events as governed, policy-bound audit records, the system reduces the risk of post-hoc assertions that reliance occurred outside the governed workflow or without policy relevance by providing verifiable, time-bound evidence of the reliance action under the applicable execution context identifier and policy snapshot identifier. This approach conditions completion of human-mediated reliance on the same authorization, omission detection, and audit-conditioned completion semantics applied to automated effectuation.

The governance control plane enforces dual-control, separation-of-duties, or multi-party authorization requirements for high-risk or regulated actions. Such requirements are defined in the policy grammar and evaluated as part of the authorization state model.

In these embodiments, a first authorized role may initiate a request for an action, such as an override, release, or clearance of a hold, while a second, distinct authorized role must independently approve the action before downstream effectuation is permitted. Each authorization action is recorded as a separate governed audit record, bound to a distinct authenticated credential and the same execution context identifier and policy snapshot identifier.

Governance artifacts generated by different administrative domains may be cryptographically signed or otherwise cryptographically bound such that a receiving domain can verify origin, integrity, and linkage. In some implementations, a governed connector validates the cryptographic binding before permitting a downstream acceptance endpoint to accept a state-advancing operation.

The governance log binds these signed artifacts together using a shared execution context identifier and policy snapshot identifier, enabling independent verification that both authorization and reliance were performed by appropriately authorized parties under the same policy basis. This dual-signature binding supports nonrepudiation and shared responsibility across administrative domains while preserving clear accountability for each action.

The governance control plane can generate exportable evidence bundles that support replayable, cryptographically verifiable proof of governance decisions and reliance-boundary enforcement for a regulated workflow instance. An evidence bundle may include selected governance records, governed audit records, readiness artifacts, policy snapshot identifiers or digests, and associated cryptographic linkage information. The evidence bundle may be provided to a verifier, auditor, or regulator and can be replayed to demonstrate, in a deterministic manner, the inputs considered, the policy snapshot applied, the authorization state transitions taken, and the enforcement outcome at a downstream acceptance endpoint.

The evidence bundle enables an independent verifier, auditor, regulator, or adjudicator to reconstruct the sequence of workflow events, policy evaluations, omission events, integrity exception events, authorization state transitions, and downstream effectuation decisions without reliance on proprietary application logs or live system access.

Replay is performed by evaluating the included audit records against the policy snapshot identifier that was bound to the execution context identifier at the time each record was generated. The replay operation references the versioned representation of the policy grammar corresponding to that policy snapshot identifier and applies the recorded authorization outcomes under that historical policy definition rather than under a subsequently modified policy.

In certain embodiments, evidence bundles are generated in a portable, self-describing format suitable for long-term retention, regulatory submission, internal audit, incident investigation, insurance review, or legal discovery. Cryptographic linkage and signature verification enable detection of tampering, omission, or reordering of records within the bundle.

An evidence bundle generated by the governance control plane comprises a defined collection of governed audit records, execution context identifiers, policy snapshot identifiers, and associated cryptographic linkage data sufficient to permit independent validation of recorded authorization outcomes. The bundle is structured to allow verification of record integrity, sequence continuity, and correspondence between state-advancing operations and recorded policy evaluations without access to the originating live system. Validation of the bundle permits a reviewing party to determine, based on the included artifacts, whether each recorded downstream effectuation was preceded by satisfaction and recording of the applicable policy-defined prerequisites.

Enterprise and Platform Deployment Examples

Where implemented, the governance control plane is deployed within a hospital or health-system environment and integrated with one or more healthcare information systems through governed connectors.

In such embodiments, the governed connectors ingest normalized workflow events from heterogeneous enterprise systems, including electronic medical record (EMR) systems, computerized provider order entry (CPOE) systems, pharmacy systems, automated dispensing systems, medication administration record (MAR) systems, laboratory systems, messaging systems, and scheduling systems.

The governance control plane binds each received event to an execution context identifier and evaluates applicable policy grammars to determine whether downstream reliance or state advancement is permitted.

In some implementations, an AI-assisted system proposes a medication related recommendation, documentation content, or tool invocation. Prior to committing the proposal into a regulated record or enabling a downstream effectuation event, the governance control plane derives an obligation set and enforces audit conditioned completion semantics.

If an omission event, integrity exception event, governed contraindication event, or policy violation event is detected, the authorization state controller transitions the workflow instance into a HELD or restricted state. Downstream effectuation is blocked until governance-log records reflect completion of required actions or an authorized override satisfying the policy grammar and a governed connector and/or validation component validates a readiness artifact derived from such records under the execution context identifier and policy snapshot identifier.

This deployment conditions regulated workflow advancement on enforcement at controlled reliance boundaries within the enterprise governance authority, independent of where model inference occurs, and conditions reliance on policy satisfaction that is recorded and verifiable under the execution context identifier and policy snapshot identifier.

The governance control plane is implemented independently of any particular EMR vendor, pharmacy system vendor, or dispensing system vendor.

Event normalization adapters translate heterogeneous vendor-specific messages, workflows, and APIs into a common event representation suitable for policy evaluation and state control. The same policy grammar, obligation logic, and authorization state model are applied uniformly across different combinations of enterprise systems.

In such embodiments, governance enforcement does not depend on proprietary vendor behavior, internal decision logic, or undocumented workflows. Instead, enforcement is applied at governed connectors positioned at controlled reliance boundaries.

Accordingly, substitution of one EMR system for another, or integration of additional downstream systems, does not alter the governance semantics, because state advancement remains conditioned on cryptographically verifiable audit artifacts satisfying policy predicates.

This vendor-agnostic design mitigates governance gaps that arise when compliance controls are embedded in proprietary workflows rather than enforced at the reliance boundary.

In one configuration, an AI model executes on an external platform and is accessed by an enterprise system through an application programming interface (API).

In such deployments, model inference, model updates, and internal platform orchestration may occur outside the regulated enterprise boundary, while clinical and operational responsibility remains with the enterprise.

In certain embodiments, the governance control plane remains within the enterprise governance authority and enforces policy at governed connectors that mediate outbound submission of governed inputs to an external reasoning service, receipt of outputs and intermediate artifacts, and downstream write back, tool invocation, or other state-advancing actions derived from such outputs. Mediation of outbound submission is optional and is applied to enforce policy-defined data scope, provenance binding, and attestation obligations without altering the primary enforcement model in which state-advancing operations are conditioned at defined reliance boundaries.

In such embodiments, a platform-hosted AI output is not operationalized at a downstream acceptance endpoint unless a governed connector and/or validation component validates a readiness artifact derived from governance-log records that reference the workflow instance, the applicable policy snapshot identifier, and completion or authorized override of required actions.

Accordingly, in deployments in which model execution occurs on an external platform, reliance and effectuation remain conditioned on validation of enterprise-governed readiness artifacts at defined reliance boundaries, rather than on the hosting location of model execution.

In some implementations, regulated workflows are performed across multiple parties that share responsibility for different portions of the workflow, including a regulated enterprise, one or more AI platform providers, and one or more third-party clinical or operational applications.

In such federated deployments, different parties may independently control model execution, user interface presentation, data retrieval, orchestration logic, messaging, order management, or device control, while regulatory accountability remains shared or resides with the regulated enterprise.

The governance control plane addresses governance gaps that arise in such deployments by enforcing policy-gated reliance and audit-conditioned completion at governed connectors positioned at controlled boundaries, irrespective of which party hosts a given component. In certain embodiments, cryptographic signing keys, policy snapshot repositories, and validation authority functions remain controlled by a designated governance authority so that readiness artifact validation can be performed locally and/or via a trusted validation service even when connectors are deployed outside a regulated enterprise domain.

Cross-domain binding associates a common execution context identifier and policy snapshot identifier across participating systems, enabling independent parties to reference and verify the same governed workflow instance while maintaining their own internal representations.

In such embodiments, partitioning of functionality across systems does not modify technical enforcement because downstream acceptance operations complete only upon validation, at or before the acceptance endpoint, of a readiness artifact reflecting cryptographically verifiable completion evidence under the applicable execution context identifier and policy snapshot identifier.

The governance control plane governs medication related workflows spanning order entry, pharmacy verification, dispensing release, dispensing, and administration.

Medication workflow events are received via governed connectors and normalized into a medication workflow instance bound to an execution context identifier, a patient identifier, and an encounter identifier.

The governance control plane evaluates policy grammars applicable to the medication workflow instance and derives an obligation set that may include required actions such as pharmacist verification, second-check for high-risk medications, confirmation of monitoring prerequisites, documentation of override rationale, or escalation acknowledgements.

Detection of an omission event, integrity exception event, governed contraindication event, or policy violation event, the authorization state controller transitions the medication workflow instance into a held or restricted authorization state under the applicable policy snapshot.

While the workflow instance remains in such a state, completion of downstream reliance events, including dispense release or administration completion, is conditioned on subsequent validation of a readiness artifact reflecting resolution of the triggering condition or recording of an authorized override under the applicable execution context identifier and policy snapshot identifier.

The medication workflow instance transitions out of the held state only when a cryptographically verifiable governance-log entry records completion of required actions or an authorized override satisfying the policy grammar, and the cryptographic validation engine verifies the entry.

In such embodiments, governed connectors enforce write back gating and acceptance-boundary enforcement by validating readiness artifacts derived from verified governance-log records, thereby conditioning downstream state advancement on recorded and verifiable policy satisfaction under the execution context identifier and policy snapshot identifier.

Technical Improvements

The embodiments described herein modify operation of computer systems that execute regulated workflows by introducing runtime gating at reliance boundaries. The governance control plane conditions workflow state advancement and downstream effectuation on verification of machine-verifiable prerequisites recorded under an execution context identifier and a policy snapshot identifier.

The disclosed system introduces a reliance boundary at which a state-changing action is accepted only after a governed connector or validation component verifies an applicable governance artifact. In embodiments in which the downstream acceptance endpoint is reachable only through the governed connector, the reliance boundary is implemented as mandatory mediation such that commit, finalize, dispatch, or execute operations complete only upon successful verification performed at or prior to the acceptance endpoint.

The governance control plane evaluates policy-defined predicates, tracks obligation satisfaction, and determines an authorization outcome prior to completion of a state-advancing operation. The enforcement point is the acceptance boundary at which a downstream system would otherwise commit data, finalize a transaction, dispatch an instruction, or execute an operation in reliance on an output.

The disclosed system uses governed connectors positioned at acceptance boundaries to verify cryptographically verifiable governance artifacts prior to effectuation. Policy-defined prerequisites are recorded in integrity-protected records, and effectuation completes only upon verification of an artifact that is bound to the execution context identifier, the policy snapshot identifier, and an authorization outcome permitting the requested operation.

The governance control plane improves workflow reliability by representing regulated workflows as machine-executable authorization state models rather than as sequences of loosely coupled alerts or recommendations. Required actions, deadlines, role constraints, and override conditions are derived from a policy grammar and enforced through authorization state transitions that control whether a workflow instance may advance.

Omission events are recorded as governed events when a policy-defined required action is missing, incomplete, or untimely under the applicable policy snapshot. Upon detection, the authorization state controller transitions the workflow instance into a held or restricted state. While the workflow instance is held or restricted, a governed connector or validation component conditions completion of any state-advancing operation on verification of an artifact that reflects the applicable authorization outcome under the execution context identifier and the policy snapshot identifier.

In some configurations, the append only, integrity-protected governance log stores records used to support derivation and verification of governance artifacts evaluated at acceptance boundaries. Workflow advancement and downstream effectuation are conditioned on verification of an applicable artifact that is bound to the execution context identifier and policy snapshot identifier and that corresponds to policy-defined predicates evaluated for the requested operation.

The system further provides replayable evidence bundles that enable reconstruction of authorization and effectuation timelines without dependence on proprietary application logs or undocumented internal behavior. Replayability allows independent verification that policy-defined prerequisites were satisfied at the time of each controlled transition, thereby improving the verifiability, defensibility, and auditability of computer-performed workflows.

In certain embodiments, the disclosed governance mechanisms operate independently of the specific artificial intelligence model, reasoning service, system of record vendor, or deployment architecture. Governance enforcement is anchored to reliance events and acceptance endpoints, rather than to model internals, output labeling, or vendor-specific workflows.

Enforcement conditions are applied at defined acceptance boundaries independent of upstream model selection, platform, vendor, or hosting environment. Workflow state advancement is conditioned on verification of an applicable governance artifact bound to the execution context identifier and the policy snapshot identifier. Verification is performed at or prior to completion of the state-advancing operation.

In one arrangement, omission-aware state control and audit-conditioned completion withhold state advancement when required actions are missing or incomplete under the applicable policy snapshot. Holds, restrictions, and escalation pathways remain in effect until completion evidence or an authorized override is recorded and verified under the execution context identifier.

In these arrangements, downstream execution completes only after verification of an artifact evidencing satisfaction of policy-defined prerequisites under the applicable policy snapshot. The verification step is applied before the downstream system commits a state change.

Collectively, the disclosed embodiments include: (i) reliance-boundary mediation via governed connectors, (ii) policy evaluation and obligation tracking under versioned policy snapshots, (iii) integrity-protected records supporting derivation of readiness artifacts, (iv) omission-aware authorization state transitions, and (v) evidence bundles supporting replay against the policy snapshot in effect at the time of each recorded event.

The disclosed mechanisms are applicable to environments in which downstream effectuation is conditioned on verification of policy-defined prerequisites as evidenced by integrity-protected records and readiness artifacts evaluated at acceptance boundaries.

DETAILED DESCRIPTION OF THE FIGURES

FIG. 1—System Level Governance Architecture. FIG. 1 illustrates a computer-implemented system architecture in which completion of downstream reliance operations is conditioned on verification, at an acceptance boundary, of an artifact that is cryptographically bound to an execution context identifier and a policy snapshot identifier and that reflects satisfaction of policy-defined prerequisites for the requested operation.

In the illustrated embodiment, a regulated workflow instance 100 generates or receives one or more workflow events originating from a workflow event source 102. The workflow event source 102 may include user actions, system-generated events, or outputs produced by an optional reasoning service 104. The reasoning service 104 may comprise an artificial intelligence model, decision-support engine, or other computational system and is not required to be co-located with the regulated workflow instance 100 or operated within a regulated enterprise boundary.

Workflow events associated with the regulated workflow instance 100 are received by the governance control plane 110, which operates as a computer-implemented enforcement layer configured to govern downstream reliance in regulated workflows. The governance control plane 110 includes a policy snapshot repository 112 that stores one or more machine-interpretable policy snapshots, each policy snapshot representing a versioned and immutable policy basis applicable to one or more workflow instances.

The governance control plane 110 further includes a policy evaluation engine 114 configured to evaluate a selected policy snapshot against execution context associated with the regulated workflow instance 100. Based on the policy evaluation, an obligation and omission engine 116 derives one or more required actions and associated constraints and detects omission conditions when required actions are missing, incomplete, or untimely.

An authorization state controller 118 maintains a machine-executable authorization state associated with the regulated workflow instance 100, the authorization state representing whether downstream state advancement is permitted, restricted, or held. The authorization state is updated in response to policy evaluation outcomes, detected omissions, and integrity conditions, and is enforced independently of how workflow events or reasoning outputs are generated.

The governance control plane 110 maintains a governance log 120 implemented as an append only, tamper evident sequence of governance records 134 (also referred to herein as governed audit records). A cryptographic validation engine 122 generates and verifies each governance record 134 as integrity-protected data bound to an execution context identifier 130 and a policy snapshot identifier 132.

A governance record 134 may include an authorization outcome, identifiers for evaluated predicates and/or obligations, an effectuation class or scope descriptor, a validity interval or expiry, and cryptographic binding data enabling verification of integrity, issuer authenticity, and linkage to the referenced identifiers.

A governed connector 140 is operatively coupled to the governance control plane 110 and mediates access to a downstream acceptance endpoint 142 associated with a downstream system of record 144. The downstream acceptance endpoint 142 corresponds to a technical point at which a write back, commit, finalize, dispatch, execution, or other effectuation operation would advance a state of the regulated workflow instance 100 within the downstream system of record 144.

Prior to completion of a state-advancing operation at the downstream acceptance endpoint 142, the governed connector 140 verifies a readiness artifact 402 derived from one or more governance records 134 using the cryptographic validation engine 122.

The readiness artifact 402 is verified to be bound to the execution context identifier 130 and the policy snapshot identifier 132 applicable to the requested operation, and to reflect an authorization outcome permitting the requested operation within an applicable scope and time interval.

Based on the verification result, the governed connector 140 applies the enforcement decision at the acceptance boundary by permitting, blocking, or deferring the requested operation before modification of the downstream system of record 144.

REFERENCE LIST

100—REGULATED WORKFLOW INSTANCE
102—WORKFLOW EVENT SOURCE
104—REASONING SERVICE
110—GOVERNANCE CONTROL PLANE
112—POLICY SNAPSHOT REPOSITORY
114—POLICY EVALUATION ENGINE
116—OBLIGATION AND OMISSION ENGINE
118—AUTHORIZATION STATE CONTROLLER
120—GOVERNANCE LOG
122—CRYPTOGRAPHIC VALIDATION ENGINE
130—EXECUTION CONTEXT IDENTIFIER
132—POLICY SNAPSHOT IDENTIFIER
134—GOVERNANCE RECORD
140—GOVERNED CONNECTOR
142—DOWNSTREAM ACCEPTANCE ENDPOINT
144—DOWNSTREAM SYSTEM OF RECORD

Figure 2:
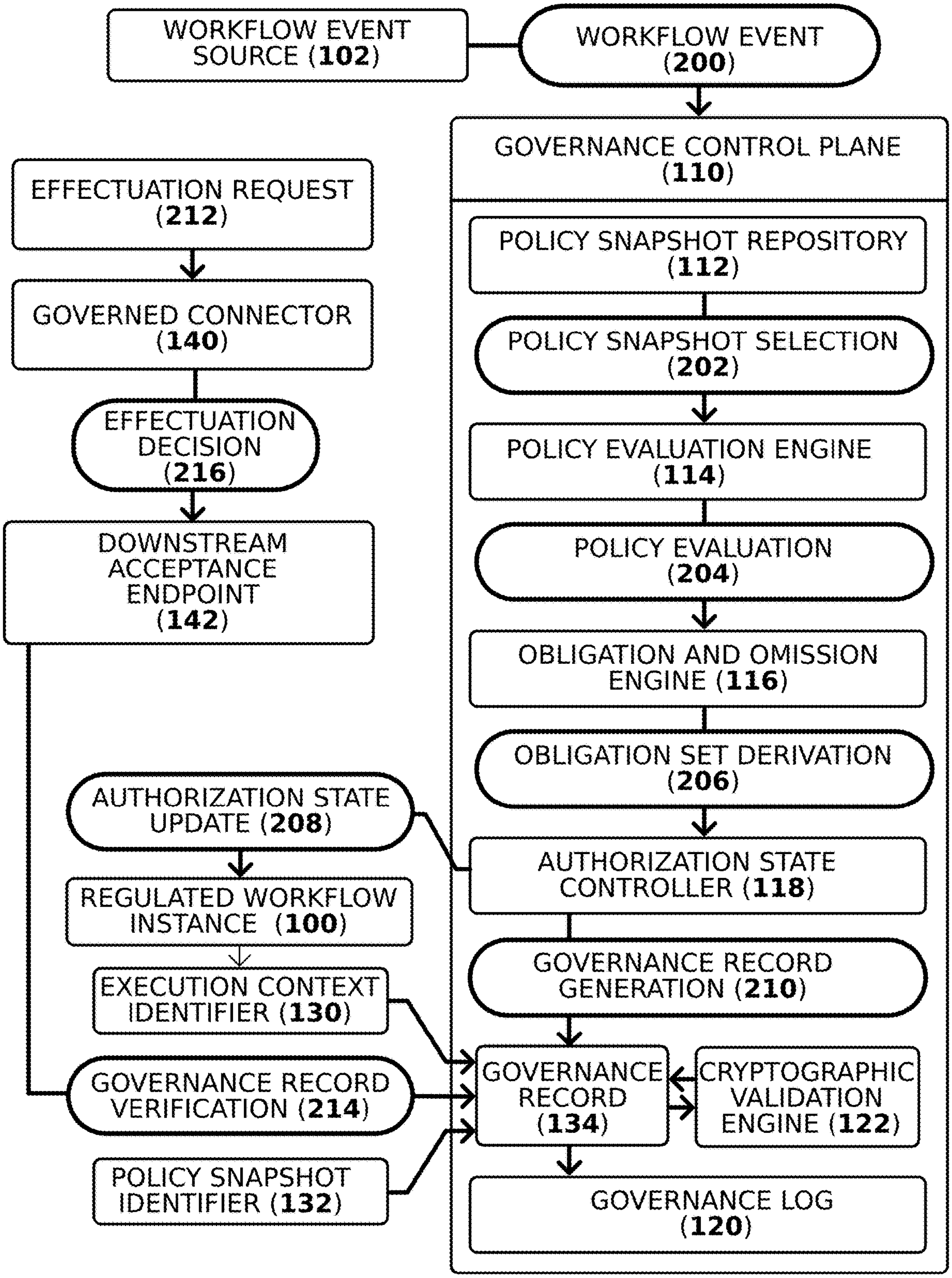
FIG. 2 is a block diagram illustrating a core enforcement loop executed by the governance control plane, including policy snapshot selection, obligation derivation, authorization state update, governance record generation, and effectuation gating.

FIG. 2—Core Enforcement Loop. FIG. 2 illustrates a computer-implemented core enforcement loop executed by a governance control plane 110 to compute, record, and enforce policy governed authorization outcomes for a regulated workflow instance 100.

In the illustrated embodiment, a workflow event 200 associated with the regulated workflow instance 100 is received by the governance control plane 110 from a workflow event source 102. The workflow event 200 may represent a user action, a system-generated event, an upstream decision output, or another event relevant to progression of the regulated workflow instance 100.

In response to receipt of the workflow event 200, the governance control plane 110 performs a policy snapshot selection 202 to select a policy snapshot applicable to the regulated workflow instance 100, the selection being performed using a policy snapshot repository 112. The selected policy snapshot represents a specific, versioned, machine-interpretable policy basis against which authorization is to be evaluated.

The governance control plane 110 then performs a policy evaluation 204 using a policy evaluation engine 114, evaluating the selected policy snapshot against execution context associated with the regulated workflow instance 100. The execution context may include, without limitation, workflow state, actor identity, temporal information, prior authorization outcomes, and recorded governance events.

Based on the policy evaluation 204, an obligation and omission engine 116 performs an obligation set derivation 206 to derive an obligation set comprising one or more required actions and associated constraints that must be satisfied prior to downstream state advancement. The associated constraints may include ordering constraints, role-based constraints, time constraints, or integrity constraints.

Following derivation of the obligation set, an authorization state controller 118 performs an authorization state update 208 to update a machine-executable authorization state associated with the regulated workflow instance 100, based on satisfaction or non-satisfaction of the derived obligations and any detected integrity or omission conditions. The authorization state represents an enforceable determination of whether downstream effectuation is permitted, restricted, or held.

After updating the authorization state, the governance control plane 110 performs a governance record generation 210 to generate a governance record 134 that records satisfaction or non-satisfaction of the required actions under the selected policy snapshot. The governance record 134 is cryptographically bound to an execution context identifier 130 identifying the regulated workflow instance 100 and to a policy snapshot identifier 132 identifying the evaluated policy snapshot. The governance record 134 is stored in a governance log 120, which in certain embodiments is implemented as an append only, tamper evident sequence of governance records, and is cryptographically protected by a cryptographic validation engine 122.

When a downstream effectuation request 212 is attempted and the requested operation would advance a state of the regulated workflow instance 100 or constitute a reliance event, the request is mediated by a governed connector 140. The governed connector 140 performs readiness artifact verification 214 at or prior to the downstream acceptance endpoint 142 prior to completion of the requested operation. The verification evaluates cryptographic validity of a readiness artifact 402 derived from one or more governance records 134 and confirms binding to the execution context identifier 130 and the applicable policy snapshot identifier 132 for the requested operation.

Based on the result of the readiness artifact verification 214, the governed connector 140 enforces an effectuation decision 216 comprising permitting, blocking, or deferring the downstream effectuation request 212. The effectuation decision 216 is applied prior to any state change at the downstream acceptance endpoint 142, and downstream state advancement occurs only upon verification that policy-defined predicates applicable to the requested operation are satisfied under the applicable policy snapshot, as evidenced by the verified readiness artifact.

REFERENCE LIST

100—REGULATED WORKFLOW INSTANCE
102—WORKFLOW EVENT SOURCE
110—GOVERNANCE CONTROL PLANE
112—POLICY SNAPSHOT REPOSITORY
114—POLICY EVALUATION ENGINE
116—OBLIGATION AND OMISSION ENGINE
118—AUTHORIZATION STATE CONTROLLER
120—GOVERNANCE LOG
122—CRYPTOGRAPHIC VALIDATION ENGINE
130—EXECUTION CONTEXT IDENTIFIER
132—POLICY SNAPSHOT IDENTIFIER
134—GOVERNANCE RECORD
140—GOVERNED CONNECTOR
142—DOWNSTREAM ACCEPTANCE ENDPOINT
200—WORKFLOW EVENT
202—POLICY SNAPSHOT SELECTION
204—POLICY EVALUATION
206—OBLIGATION SET DERIVATION
208—AUTHORIZATION STATE UPDATE
210—GOVERNANCE RECORD GENERATION
212—EFFECTUATION REQUEST
214—GOVERNANCE RECORD VERIFICATION
216—EFFECTUATION DECISION

Figure 3:
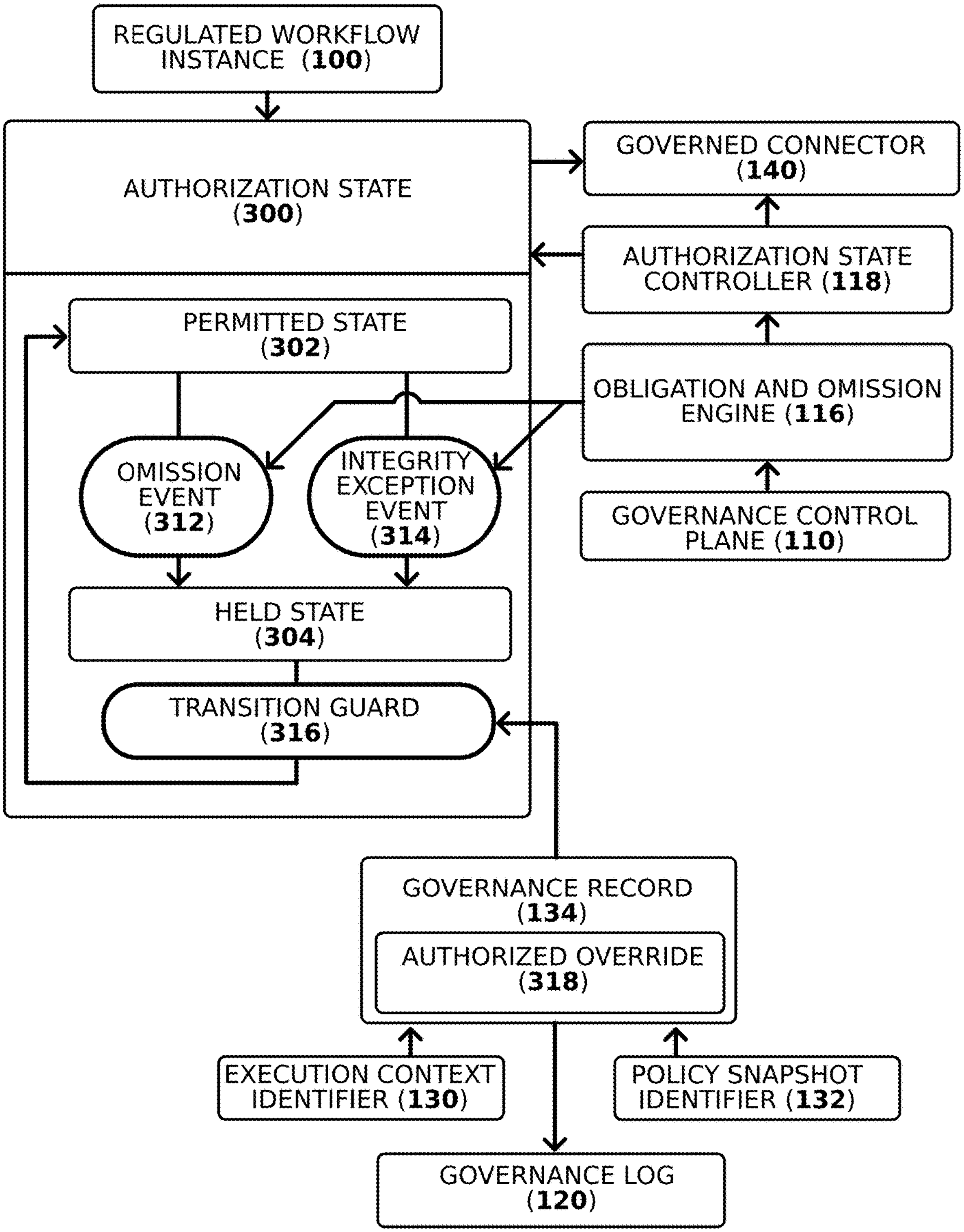
FIG. 3 is a block diagram illustrating an authorization state model in which policy compliance is represented as machine-executable authorization states with transition guards enforced prior to downstream effectuation.

FIG. 3—Authorization State Machine. FIG. 3 illustrates a machine-executable authorization state model enforced by a governance control plane 110 for a regulated workflow instance 100, in which policy compliance is represented as enforceable authorization state rather than as advisory signaling.

In the illustrated embodiment, an authorization state controller 118 maintains an authorization state 300 associated with the regulated workflow instance 100. The authorization state 300 comprises a plurality of discrete, machine-executable state values that determine eligibility for downstream effectuation. The authorization state 300 includes a permitted state 302, in which downstream effectuation is eligible to proceed upon successful verification at the acceptance boundary, and a held state 304, in which downstream effectuation is ineligible unless a release guard is satisfied and verified.

While the authorization state 300 is in the permitted state 302, downstream effectuation requests may be evaluated for acceptance subject to verification of an applicable readiness artifact and/or referenced governance records corresponding to the requested operation. Upon detection of an omission event 312 by an obligation and omission engine 116, indicating that a required action derived from an applicable policy snapshot has not been satisfied within a defined constraint, the authorization state controller 118 transitions the authorization state 300 from the permitted state 302 to the held state 304. Similarly, upon detection of an integrity exception event 314, the authorization state controller 118 transitions the authorization state 300 to the held state 304.

While the authorization state 300 is in the held state 304, any attempted downstream effectuation request associated with the regulated workflow instance 100 is blocked or deferred by a governed connector 140 at the acceptance boundary, irrespective of whether an associated artificial intelligence output is labeled as advisory, informational, or non-binding. The held state 304 therefore represents a technically enforced restriction on downstream reliance.

Advancement of the authorization state 300 from the held state 304 to the permitted state 302 is conditioned on satisfaction of one or more transition guards 316 evaluated at effectuation time. In embodiments, the transition guards 316 include verification of a readiness artifact derived from one or more governance records 134 that record completion of required actions under an applicable policy snapshot. In certain embodiments, the transition guards 316 further include verification of an authorized override 318.

The authorized override 318 represents an explicitly recorded exception to one or more policy-defined requirements and is persisted in a governance log 120. The authorized override 318 is cryptographically bound to an execution context identifier 130 and a policy snapshot identifier 132, such that use of the authorized override 318 is auditable, verifiable, and limited to the applicable workflow instance and policy snapshot.

The authorization state model illustrated in FIG. 3 implements workflow progression through defined state transitions evaluated by the governance control plane against the applicable policy snapshot identifier 132 and execution context identifier 130. Each transition is conditioned on verification of required governance artifacts, including any authorized override 318, and is executed only upon satisfaction of the corresponding transition guard logic. State advancement is therefore determined by runtime evaluation of machine-executable predicates and cryptographically verifiable authorization artifacts recorded in the governance log 120 prior to effectuation.

REFERENCE LIST

100—REGULATED WORKFLOW INSTANCE
110—GOVERNANCE CONTROL PLANE
116—OBLIGATION AND OMISSION ENGINE
118—AUTHORIZATION STATE CONTROLLER
120—GOVERNANCE LOG
130—EXECUTION CONTEXT IDENTIFIER
132—POLICY SNAPSHOT IDENTIFIER
134—GOVERNANCE RECORD
140—GOVERNED CONNECTOR
300—AUTHORIZATION STATE
302—PERMITTED STATE
304—HELD STATE
312—OMISSION EVENT
314—INTEGRITY EXCEPTION EVENT
316—TRANSITION GUARD
318—AUTHORIZED OVERRIDE

Figure 4:
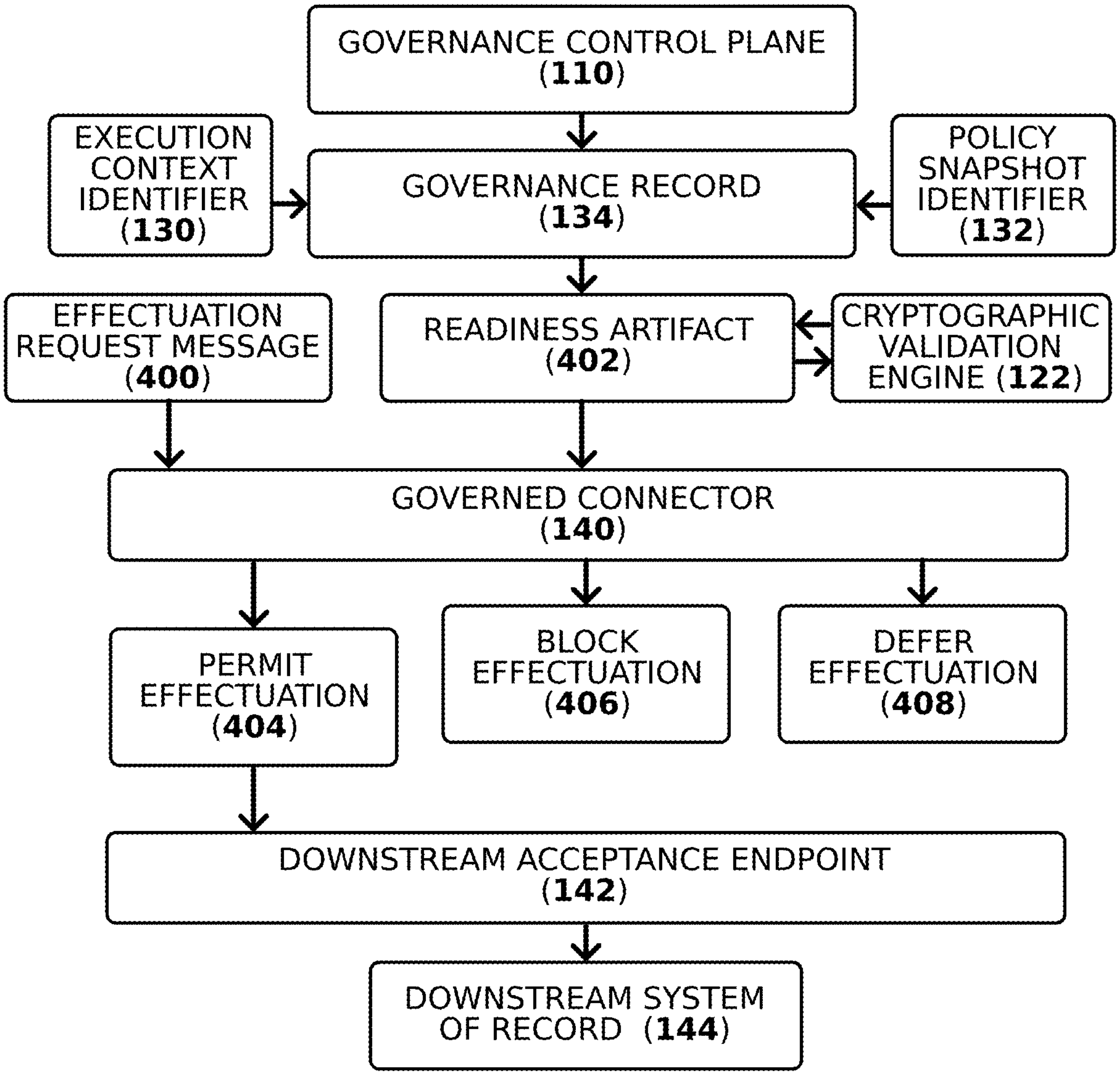
FIG. 4 is a block diagram illustrating write back and effectuation gating at a downstream acceptance endpoint using a readiness artifact derived from a governance record.

FIG. 4—Governed Connector at Acceptance Endpoint. FIG. 4 illustrates a computer-implemented enforcement mechanism in which policy governed effectuation is technically enforced at a downstream acceptance endpoint 142 through a governed connector 140 that operates as a mandatory mediation layer.

In the illustrated embodiment, a governance control plane 110 generates a governance record 134 that represents an authoritative, cryptographically verifiable determination of whether policy-defined prerequisites applicable to a workflow instance have been satisfied. The governance record 134 is cryptographically bound to an execution context identifier 130 identifying the workflow instance and to a policy snapshot identifier 132 identifying the specific policy snapshot evaluated. The governance record 134 records an authorization outcome indicating satisfaction or non-satisfaction of the evaluated policy conditions.

From the governance record 134, the governance control plane 110 derives a readiness artifact 402. The readiness artifact 402 constitutes a cryptographically protected, machine-verifiable artifact that encodes, directly or by reference, the authorization outcome recorded in the governance record 134 and the binding between the execution context identifier 130 and the policy snapshot identifier 132. The readiness artifact 402 is protected by a cryptographic validation engine 122 such that tampering, replay outside an authorized context, or substitution with an artifact associated with a different execution context or policy snapshot is detectable.

An effectuation request message 400 is generated when a downstream operation is attempted that would advance the state of a regulated workflow instance. The effectuation request message 400 may comprise, without limitation, a write back operation, a commit operation, a finalize operation, a dispatch operation, an execution operation, or an authorization operation directed to a downstream system of record 144. The effectuation request message 400 is not permitted to directly reach the downstream acceptance endpoint 142.

The effectuation request message 400 is intercepted and mediated by the governed connector 140 positioned in-line with the downstream acceptance endpoint 142. Prior to forwarding the request, the governed connector 140 performs a verification operation on the readiness artifact 402 associated with the effectuation request message 400. The downstream acceptance endpoint 142 processes the request only upon successful validation of the readiness artifact 402 under the applicable execution context identifier and policy snapshot identifier.

During the verification operation, the governed connector 140 cryptographically validates the readiness artifact 402 to determine whether the requested downstream operation is authorized.

The readiness artifact 402 is verified to correspond to the execution context identifier 130 associated with the workflow instance, to reference the applicable policy snapshot identifier 132, and to reflect an authorization outcome permitting the requested operation within an applicable scope and validity interval.

If the readiness artifact 402 is absent, fails validation, is expired, is inconsistent with the execution context identifier 130 or policy snapshot identifier 132, or reflects a non-permitting authorization outcome, the governed connector 140 applies the enforcement decision by blocking or deferring the requested operation prior to any state change at the downstream acceptance endpoint 142.

Based on the result of the verification operation, the governed connector 140 enforces an effectuation decision comprising permitting the effectuation 404, blocking the effectuation 406, or deferring the effectuation 408. The effectuation decision is applied prior to any state change within the downstream system of record 144.

The downstream acceptance endpoint 142 completes processing of a state-advancing operation only upon successful validation of the readiness artifact 402 under the applicable execution context identifier 130 and policy snapshot identifier 132. Validation includes verification that the readiness artifact 402 is cryptographically valid, is bound to the execution context identifier 130, references the applicable policy snapshot identifier 132, and reflects an authorization outcome permitting the requested operation within an applicable scope and validity interval. If validation fails, the governed connector 140 applies the corresponding enforcement outcome before any modification of downstream system state occurs.

REFERENCE LIST

110—GOVERNANCE CONTROL PLANE
122—CRYPTOGRAPHIC VALIDATION ENGINE
134—GOVERNANCE RECORD
130—EXECUTION CONTEXT IDENTIFIER
132—POLICY SNAPSHOT IDENTIFIER
402—READINESS ARTIFACT
400—EFFECTUATION REQUEST MESSAGE
140—GOVERNED CONNECTOR
142—DOWNSTREAM ACCEPTANCE ENDPOINT
144—DOWNSTREAM SYSTEM OF RECORD
404—PERMIT EFFECTUATION
406—BLOCK EFFECTUATION
408—DEFER EFFECTUATION

Figure 5:
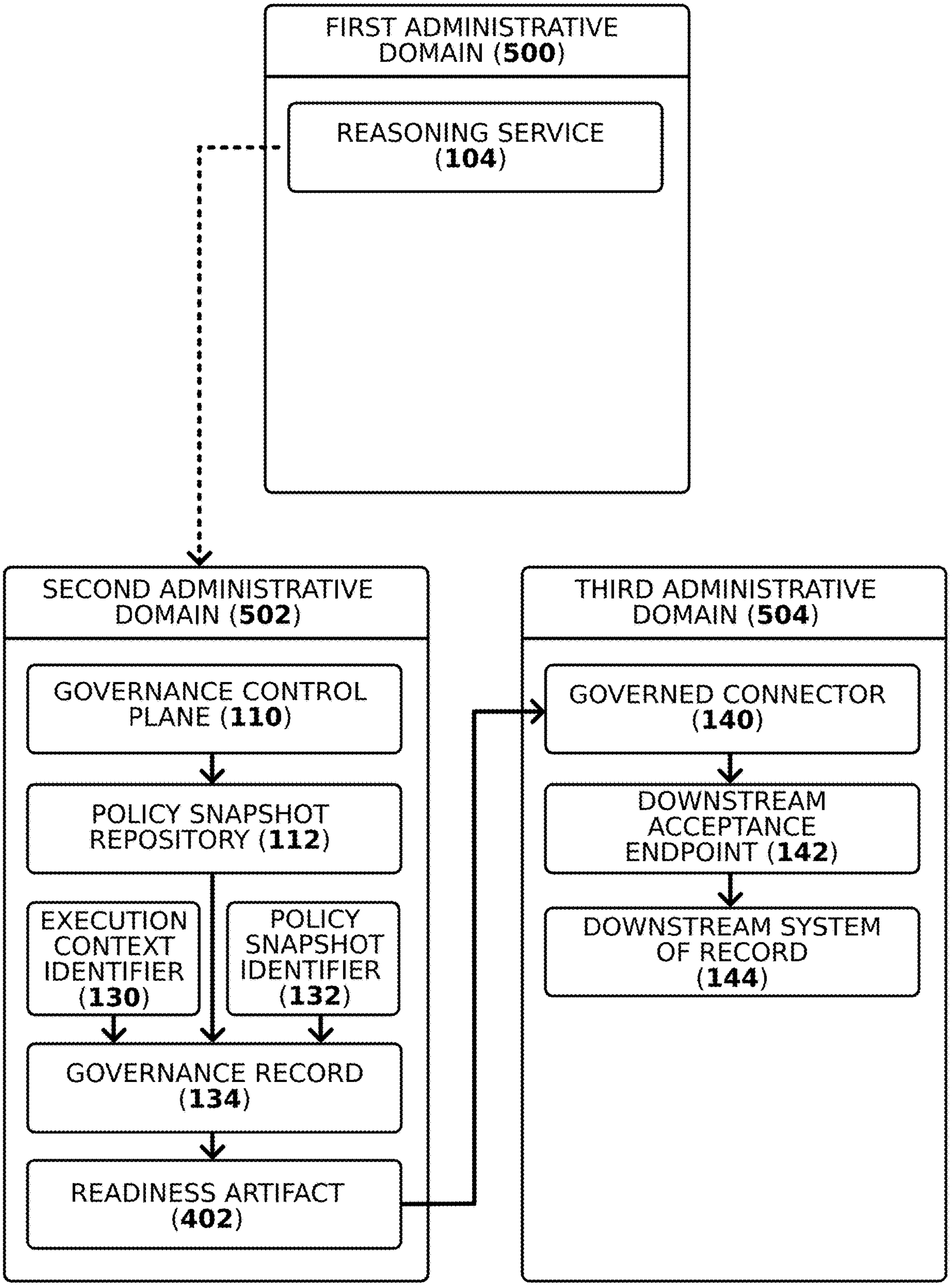
FIG. 5 is a block diagram illustrating enforcement of policy governed effectuation across multiple administrative domains using cryptographically verifiable readiness artifacts.

FIG. 5—Distributed/Multi-Domain Enforcement. FIG. 5 illustrates a computer-implemented architecture in which policy governed execution of a regulated workflow is enforced across multiple administrative domains, such that partitioning reasoning execution, policy evaluation, and downstream workflow execution does not modify enforcement at a defined reliance boundary. In the illustrated embodiment, completion of a state-advancing operation at a downstream acceptance endpoint is conditioned on verification of a readiness artifact by a governed connector and/or by a validation component operating at the acceptance endpoint.

In the illustrated embodiment, a first administrative domain 500 executes a reasoning service 104 configured to generate a proposed output associated with a regulated workflow instance. The reasoning service 104 may be operated by a platform provider, cloud service provider, or other third party that is distinct from a regulated enterprise and outside the administrative control of downstream systems of record.

A second administrative domain 502 operates a governance control plane 110 that performs policy evaluation and authorization determination for the regulated workflow instance. The governance control plane 110 selects and evaluates a policy snapshot from a policy snapshot repository 112, derives policy-defined required actions, maintains an authorization state for the workflow instance, and generates a governance record 134 recording satisfaction or non-satisfaction of policy requirements. The governance record 134 is cryptographically bound to an execution context identifier 130 identifying the workflow instance and to a policy snapshot identifier 132 identifying the evaluated policy snapshot.

From the governance record 134, the governance control plane 110 derives a readiness artifact 402 that encodes, directly or by reference, the authorization outcome determined under the evaluated policy snapshot. In certain embodiments, the readiness artifact 402 further encodes or references a permitted operation class and effectuation scope, and includes a defined validity interval or expiration to limit reuse beyond the authorized time window. The readiness artifact 402 is cryptographically protected and is suitable for transmission across administrative boundaries without exposing internal policy logic or internal control-plane state.

A third administrative domain 504 operates a governed connector 140 interfaced with a downstream system of record 144 through a downstream acceptance endpoint 142. The governed connector 140 mediates effectuation requests derived from the proposed output generated by the reasoning service 104 in the first administrative domain 500. Prior to permitting the downstream acceptance endpoint 142 to process a state-advancing operation, the governed connector 140 verifies the readiness artifact 402 associated with the request by confirming cryptographic integrity and issuer authenticity and by confirming binding of the readiness artifact 402 to the execution context identifier 130 and the policy snapshot identifier 132 applicable to the workflow instance. The downstream acceptance endpoint 142 completes acceptance only upon successful validation of the readiness artifact 402.

Upon receipt of an effectuation request, the governed connector 140 cryptographically verifies the readiness artifact 402 to determine that the readiness artifact 402 (i) is bound to the execution context identifier 130, (ii) references the applicable policy snapshot identifier 132, (iii) reflects an authorization outcome permitting the requested downstream operation within the encoded or referenced effectuation scope, and (iv) remains within any defined validity interval or expiration. Based on the verification result, the governed connector 140 permits, blocks, or defers write back, finalization, dispatch, or execution at the downstream acceptance endpoint 142.

As illustrated in FIG. 5, policy governed effectuation is enforced at the downstream acceptance endpoint 142 through operation of the governed connector 140.

For each effectuation request, the governed connector 140 performs cryptographic verification of the readiness artifact 402 prior to completion of the requested state-advancing operation, including verification of binding to the execution context identifier 130 and reference to the policy snapshot identifier 132. Validation at the acceptance boundary conditions effectuation on successful readiness artifact verification, independent of the administrative domain in which upstream output generation, user interaction, or orchestration occurs.

REFERENCE LIST

104—REASONING SERVICE
110—GOVERNANCE CONTROL PLANE

112—POLICY SNAPSHOT REPOSITORY
130—EXECUTION CONTEXT IDENTIFIER
132—POLICY SNAPSHOT IDENTIFIER
134—GOVERNANCE RECORD
140—GOVERNED CONNECTOR
142—DOWNSTREAM ACCEPTANCE ENDPOINT
144—DOWNSTREAM SYSTEM OF RECORD
402—READINESS ARTIFACT
500—FIRST ADMINISTRATIVE DOMAIN
502—SECOND ADMINISTRATIVE DOMAIN
504—THIRD ADMINISTRATIVE DOMAIN

Figure 6:
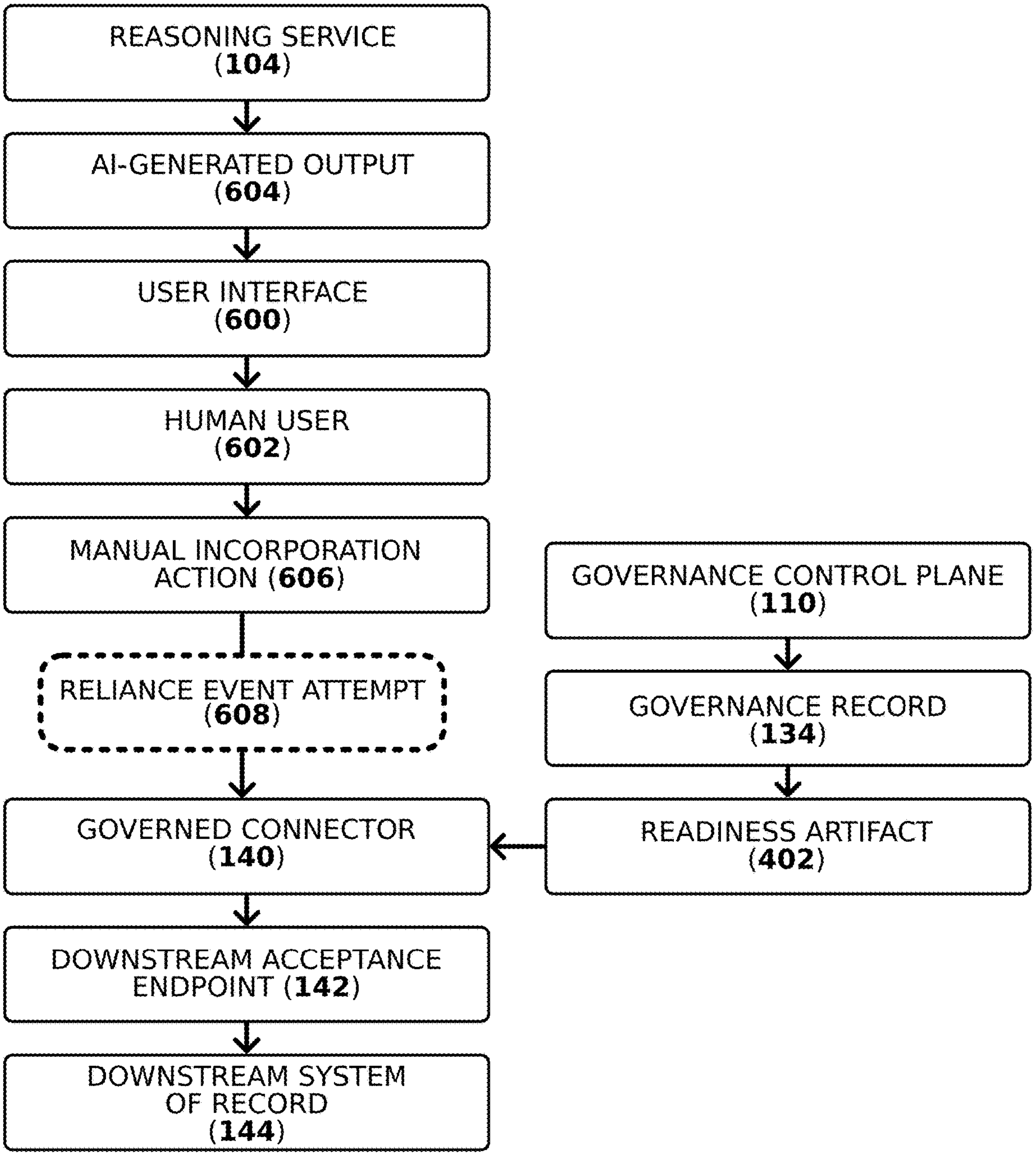
FIG. 6 is a block diagram illustrating governance enforcement for manual incorporation of artificial-intelligence-derived content, in which commit, finalize, or sign operations are treated as reliance events.

FIG. 6—Manual Incorporation/Human Reliance. FIG. 6 illustrates a computer-implemented enforcement mechanism in which policy governed execution is applied when an output generated by an artificial intelligence system is manually incorporated into a regulated system of record, such that completion of a commit, finalize, sign, or equivalent acceptance operation remains conditioned on readiness artifact validation at a downstream acceptance endpoint.

In the illustrated embodiment, a reasoning service 104 generates an AI-generated output 604. The AI-generated output 604 is presented to a human user 602 via a user interface 600. The AI-generated output 604 may be labeled as advisory, informational, or non-binding; however, such labeling does not affect enforcement behavior.

The human user 602 performs a manual incorporation action 606 comprising copying, pasting, paraphrasing, editing, re-entering, or otherwise transferring content derived from the AI-generated output 604 into a downstream system of record 144. The manual incorporation action 606 may occur outside the direct control of the reasoning service 104 and may not be observable at the time the AI-generated output 604 is produced.

Upon a reliance event attempt 608, including an attempted commit, finalize, sign, or other reliance event associated with the manually incorporated content, the governed connector 140 mediates the operation at a downstream acceptance endpoint 142. Prior to permitting acceptance, the governance control plane 110 evaluates whether policy-defined required actions associated with the regulated workflow instance have been satisfied and records the resulting authorization outcome in a governance record 134 bound to the execution context identifier and the applicable policy snapshot identifier. Acceptance of the reliance event attempt 608 is conditioned on readiness artifact validation derived from the recorded authorization outcome.

From the governance record 134, the governance control plane 110 derives a readiness artifact 402 that represents a machine-verifiable authorization outcome bound to the execution context identifier and the applicable policy snapshot identifier. The governed connector 140 cryptographically verifies the readiness artifact 402 prior to permitting the reliance event to proceed.

If the readiness artifact 402 is not presented, fails cryptographic validation, is outside a defined validity interval, or does not reflect an authorization outcome permitting the requested operation under the applicable policy snapshot, the governed connector 140 applies the corresponding enforcement decision prior to any state change at the downstream acceptance endpoint 142.

Cryptographic validation includes verification of integrity and issuer authenticity and confirmation that the readiness artifact 402 is bound to the execution context identifier and references the applicable policy snapshot identifier for the workflow instance. The commit, finalize, or equivalent state-advancing operation is not executed unless validation succeeds. Evaluation occurs at the time the downstream system of record 144 would otherwise accept the operation, without regard to the manner in which the underlying content was generated or introduced.

REFERENCE LIST

104—REASONING SERVICE
110—GOVERNANCE CONTROL PLANE
140—GOVERNED CONNECTOR
142—DOWNSTREAM ACCEPTANCE ENDPOINT
144—DOWNSTREAM SYSTEM OF RECORD
600—USER INTERFACE
602—HUMAN USER
604—AI-GENERATED OUTPUT
606—MANUAL INCORPORATION ACTION
608—RELIANCE EVENT ATTEMPT
134—GOVERNANCE RECORD
402—READINESS ARTIFACT

Figure 7:
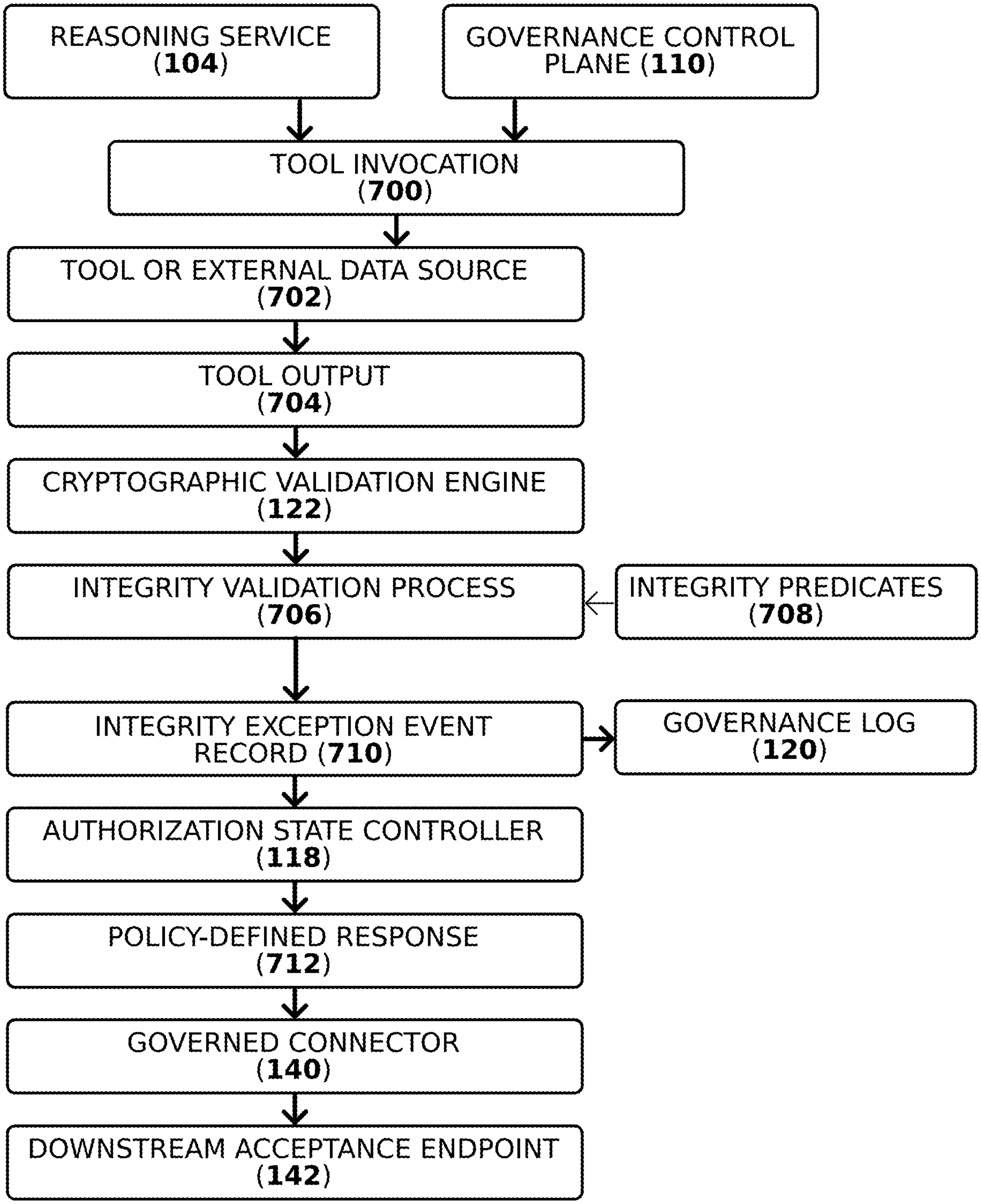
FIG. 7 is a block diagram illustrating detection and handling of integrity exception events associated with tool outputs or externally retrieved data prior to downstream reliance.

FIG. 7—Integrity Exception Event Detection (Tool Output Integrity Enforcement). FIG. 7 illustrates a computer-implemented enforcement mechanism for detecting and responding to integrity failures associated with tool outputs or externally retrieved data used in a regulated workflow, thereby conditioning downstream reliance on satisfaction of integrity predicates and recorded authorization outcomes.

In the illustrated embodiment, a tool invocation 700 is initiated under control of a reasoning service 104 operating within a governance control plane 110 to access a tool or external data source 702. The tool or external data source 702 returns a tool output 704 comprising retrieved data, evidence, recommendations, measurements, or other artifacts proposed for use in a regulated workflow instance.

Prior to permitting reliance on the tool output 704, a cryptographic validation engine 122 performs an integrity validation process 706. The integrity validation process 706 evaluates one or more integrity predicates 708 associated with the tool output 704. The integrity predicates 708 may include, without limitation, schema validation, provenance verification, cryptographic signature validation, authorization scope validation, digest matching, freshness evaluation, and detection of prompt-injection or output-manipulation indicators.

When the integrity validation process 706 determines that one or more integrity predicates 708 are not satisfied, the governance control plane 110 generates an integrity exception event record 710. The integrity exception event record 710 records that the tool output 704 is not eligible for reliance and is persisted in a governance log 120. The integrity exception event record 710 is cryptographically associated with an execution context identifier and an applicable policy snapshot identifier, such that the integrity failure is durably recorded and auditable.

In response to the integrity exception event record 710, an authorization state controller 118 applies a policy-defined response 712 that constrains downstream workflow progression. The policy-defined response 712 may comprise transitioning the regulated workflow instance into a held state, blocking downstream effectuation, requiring refreshed retrieval from an approved source, requiring supervisory or secondary review, or downgrading autonomy for subsequent actions.

The governed connector 140 enforces the policy-defined response 712 by evaluating, at the downstream acceptance endpoint 142, whether the workflow instance is constrained by an integrity exception event record 710 and whether a readiness artifact derived from a governance record 134 reflects an authorization outcome permitting the requested operation.

The governed connector 140 does not recompute integrity predicates 708 at the acceptance boundary. Instead, it verifies cryptographic validity and binding of the readiness artifact and applies the enforcement outcome when the recorded authorization state and associated integrity exception event record 710 indicate the request is not permitted. Evaluation is performed at the time a reliance event is requested and is bound to the execution context identifier and the applicable policy snapshot identifier.

REFERENCE LIST

104—REASONING SERVICE
110—GOVERNANCE CONTROL PLANE
118—AUTHORIZATION STATE CONTROLLER
120—GOVERNANCE LOG
122—CRYPTOGRAPHIC VALIDATION ENGINE
140—GOVERNED CONNECTOR
142—DOWNSTREAM ACCEPTANCE ENDPOINT
700—TOOL INVOCATION
702—TOOL OR EXTERNAL DATA SOURCE
704—TOOL OUTPUT
706—INTEGRITY VALIDATION PROCESS
708—INTEGRITY PREDICATES
710—INTEGRITY EXCEPTION EVENT RECORD
712—POLICY-DEFINED RESPONSE

Figure 8:
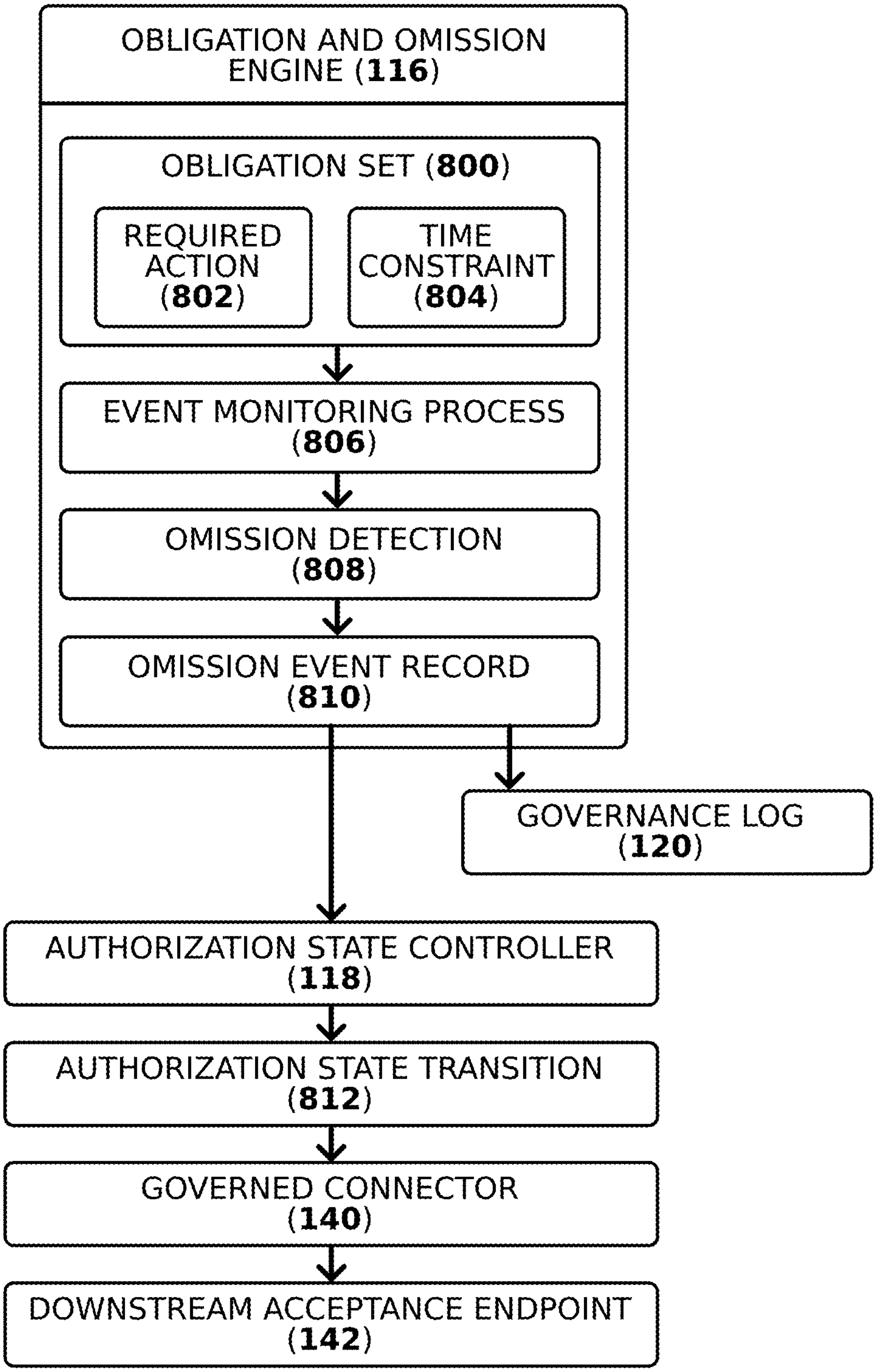
FIG. 8 is a block diagram illustrating detection of omission events resulting from failure to satisfy policy-defined obligations and corresponding authorization state transitions.

FIG. 8—Omission Event Detection and Policy-Defined Response. FIG. 8 illustrates a computer-implemented mechanism for detecting, recording, and enforcing omission events resulting from failure to satisfy time-bounded policy obligations associated with a regulated workflow instance.

In the illustrated embodiment, upon evaluation of a policy snapshot applicable to a regulated workflow instance, an obligation and omission engine 116 derives an obligation set 800 comprising one or more required actions 802 and associated time constraints 804. The required actions 802 represent policy-defined prerequisites that must be completed in order to permit downstream state advancement and may include acknowledgements, reviews, confirmations, override approvals, attestations, or other mandated actions.

The obligation and omission engine 116 performs an event monitoring process 806 that observes workflow events associated with the regulated workflow instance and compares observed events against the obligation set 800 and the associated time constraints 804. The event monitoring process 806 evaluates completion of required actions 802 upon receipt of relevant workflow events and, in certain embodiments, upon timer events corresponding to the time constraints 804.

When a required action 802 is not completed within the corresponding time constraint 804, the obligation and omission engine 116 performs omission detection 808 and generates an omission event record 810. The omission event record 810 records that a policy-defined prerequisite has not been satisfied and is persisted in a governance log 120. The omission event record 810 is cryptographically bound to an execution context identifier and an applicable policy snapshot identifier, such that the omission is durably recorded and auditable.

In response to the omission event record 810, an authorization state controller 118 performs an authorization state transition 812 to place the regulated workflow instance into a held or restricted authorization state that constrains downstream effectuation. While the authorization state is held or restricted, downstream acceptance of effectuation requests is conditioned on satisfaction of the applicable release predicates and recorded authorization outcomes.

The governed connector 140 evaluates the current authorization state bound to the execution context identifier at the downstream acceptance endpoint 142 prior to completion of a state-advancing operation. When the authorization state reflects a held or restricted condition resulting from the omission event record 810 and corresponding authorization state transition 812, the governed connector 140 applies the enforcement decision at the acceptance endpoint, including blocking or deferring the requested operation. The state-advancing operation proceeds only upon resolution of the omission through completion of the required action 802 or recording of an authorized override in a governed audit record, as evidenced by a readiness artifact bound to the execution context identifier, the applicable policy snapshot identifier, and the requested operation scope.

REFERENCE LIST

116—OBLIGATION AND OMISSION ENGINE
118—AUTHORIZATION STATE CONTROLLER
120—GOVERNANCE LOG
140—GOVERNED CONNECTOR
142—DOWNSTREAM ACCEPTANCE ENDPOINT
800—OBLIGATION SET
802—REQUIRED ACTION
804—TIME CONSTRAINT
806—EVENT MONITORING PROCESS
808—OMISSION DETECTION
810—OMISSION EVENT RECORD
812—AUTHORIZATION STATE TRANSITION

Figure 9:
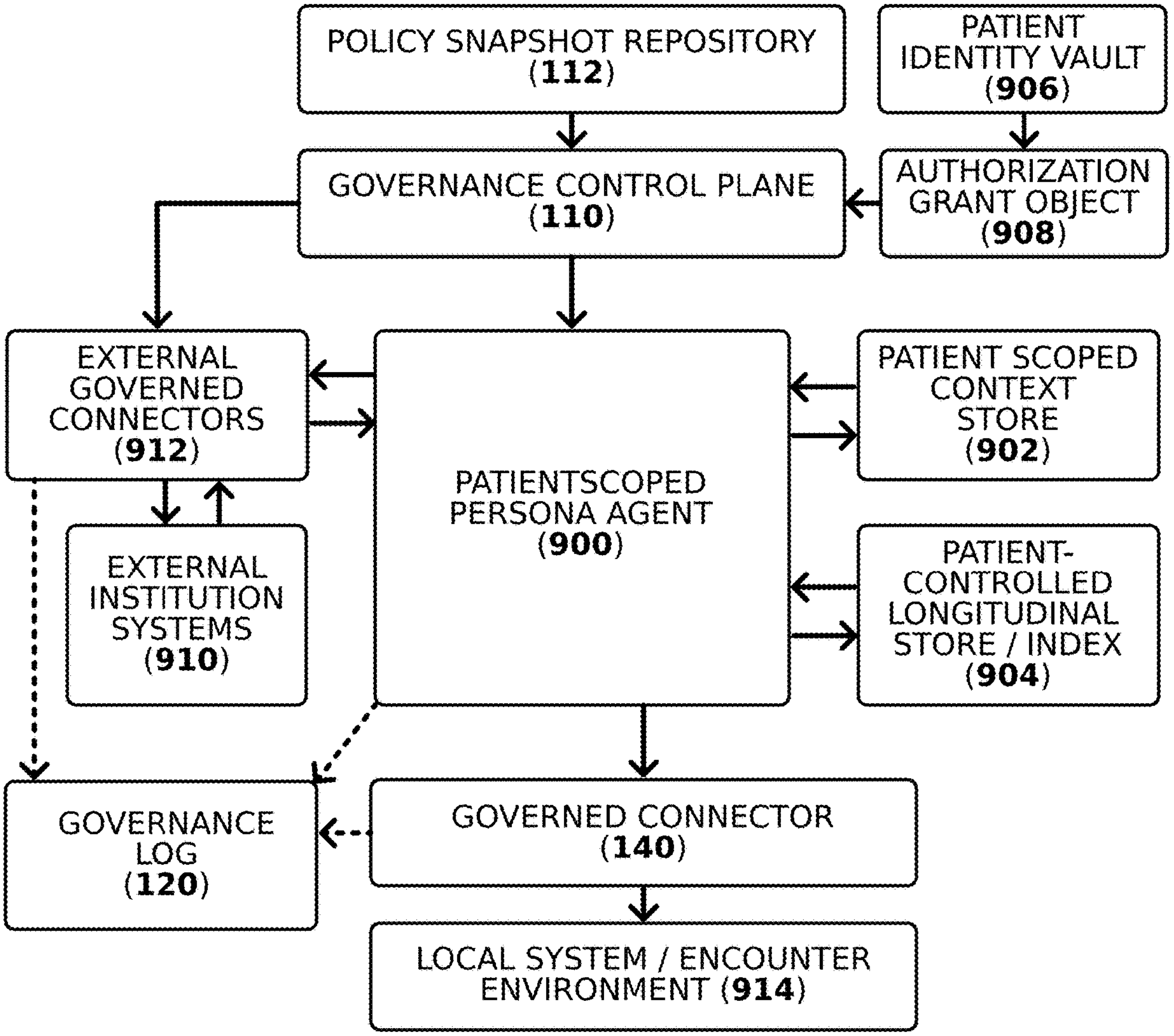
FIG. 9 is a block diagram illustrating patient scoped persona agent governance for retrieval and assembly of policy scoped, operationally relevant patient context across multiple institutions.

FIG. 9—Patient Scoped Persona Agent Governance. FIG. 9 illustrates a computer-implemented architecture in which a patient scoped persona agent governs access to longitudinal medical data across multiple institutions under patient-directed authorization while preserving policy enforcement, provenance, and auditability.

In the illustrated embodiment, a patient scoped persona agent 900 is instantiated for a patient and is bound to an agent execution context governed by a governance control plane 110. The patient scoped persona agent 900 operates as a policy governed intermediary that retrieves, assembles, and provides governed medical context on behalf of the patient, subject to authorization and policy evaluation performed by the governance control plane 110.

The patient scoped persona agent 900 interacts with a patient scoped context store 902 that maintains time-bounded, policy scoped governed context windows for different classes of clinical data. The patient scoped persona agent 900 further interacts with a patient-controlled longitudinal store or index 904 that maintains normalized longitudinal patient data together with governed references to external records originating from multiple institutions.

Patient identity, consent, and authorization preferences are maintained in a patient identity vault 906. The patient identity vault 906 stores one or more authorization grant objects 908 that define permitted data classes, permitted recipients, purpose of use constraints, temporal bounds, and revocation conditions. The governance control plane 110 evaluates the authorization grant objects 908 as part of an applicable policy snapshot selected from a policy snapshot repository 112, and binds resulting access decisions to an execution context identifier and applicable policy snapshot identifier recorded in governance records.

When retrieval of external records is required, the patient scoped persona agent 900 retrieves records from one or more external institution systems 910 via external governed connectors 912. Each retrieval is mediated under control of the governance control plane 110, which enforces authorization scope, data minimization, provenance binding, and audit logging. Retrieved records are normalized and associated with provenance metadata prior to being stored or referenced within the patient scoped context store 902 or the patient-controlled longitudinal store or index 904.

During an encounter at a local system or encounter environment 914, the patient scoped persona agent 900 provides governed context bundles derived from the patient scoped context store 902 and the patient-controlled longitudinal store or index 904. In embodiments, a governed context bundle includes policy-scoped data elements selected under minimization rules, provenance references to underlying external records, and binding to an applicable policy snapshot identifier and execution context identifier sufficient to support auditability of what was disclosed and under which policy basis. The governed context bundles supply operationally relevant and policy-compliant context to the local system or encounter environment 914, even when the local system does not natively contain the patient's historical records.

All retrievals, disclosures, and uses of patient data performed by or on behalf of the patient scoped persona agent 900 are recorded in a governance log 120. Any downstream reliance, write back, commit, or other state-advancing operation based on the provided context is mediated by governed connectors 140 at downstream acceptance endpoints and is conditioned on readiness artifact validation bound to the execution context identifier and applicable policy snapshot identifier, such that patient-directed authorization, policy enforcement, provenance tracking, and auditability are preserved across institutional boundaries.

REFERENCE LIST

900—PATIENT SCOPED PERSONA AGENT
902—PATIENT SCOPED CONTEXT STORE
904—PATIENT-CONTROLLED LONGITUDINAL STORE/INDEX
906—PATIENT IDENTITY VAULT
908—AUTHORIZATION GRANT OBJECT
910—EXTERNAL INSTITUTION SYSTEMS
912—EXTERNAL GOVERNED CONNECTORS
914—LOCAL SYSTEM/ENCOUNTER ENVIRONMENT
110—GOVERNANCE CONTROL PLANE
112—POLICY SNAPSHOT REPOSITORY
120—GOVERNANCE LOG
140—GOVERNED CONNECTOR

Figure 10:
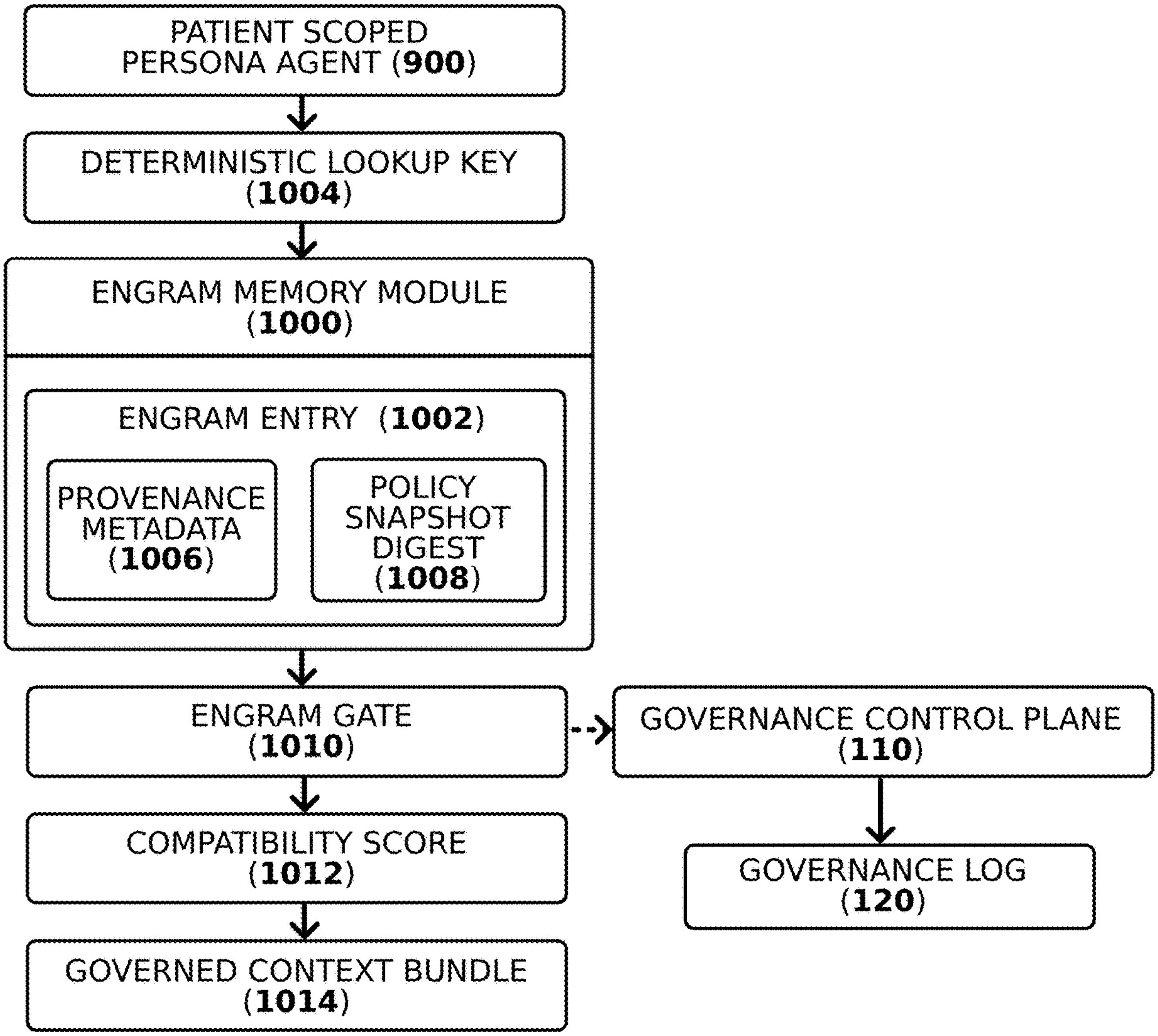
FIG. 10 is a block diagram illustrating a patient specific engram memory module including deterministic lookup, engram gate validation, compatibility scoring, and governed context bundling.

FIG. 10—Patient Engram Memory Module with Engram Gate and Compatibility Score. FIG. 10 illustrates a computer-implemented patient engram memory module that provides governed, low-latency memory access for a patient scoped persona agent while preserving policy enforcement, provenance tracking, and auditability.

In the illustrated embodiment, an engram memory module 1000 stores a plurality of engram entries 1002. Each engram entry 1002 comprises a deterministic lookup key 1004, one or more compact representations including embeddings, feature vectors, templates, or structured objects, provenance metadata 1006 identifying one or more underlying governed records or episodes, and policy scope metadata or a policy snapshot identifier or policy snapshot digest 1008 that binds the engram entry 1002 to a specific evaluated policy basis.

A patient scoped persona agent 900 queries the engram memory module 1000 using a deterministic lookup key 1004 to retrieve candidate engram entries 1002. Retrieval of a candidate engram entry 1002 does not itself authorize reliance or downstream effectuation. Instead, retrieval and use of each candidate engram entry 1002 is conditioned on evaluation by an engram gate 1010.

The engram gate 1010 evaluates deterministic compatibility predicates for each candidate engram entry 1002, including freshness constraints, presence and consistency of provenance metadata 1006, compatibility with the policy snapshot identifier or policy snapshot digest 1008, and satisfaction of defined integrity predicates. In certain embodiments, the engram gate 1010 computes a compatibility score 1012 derived from such deterministic predicates to order or prioritize candidate entries for inclusion, the score affecting eligibility and ordering rather than substituting for policy evaluation. When the engram gate 1010 determines that a candidate engram entry 1002 is stale, incompatible, out-of-scope, or insufficiently validated, the candidate engram entry 1002 is suppressed or attenuated and is excluded from use.

When an engram entry 1002 is permitted for use by the engram gate 1010, the engram entry 1002 is included in a governed context bundle 1014 provided to the patient scoped persona agent 900. Provision of the governed context bundle 1014 accelerates reasoning and reduces token footprint by reusing compact, policy scoped representations rather than re-fetching or re-evaluating underlying records.

When a governed context bundle 1014 is provided, the governance control plane 110 records retrieval and use of the engram entry 1002 in a governance log 120, including identifiers of referenced source records and the associated policy snapshot identifier or policy snapshot digest 1008, thereby preserving auditability and provenance.

Engram-derived context retrieved from the engram memory module 1000 is not treated as an authorization artifact and is not sufficient to permit a state transition, clear a held authorization state, or satisfy a policy-defined obligation absent corresponding evaluation and recording by the governance control plane 110. Any downstream effectuation remains conditioned on readiness artifact validation reflecting a recorded authorization outcome under the execution context identifier and applicable policy snapshot identifier. As illustrated in FIG. 10, the engram memory module 1000 provides context retrieval functionality while authorization and state advancement remain governed by the enforcement mechanisms described herein.

REFERENCE LIST

1000—ENGRAM MEMORY MODULE
1002—ENGRAM ENTRY
1004—DETERMINISTIC LOOKUP KEY
1006—PROVENANCE METADATA
1008—POLICY SNAPSHOT DIGEST
1010—ENGRAM GATE
1012—COMPATIBILITY SCORE
1014—GOVERNED CONTEXT BUNDLE
900—PATIENT SCOPED PERSONA AGENT
110—GOVERNANCE CONTROL PLANE
120—GOVERNANCE LOG

Figure 11:
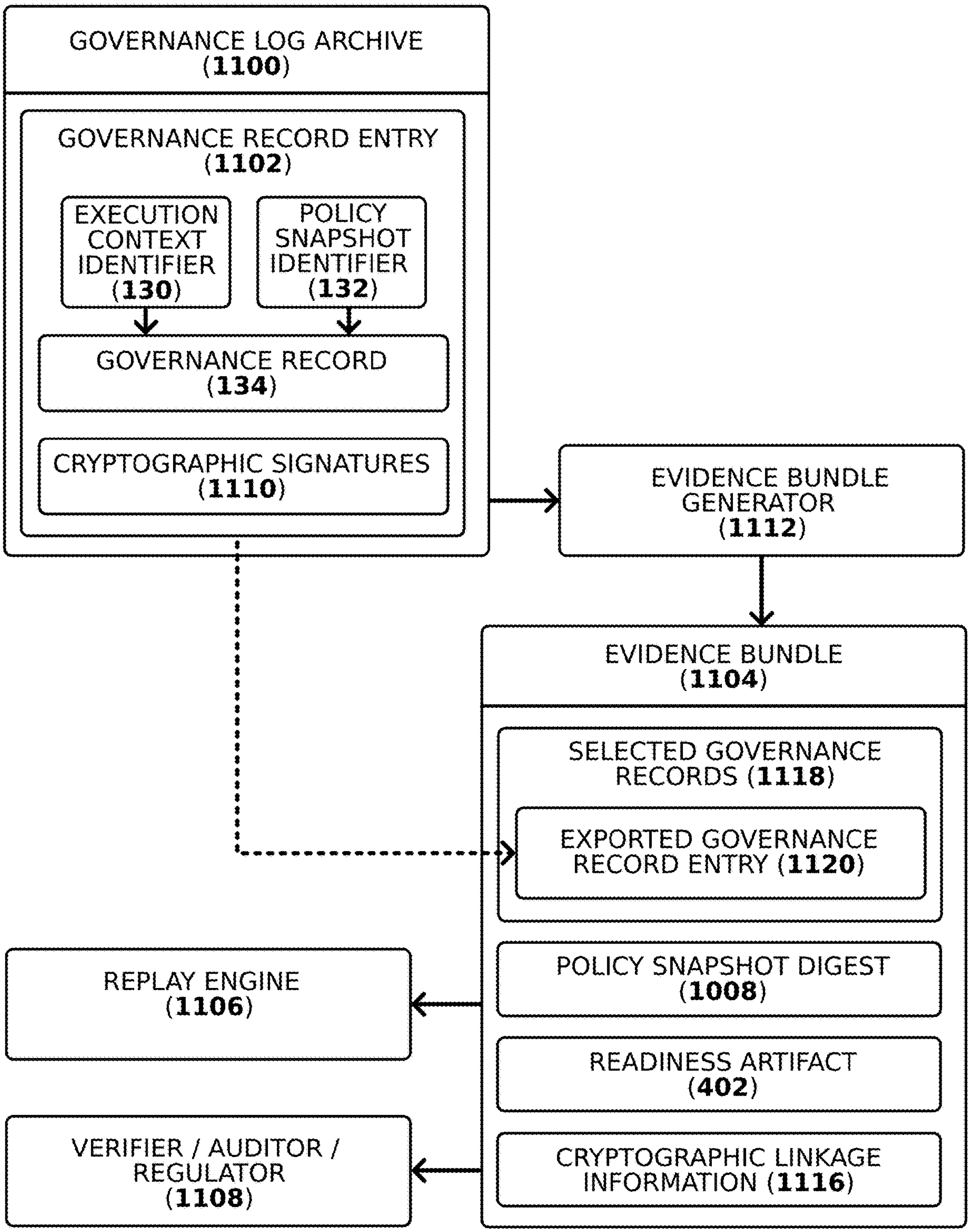
FIG. 11 is a block diagram illustrating generation, export, and independent verification of replayable evidence bundles derived from cryptographically linked governance records.

FIG. 11—Evidence Bundle Generation and Replayable Verification. FIG. 11 illustrates generation, export, and independent verification of replayable evidence bundles that demonstrate policy governed execution of a regulated workflow.

In the illustrated embodiment, a governance control plane maintains a governance log archive 1100 comprising an append only sequence of cryptographically linked governance record entries 1102. Each governance record entry 1102 contains or references a canonical governance record 134, the governance record 134 being cryptographically bound to an execution context identifier 130, a policy snapshot digest 1008, and a recorded authorization outcome. Each governance record entry 1102 further includes one or more cryptographic signatures 1110 sufficient to verify authenticity and integrity.

An evidence bundle generator 1112 produces an evidence bundle 1104 by exporting one or more governance record entries 1102 from the governance log archive 1100 as exported governance record entries 1120. From the exported governance record entries 1120, the evidence bundle generator 1112 selects a subset associated with a regulated workflow instance as selected governance records 1118. The evidence bundle 1104 further includes the policy snapshot digest 1008 (or a identifier thereof), references to one or more readiness artifacts 402, timestamps, role-bound authorization proofs, and cryptographic linkage information 1116 sufficient to verify record ordering, completeness, and integrity.

The evidence bundle 1104 is self-describing and is usable by a replay engine 1106 to reconstruct a sequence of workflow events, omission events, integrity exception events, authorization state transitions, and downstream effectuation decisions without reliance on proprietary application logs, live system access, or internal control plane implementations.

In certain embodiments, replay further comprises re-evaluating policy-defined predicates under the historical policy snapshot identified by policy snapshot digest 1008 and verifying that recorded authorization outcomes represented in the selected governance records 1118 correspond to predicate results under that historical snapshot.

An external verifier, auditor, or regulator 1108 independently validates the evidence bundle 1104 by verifying cryptographic signatures 1110, cryptographic linkage information 1116, and consistency between execution context identifiers 130, policy snapshot digest 1008, readiness artifacts 402, and authorization outcomes represented in the selected governance records 1118.

The evidence bundle 1104 contains governance record entries 1102, execution context identifiers 130, policy snapshot digests 1008, readiness artifacts 402, and associated cryptographic signatures 1110 and linkage information 1116 sufficient to permit independent validation of recorded authorization outcomes. In certain embodiments, the bundle further includes, for each readiness artifact 402, scope constraints identifying the permitted operation class and an associated validity interval or expiration, and binding data sufficient to detect replay outside the authorized context. Using the included artifacts, a reviewing party can verify integrity of the records, continuity of linkage, and correspondence between each recorded downstream effectuation and the applicable policy snapshot and recorded authorization outcome at the time of effectuation. Validation is performed based on the contents of the exported bundle without requiring access to the originating live system or internal enforcement components.

REFERENCE LIST

1100—GOVERNANCE LOG ARCHIVE
1102—GOVERNANCE RECORD ENTRY
1110—CRYPTOGRAPHIC SIGNATURES
134—GOVERNANCE RECORD
1120—EXPORTED GOVERNANCE RECORD ENTRY
1118—SELECTED GOVERNANCE RECORDS
1104—EVIDENCE BUNDLE
1112—EVIDENCE BUNDLE GENERATOR
1106—REPLAY ENGINE
1108—VERIFIER/AUDITOR/REGULATOR
130—EXECUTION CONTEXT IDENTIFIER
1008—POLICY SNAPSHOT DIGEST
402—READINESS ARTIFACT
1116—CRYPTOGRAPHIC LINKAGE INFORMATION

The invention claimed is:

1. A computer-implemented system for enforcing policy governed execution of a regulated workflow, comprising:

(a) one or more processors and a memory storing instructions that, when executed by the one or more processors, cause the system to implement a governance control plane configured to:

(b) receive one or more workflow events associated with a workflow instance;

(c) select and evaluate, by the governance control plane executed by the one or more processors, a machine-interpretable policy snapshot applicable to the workflow instance;

(d) based on evaluation of the policy snapshot, determine one or more required actions that must be satisfied prior to authorization and acceptance of a state-advancing operation;

(e) maintain, in computer memory, an authorization state associated with the workflow instance, the authorization state comprising at least a permitted state and a non-permitted state;

(f) generate a governance record that is cryptographically bound to at least the workflow instance and the evaluated policy snapshot, the governance record recording satisfaction or non-satisfaction of the required actions; and (g) a governed connector positioned at a downstream acceptance endpoint and configured to control execution of a state-advancing operation for the workflow instance;

wherein the governed connector is configured to permit, block, or defer the state-advancing operation only upon cryptographic verification of a readiness artifact derived from the governance record and bound to the workflow instance and the evaluated policy snapshot, such that the downstream acceptance endpoint is technically prevented from advancing a state of the workflow instance unless satisfaction of the policy snapshot is proven at the time the state-advancing operation is attempted.

2. The system of claim 1, wherein the governance control plane is configured such that the governance record constitutes a required technical precondition to authorization of the state-advancing operation, and wherein the governed connector is prohibited from permitting the state-advancing operation unless the governance record exists and satisfies one or more policy-defined predicates, whereby the governance record operates as an authorization gate rather than as a post-hoc audit log.

3. The system of claim 1, wherein evaluation of the policy snapshot produces an obligation set comprising one or more required actions and associated temporal constraints, and wherein the governance control plane is configured to detect non-satisfaction of the obligation set when a required action is missing, incomplete, or untimely.

4. The system of claim 3, wherein the authorization state comprises a plurality of machine-executable authorization states including at least a permitted state and a held state, and wherein detection of non-satisfaction of the obligation set causes the governance control plane to transition the workflow instance into the held state that prevents authorization of the state-advancing operation.

5. The system of claim 4, wherein transition of the workflow instance from the held state to the permitted state is conditioned on evaluation of one or more transition guards at the downstream acceptance endpoint, the transition guards comprising cryptographic verification that the governance record reflects satisfaction of the required actions or a policy-authorized override.

6. The system of claim 1, wherein the governance record is stored in a governance log comprising an append only sequence of cryptographically linked records, such that modification, deletion, or reordering of governance records is detectable.

7. The system of claim 1, wherein the governance control plane is further configured to evaluate one or more integrity predicates associated with at least one of a tool output, retrieved data, or a connector response, and to generate an integrity exception event when an integrity predicate is not satisfied, and wherein the integrity exception event prevents authorization of the state-advancing operation.

8. The system of claim 1, wherein the one or more required actions comprise receipt of a machine-verifiable attestation associated with at least one of data handling constraints, data retention constraints, or model training constraints, and wherein absence of the attestation prevents authorization of the state-advancing operation.

9. The system of claim 1, wherein the governance control plane is further configured to generate a replayable evidence bundle comprising a plurality of governance records, the evaluated policy snapshot, and one or more authorization outcomes, the replayable evidence bundle being sufficient to independently reconstruct and verify a sequence of state-advancing operations for the workflow instance.

10. A distributed computer system for enforcing policy governed execution of a regulated workflow across multiple administrative domains, comprising:

(a) one or more processors and a memory storing instructions that, when executed by the one or more processors, implement a governance control plane executed by the one or more processors and configured to evaluate a machine-interpretable policy snapshot applicable to a workflow instance, determine one or more required actions that must be satisfied prior to authorization of a state-advancing operation, maintain a machine-executable authorization state for the workflow instance, and generate a cryptographically verifiable governance record bound to the workflow instance and an evaluated policy snapshot;

(b) a first computing domain executing a reasoning service configured to generate a proposed output associated with the workflow instance; and (c) a second computing domain executing a governed connector interfaced with a downstream acceptance endpoint of a system of record;

(d) wherein the governance control plane is configured to generate a readiness artifact derived from the governance record and bound to the workflow instance and the evaluated policy snapshot; and (e) wherein the governed connector is configured to permit, block, or defer a state-advancing operation derived from the proposed output only upon cryptographic verification of the readiness artifact at the downstream acceptance endpoint, such that partitioning generation of the proposed output and execution of the state-advancing operation across administrative domains does not bypass enforcement of the policy snapshot.

11. The distributed computer system of claim 10, wherein the governance control plane assigns an execution context identifier to the workflow instance and propagates the execution context identifier across the first computing domain and the second computing domain, such that policy evaluation, authorization state, governance records, and authorization of the state-advancing operation are correlated to the same workflow instance across administrative domains.

12. The distributed computer system of claim 10, wherein the readiness artifact is cryptographically bound to at least the execution context identifier, a policy snapshot identifier corresponding to the evaluated policy snapshot, and an authorization outcome recorded by the governance control plane, and wherein the governed connector rejects the readiness artifact when cryptographic verification of the binding fails.

13. The distributed computer system of claim 10, wherein the governed connector is positioned at a downstream acceptance endpoint configured to perform at least one of write back, commit, finalize, dispatch, execution, or authorization of a downstream operation, and wherein the downstream acceptance endpoint is configured to deny the operation absent successful verification of the readiness artifact.

14. The distributed computer system of claim 10, wherein generation of the proposed output in the first computing domain and authorization of the state-advancing operation in the second computing domain are performed by different entities, and wherein the governed connector enforces policy governed authorization independent of which entity generated the proposed output.

15. The distributed computer system of claim 10, wherein cryptographic verification of the readiness artifact by the governed connector is performed without disclosure of underlying regulated data associated with the workflow instance, such that authorization of the state-advancing operation is determined using cryptographic proof rather than transfer of protected content.

16. A computer-implemented method for enforcing policy governed execution of a regulated workflow, the method comprising:

(a) receiving, by one or more processors, a workflow event associated with a workflow instance, (b) evaluating, by the one or more processors, a machine-interpretable policy snapshot applicable to the workflow instance to determine one or more required actions that must be satisfied prior to authorization of a state-advancing operation;

(c) maintaining, in computer memory, a machine-executable authorization state for the workflow instance based on satisfaction or non-satisfaction of the required actions;

(d) generating, by the one or more processors, a governance record that is cryptographically bound to the workflow instance and the evaluated policy snapshot and that records satisfaction or non-satisfaction of the required actions;

(e) detecting a reliance event that would advance a state of the workflow instance, the reliance event comprising at least one of write back, commit, finalize, dispatch, execution, or authorization of a downstream operation; and (f) prior to permitting the reliance event, cryptographically verifying the governance record or a readiness artifact derived therefrom and permitting, blocking, or deferring the reliance event based on the verification, such that authorization of the state-advancing operation is technically prevented unless satisfaction of the policy snapshot is proven at the time the reliance event is attempted, independent of where an artificial intelligence output associated with the workflow instance is generated or how the output is labeled.

17. The method of claim 16, wherein the reliance event comprises a human-performed action that incorporates an output generated by an artificial intelligence system into a regulated system of record, the human-performed action comprising at least one of copying, pasting, paraphrasing, editing, or re-entering content, and wherein permitting, blocking, or deferring the reliance event comprises preventing commit, finalize, or sign operations unless cryptographic verification confirms satisfaction of requirements defined by the policy snapshot.

18. The method of claim 16, further comprising detecting, based on the evaluated policy snapshot, an omission event indicating failure to satisfy a required action within a defined time constraint, and in response:

(a) transitioning the authorization state of the workflow instance to a held state that prevents authorization of the state-advancing operation; and (b) blocking the reliance event until the governance record cryptographically records completion of the required action or a policy-authorized override.

19. The method of claim 16, wherein permitting, blocking, or deferring the reliance event is performed without regard to whether an artificial intelligence output associated with the workflow instance is labeled as advisory, non-diagnostic, non-binding, or informational, and is determined solely based on whether the reliance event would advance a regulated workflow state.

20. The method of claim 16, wherein cryptographically verifying the governance record comprises validating, at a downstream acceptance endpoint, a readiness artifact derived from the governance record, and rejecting the reliance event when the readiness artifact is absent, invalid, expired, or inconsistent with at least one of the workflow instance or the evaluated policy snapshot.

* * * * *